United States Patent [19]
Hanami et al.

[11] Patent Number: 6,122,317
[45] Date of Patent: Sep. 19, 2000

[54] MOTION VECTOR DETECTOR

[75] Inventors: Atsuo Hanami; Tetsuya Matsumura; Hiroshi Segawa; Kazuya Ishihara; Satoshi Kumaki; Yoshinori Matsuura, all of Hyogo, Japan

[73] Assignee: Mitsubishi Denki Kabushiki Kaisha, Tokyo, Japan

[21] Appl. No.: 08/975,207

[22] Filed: Nov. 20, 1997

[30] Foreign Application Priority Data

May 22, 1997 [JP] Japan .................................. 9-132220

[51] Int. Cl.⁷ .............................. H04N 7/12; H04B 1/66
[52] U.S. Cl. ......................... 375/240; 348/416; 348/699
[58] Field of Search .................................. 348/402, 407, 348/411, 412, 413, 416, 420, 714, 699, 700; 382/209, 217, 232, 236; 375/240; H04N 7/12; H04B 1/66

[56] References Cited

U.S. PATENT DOCUMENTS

| | | | |
|---|---|---|---|
| 5,400,087 | 3/1995 | Uramoto et al. | 348/699 |
| 5,512,962 | 4/1996 | Homma | 348/699 |
| 5,561,475 | 10/1996 | Jung | 348/699 |
| 5,596,370 | 1/1997 | Jung | 348/416 |
| 5,652,629 | 7/1997 | Ganzales et al. | 348/699 |
| 5,677,735 | 10/1997 | Ueno et al. | 348/415 |
| 5,719,642 | 2/1998 | Lee | 348/699 |
| 5,760,845 | 6/1998 | Kim | 348/699 |
| 5,760,846 | 6/1998 | Lee | 348/699 |
| 5,808,685 | 9/1998 | Jung | 348/416 |
| 5,825,423 | 10/1998 | Jung | 348/413 |
| 5,838,391 | 11/1998 | Kim | 348/699 |
| 5,949,486 | 9/1999 | Ishihara et al. | 348/402 |

FOREIGN PATENT DOCUMENTS 8-265770  10/1996  Japan .

OTHER PUBLICATIONS

"A Flexible Motion–Vector Estimation Chip for Real–Time Video Codecs", K. Yang et al., IEEE 1990 Custom Integrated Circuits Conference, pp. 17.5.1–17.5.4.

*Primary Examiner*—Chris S. Kelley
*Assistant Examiner*—Tung Vo
*Attorney, Agent, or Firm*—McDermott, Will & Emery

[57] ABSTRACT

An evaluation value operation part computes evaluation values of a template block and a search window block in accordance with respective ones of a plurality of predictive modes in parallel with each other, and a candidate vector determination part decides candidate vectors indicating optimum vectors in accordance with the computed evaluation values and on the basis of priority levels from a priority generation part. In accordance with these candidate vectors, an optimum vector decision part decides the optimum vectors for the respective predictive modes. Thus provided is an image coding system which can reduce the amount of codes of motion vectors with excellent picture quality.

20 Claims, 51 Drawing Sheets

FIG. 3

MHC, MVC

| VARIABLE-LENGTH CODE | DECIMAL CODE |
|---|---|
| 0000 0011 001 | -16 |
| 0000 0011 011 | -15 |
| 0000 0011 101 | -14 |
| 0000 0011 111 | -13 |
| 0000 0100 001 | -12 |
| 0000 0100 011 | -11 |
| 0000 0100 11 | -10 |
| 0000 0101 01 | -9 |
| 0000 0101 11 | -8 |
| 0000 0111 | -7 |
| 0000 1001 | -6 |
| 0000 1011 | -5 |
| 0000 111 | -4 |
| 0001 1 | -3 |
| 0011 | -2 |
| 011 | -1 |
| 1 | 0 |
| 010 | 1 |
| 0010 | 2 |
| 0001 0 | 3 |
| 0000 110 | 4 |
| 0000 1010 | 5 |
| 0000 1000 | 6 |
| 0000 0110 | 7 |
| 0000 0101 10 | 8 |
| 0000 0101 00 | 9 |
| 0000 0100 10 | 10 |
| 0000 0100 010 | 11 |
| 0000 0100 000 | 12 |
| 0000 0011 110 | 13 |
| 0000 0011 100 | 14 |
| 0000 0011 010 | 15 |
| 0000 0011 000 | 16 |

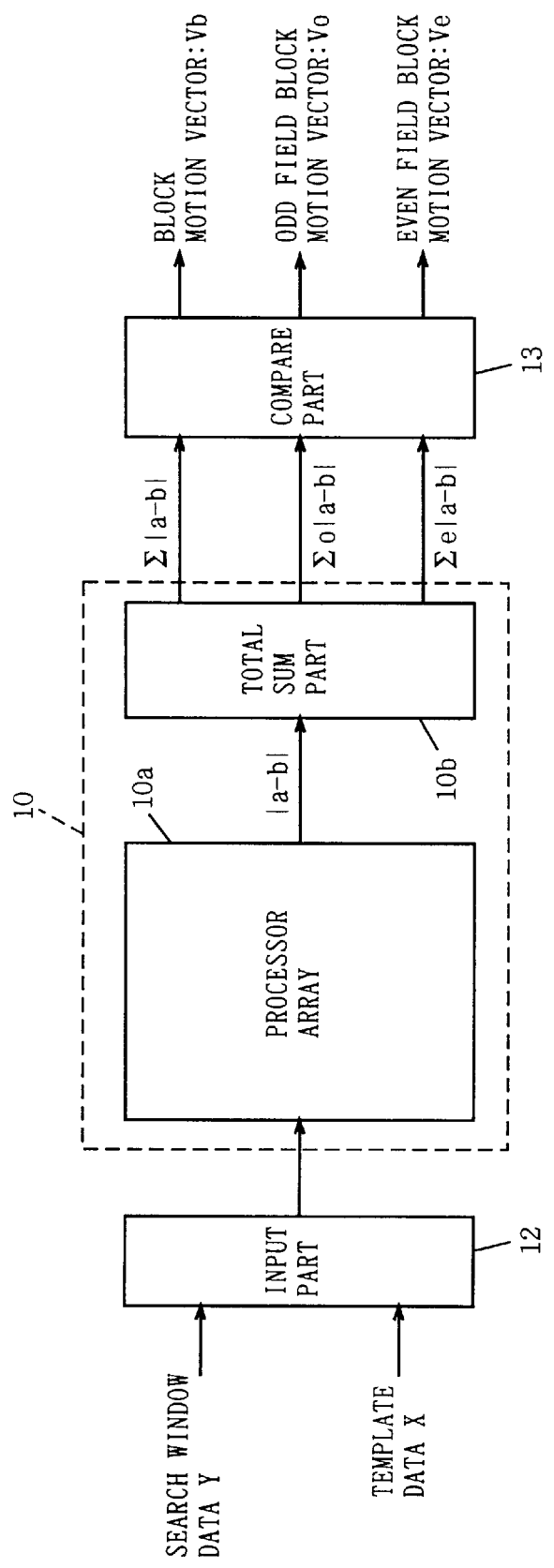
F I G. 4

PIXELS IN THE SAME FIELD

MOTION VECTOR DETECTOR

BACKGROUND OF THE INVENTION

1. Field of the Invention

The present invention relates to an apparatus for detecting motion vectors employed for motion compensation of moving images.

2. Description of the Background Art

In order to transmit or store image signals having an enormous quantity of data, a data compression technique of reducing the data quantity is indispensable. Image data has considerable redundancy resulting from correlation between neighboring pixels, human perception and the like. A data compression technique suppressing the data redundancy and reducing the quantity of transmission data is called highly efficient coding. Systems of such highly efficient coding include a predictive coding system. In the predictive coding system, the following processing is executed:

Predictive errors which are the differences between respective pixel data of a current screen (frame or field) to be currently coded and respective pixel data on the same positions of a preceding reference screen are computed, and employed for subsequent coding. In this method, coding can be performed in high efficiency for images having small motions due to remarkable correlationship between the screens. As to images having large motions, however, the errors are increased due to small correlationship between the screens, to disadvantageously increase the quantity of transmission data.

Motion-compensated interframe (or interfield) predictive coding is employed to solve the aforementioned problem. In this method, the following processing is executed: First, motion vectors are computed using pixel data of a current screen (frame or field) and a preceding screen before computing predictive errors. Predictive images of the preceding screen are moved in accordance with the computed motion vectors. Image data of the preceding screen on positions displaced by the motion vectors are regarded as reference pixels, so that the values thereof are employed as predictive values. Then, predictive errors between pixels of the moved preceding screen and the current screen are computed for transmission with the motion vectors.

FIG. 83 is a block diagram schematically showing the overall structure of an encoder for coding image data in accordance with a conventional motion-compensated predictive coding method. Referring to FIG. 83, the encoder includes a preprocessing circuit 910 for executing prescribed preprocessing on an inputted image signal, a source coding circuit 912 for executing elimination of redundancy and quantization on the signal preprocessed by the preprocessing circuit 910, and a video multiplex coding circuit 914 for coding the signal from the source coding circuit 912 in accordance with a prescribed format and multiplexing the same to a code string of a predetermined data structure.

The preprocessing circuit 910 converts the input image signal to that of a common intermediate format (CIF) through time and space filters, and executes filtering for noise elimination.

The source coding circuit 912 performs an orthogonal transformation such as discrete cosine transformation (DCT), for example, on the supplied signal, performs motion compensation on the input signal, and quantizes orthogonal-transformed image data.

The video multiplex coding circuit 914 performs two-dimensional variable-length coding on the supplied image signal, performs variable-length coding on various attributes, such as motion vectors, of blocks which are data processing units, and thereafter multiplexes the same to a code string of a predetermined data structure.

The encoder further includes a transmission buffer 916 for buffering the image data from the video multiplex coding circuit 914, and a transmission coding circuit 918 for adapting the image data from the transmission buffer 916 to a transmission channel. The transmission buffer 169 smoothes information generation rate to a constant rate. The transmission coding circuit 918 executes addition of error correction bits, voice signal data and the like.

FIG. 84 illustrates an exemplary structure of the source coding circuit 912 shown in FIG. 83. Referring to FIG. 84, the source coding circuit 912 includes a motion compensation predictor 920 for detecting motion vectors with respect to the input image signal supplied from the preprocessing circuit 910 and generating a reference image which is motion-compensated in accordance with the motion vectors, a loop filter 922 for filtering reference image pixel data from the motion compensation predictor 920, a subtracter 924 for obtaining the difference between an image signal outputted from the loop filter 922 and the input image signal, an orthogonal transformer 926 for orthogonally transforming an output of the subtracter 924, and a quantizer 928 for quantizing the data orthogonally transformed by the orthogonal transformer 926.

The motion compensation predictor 920 includes a frame memory storing pixel data of a preceding frame, for detecting the motion vectors and generating the motion-compensated reference image pixel data in accordance with the input image signal data and the pixel data in the frame memory (in case of a frame screen). The loop filter 922 is employed to improve the picture quality.

The orthogonal transformer 926 performs orthogonal transformation such as DCT in a unit of a block of a prescribed size (8 by 8 pixels in general). The quantizer 928 quantizes the orthogonally transformed pixel data in accordance with a previously prepared quantization table.

The motion compensation predictor 920 and the subtracter 924 execute motion-compensated interframe (or interfield) prediction, for eliminating temporal redundancy in a moving image signal. The orthogonal transformer 926 eliminates spatial redundancy in the moving image signal by orthogonal transformation.

The source coding circuit 912 further includes an inverse quantizer 930 for transforming the data quantized in the quantizer 928 to the signal state before the quantization, an inverse orthogonal transformer 932 for performing inverse orthogonal transformation on an output of the inverse quantizer 930, and an adder 934 for adding up outputs of the loop filter 922 and the inverse orthogonal transformer 932. The inverse quantizer 930 and the inverse orthogonal transformer 932 generate an image employed for interframe (or interfield) prediction for the next frame (or field). The generated image data is written in the frame memory included in the motion compensation predictor 920.

The adder 934 adds the image signal (interframe or interfield difference data) to the output of the loop filter 922, thereby recovering image data of the current frame (or current field). The video multiplex coding circuit 914 converts the output image data from the quantizer 928 and the motion vectors from the motion compensation predictor 920 to variable-length codes and transmits the same.

Computing of a motion vector is now described as to interframe predictive coding. In general, block matching is employed for motion vector computing.

Consider that an image A in a (m−1)-th frame moves to a position A' in an m-th frame, as shown in FIG. 85A. In block matching, the screen (one frame in this case) is split into blocks of P by Q pixels (P=Q in general). A block most approximate to that of interest in the current frame is found out from a preceding frame. The displacement between the block of interest and the most approximate block in the preceding frame is called a motion vector. The motion vector is now described in more detail.

As shown in FIG. 85B, it is assumed that the m-th frame is to be coded. This frame is split into blocks each of N by N pixels (P=Q=N in general). It is assumed that Xm(Nk, N1) represents the value of pixel data on the upper left pixel position (Nk, N1) of the block of N by N pixels in the m-th frame. The absolute value of the difference between the data of the corresponding pixels in a block of the preceding frame ((m−1)-th frame) whose pixel position is displaced by a vector (i, j) and in the block in the current frame (m-th frame) is obtained. Then, the displacement vector (i, j) indicating the displacement is changed to various values, and absolute differential sum is obtained for the respective values. The absolute differential sums are generally called evaluation values. A displacement vector (i, j) indicating the position providing the minimum absolute differential sum is defined as a motion vector.

It is necessary to transmit a motion vector per pixel block. If the block size is reduced, the transmission information content is increased to disable effective data compression. If the block size is increased, on the other hand, it is difficult to perform effective motion detection. In general, therefore, the block size is set as 16 by 16 pixels, with a motion vector search range (maximum change width of i, j) of −16 to +16. Motion vector computing by block matching is further specifically described.

FIG. 86 illustrates a specific method of computing a motion vector by block matching. Consider an image 950 consisting of 352 dots (pixels) by 288 lines, as shown in FIG. 86. The image 950 is split into a plurality of blocks each consisting of 16 by 16 pixels. Motion vector detection is executed in the units of the blocks. Around a block 954 in a preceding frame which is on the same position as a block (hereinafter referred to as a template block) 952 subjected to the motion vector detection, a block 956 which is larger by ±16 pixels in the horizontal and vertical directions on the screen is regarded as a search block (hereinafter referred to as a search area). A motion vector search for the template block 952 is executed in the search area 956. The motion vector search method in accordance with block matching includes the following steps:

A block (shown by a vector (i, j) in FIG. 86) having a displacement corresponding to the motion vector is obtained. Evaluation value such as absolute differential sum (or square differential sum) of the respective pixels of the obtained block and pixels on the corresponding positions of the template block 952 is obtained.

The aforementioned operation is executed on all displacements (−16, −16) to (+16, +16) of the vector (i, j). After the evaluation values are obtained for all predictive image blocks (all image blocks in the search area 956), a predictive image block having the minimum evaluation value is detected. A vector going from the block (the block 954 shown by a vector (0, 0) in FIG. 86) of the same position (hereinafter referred to as a true back position) as the template block 952 to the predictive image block having the minimum evaluation value is decided as the motion vector for the template block 952.

FIG. 87 schematically illustrates the structure (syntax) of image data coded by the video multiplex coding circuit 914 shown in FIG. 83. This video multiplex coding circuit 914 multiplexes data supplied from the source coding circuit 912 into a bit stream (plural bit width) by variable-length coding, and transmits the same.

Referring to FIG. 87, the bit stream is split into a plurality of layers, i.e., a sequence layer, a GOP (group of picture) layer, a picture layer, a slice layer, a macro block layer and a block layer in order from the uppermost layer.

The block layer is formed by a block 1100 including an area 1100a mainly storing DCT coefficient data and an area 1100b storing an end of block (EOB) data indicating the end of the block 1100. The area 1100a stores the DCT coefficient data of pixels of eight rows by eight columns serving as a unit of DCT processing.

A macro block 1110 includes a prescribed number of (six) blocks 1100. The macro block layer on the bit stream includes the macro block 1110 formed by the blocks 1100 and a macro block header 1115 storing attributes of data and the motion vector of the macro block 1110 in variable-length codes.

The slice layer includes a slice 1120 formed by one or a plurality of macro blocks 1110 concatenated in image scan order. A slice header 1125 storing information indicating the on-screen vertical position of the slice 1120 and that such as a start code having a prescribed pattern indicating the beginning of this slice 1120 is provided at the head of the slice 1120.

The picture layer includes a picture (image) 1130 formed by a plurality of slices 1120. A picture header 1135 storing information indicating the type (I picture, P picture or the like) of the picture 1130 and that such as a start code indicating the beginning of the picture 1130 in variable-length code words. The picture 1130 corresponds to a single image, and is formed by at least one or a plurality of slices 1120. This picture 1130 is one of the following three types of pictures:

(a) I picture: This is an image coded with only information closed in the image. Namely, pixel data of the I picture is coded with no difference computing.

(b) P picture: This is an image subjected to interframe or interfield predictive coding. A predictive image (reference image) employed for the P picture is an already coded I or P picture temporally preceding in input order. In general, it is possible to select a more efficient one of a method of coding the difference between the P picture and the motion-compensated predictive image or a method of coding the P picture with no difference computing in the units of macro blocks.

(c) B picture (bidirectional predictive coded image): A predictive image employed for the B picture is selected from (i) an already decoded I or P picture temporally preceding the B picture, (ii) an already decoded I or P picture temporally subsequent to the B picture, and (iii) an interpolated image produced by the pictures (i) and (ii). It is possible to select the most efficient one of methods of coding differences between the B pictures and the three types of coding of the differences after motion compensation and coding with no difference computing.

The GOP layer includes a GOP 1140 including a plurality of pictures 1130. The pictures 1130 included in the GOP 1140 include at least one I picture and zero or a plurality of P or B pictures. A GOP header 1145 storing a GOP start code and information such as a flag indicating that this GOP 1140 requires no reference from image data of a preceding GOP is arranged at the head of the GOP 1140.

The sequence layer includes a sequence 1150 formed by one or a plurality of GOPs 1140 or one or a plurality of pictures 1130. A sequence header 1155 storing information such as the format of the screen is arranged at the head of the sequence 1150. The sequence header 1155 can be arranged at the head of all GOPs 1140 included in the sequence 1150. This sequence header 1155 stores information such as a start code having a prescribed pattern indicating the beginning of the sequence 1150, horizontal and vertical sizes of the image(s), the picture rate (image display speed), the bit rate and its content and the like.

FIG. 88 illustrates an exemplary structure of the macro block header 1115 shown in FIG. 87. Referring to FIG. 88, the macro block header 1155 includes a macro block address area 1115a storing information (macro block address) indicating the position of the macro block on the screen and the number (macro block address increment) of macro blocks to be skipped, an area 1115b storing a macro block type indicating the method of processing the macro block, an area 1115c storing the motion vector of the macro block, and a CBP (coded block pattern) area 1115d storing a CBP indicating whether or not each block of the macro block other than an I picture includes DCT coefficient data.

The macro blocks skipped by the macro block address increment are those having no DCT coefficient codes (all DCT coefficients are zero) among macro blocks subjected to no motion compensation. The macro block type stored in the area 1115b includes information as to whether or not the macro block is subjected to interframe/interfield predictive coding, whether or not the same is motion-compensated and the like.

The motion vector area 1115c stores a motion vector for motion compensation prediction. In case of an I picture, the motion vector area 1115c stores no motion vector. In a P picture, it is possible to employ a motion vector in accordance with its predictive system (an odd or even field predictive coding system in case of frame predictive coding). Similarly, different motion vectors are employed in accordance with predictive systems for B pictures. Therefore, the bit width of the motion vector storage area 1115c is varied with the macro block. The CBP area 1115d indicates whether or not each block (the block 1100 in FIG. 87) includes DCT coefficient data. Therefore, a block having the information stored in the CBP area 1115d indicating that no DCT coefficient data is included is not present in data transmission (not transmitted).

All information included in the areas 1115a, 1115b, 1115c and 1115d of the macro block header 1115 is expressed in variable-length code words (variable-length symbols). Therefore, the time required for analyzing all information of the macro block header 1115 is varied with the attributes (the processing method, the number of motion vectors and the like) of the macro block. It is possible to decide what processing is performed for the macro block following the macro block header 1115 by analyzing the information of the macro block header 1115. Therefore, it is preferable to minimize the quantity of the data included in the macro block header 1115, in order to perform decoding at a high speed.

As shown in FIG. 87, a single macro block header 1115 is transmitted with respect to each macro block. If the data quantity of the macro block header 1115 can be reduced, therefore, necessary image data can be transferred at a high speed with addition of necessary codes for improving the picture quality.

On the other hand, some systems are proposed for predictive image (reference image) detection in the motion-compensated interframe (or interfield) predictive coding. In order to attain excellent coding efficiency (to reduce the quantity of coded data), it is necessary to perform motion detection in accordance with a plurality of predictive image detection systems (predictive coding systems), thereafter select the optimum predictive image detection system, and detect motion vectors in accordance with the optimum predictive image detection system. Fields or a frame can be employed as a unit forming a screen. A single frame is formed by two fields (even and odd fields). For example, there are the following predictive image detection systems for the respective cases:

(A) In case of coding pixel data in units of fields:
  (a) A field image is split into a plurality of blocks each of P by Q pixels, and a single motion vector is detected (a single predictive image is generated) for each block.
  (b) Each block is further split into two blocks along the vertical direction on the screen, and a single motion vector is detected for each of the two blocks. Therefore, motion vectors for the upper and lower blocks are detected (two predictive images are generated) for each block of P by Q pixels.
(B) In case of coding pixel data in units of frames:
  (a) A frame image is split into a plurality of blocks each of P by Q pixels, and a single motion vector is detected (a single predictive image is generated) for each block.
  (b) Each block of P by Q pixels is split into two pixel groups of those belonging to the same fields, i.e., even and odd fields respectively, and a single motion vector is detected for each pixel group. Therefore, a motion vector for the even field pixel group and that for the odd field pixel group are detected for each block of P by Q pixels (two predictive images are generated for a single block).

As a structure for executing the plurality of predictive coding systems (predictive image detection systems), it is desirable to efficiently code the detected motion vectors in any predictive image detection system, in order to attain an effect of improving the coding efficiency. In relation to employment of such a plurality of predictive image detection systems (predictive coding systems), however, no consideration is made on a structure for reducing the amount of codes of motion vectors subjected to variable-length coding.

SUMMARY OF THE INVENTION

An object of the present invention is to provide a motion vector detector which can efficiently code motion vectors in any predictive coding system.

Another object of the present invention is to provide a motion vector detector which can simultaneously detect optimum vectors efficiently coded for a plurality of predictive modes in parallel with each other.

The motion vector detector according to the present invention includes evaluation value computer for obtaining evaluation values which indicate similarity between a current image block of a prescribed size to be subjected to motion vector detection in a current screen and respective ones of a plurality of reference image blocks in a search area in a reference screen related to the current image block and are decided in accordance with respective ones of a plurality of predetermined predictive modes in parallel with each other for the respective reference blocks, and optimum vector decider for receiving the evaluation values in the plurality of predictive modes for the respective reference blocks from the evaluation value computer and deciding optimum vectors as to the respective predictive modes in parallel with each other. The optimum vector decider includes circuitry for assigning priority to the respective reference image blocks in the search area as to the respective predictive modes, and candidate optimum vector decider for evaluating supplied evaluation values and deciding candidate optimum vectors for the current image block in accordance with the priority.

The priorities are assigned to evaluated reference image block positions (evaluation points), whereby a possibility of deciding an evaluation point of high priority as an optimum vector becomes high. A motion vector is produced on the basis of the optimum vector. In variable-length coding, the motion vector is subjected to variable-length coding after the difference between this motion vector and that immediately preceding the same in transmission order is obtained. Therefore, the value of the differential motion vector approaches to "0", and the variable code length of the motion vector of a macro block header area can be reduced in response.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a list of variable-length codes of motion vectors;

FIG. 4 schematically illustrates the overall structure of a motion vector detector according to an embodiment of the present invention;

DESCRIPTION OF THE PREFERRED EMBODIMENTS

[Principle Structure]

Figure 1:
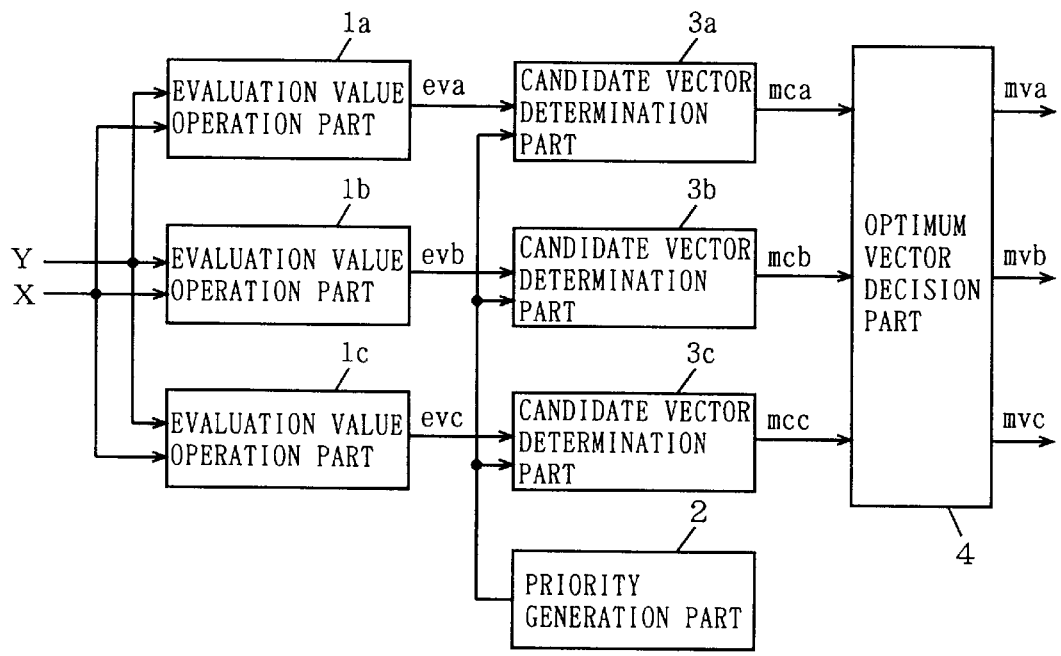
FIG. 1 illustrates the principle structure of a main part of a motion vector detector according to the present invention.

FIG. 1 schematically illustrates the principle structure of a motion vector detector according to the present invention. Referring to FIG. 1, the motion vector detector includes evaluation value operation parts 1a, 1b and 1c for receiving template block (current screen image block) pixel data X and search window block (reference screen image block) pixel data Y and computing evaluation values in accordance with different predictive modes respectively, a priority generation part 2 for generating priority information for search window blocks under evaluation, candidate vector determination parts 3a, 3b and 3c provided in correspondence to the evaluation value operation parts 1a to 1c respectively for evaluating evaluation values eva, evb and evc from the corresponding evaluation value operation parts 1a, 1b and 1c in accordance with the priority information from the priority generation part 2 and deciding candidate optimum vectors mca, mcb and mcc, and an optimum vector decision part 4 for receiving the candidate vectors mca, mcb and mcc from the candidate vector determination parts 3a to 3c in parallel with each other and deciding optimum vectors mva, mvb and mvc serving as motion vectors for the respective predictive modes. Motion vector for a single macro block is decided on the basis of these optimum vectors mva, mvb and mvc.

Each of the evaluation value operation parts 1a to 1c, the structure of which is described later in detail, obtains the absolute differential sum or a square differential sum of the template block pixel data X and the search window block pixel data Y, and computes evaluation values for search window blocks.

The candidate vector determination parts 3a to 3c receive displacement vector information of the search window blocks for the evaluation values respectively, and determine search window blocks having small evaluation values and high priority levels as the candidate optimum vectors mca, mcb and mcc. The candidate vector determination parts 3a to 3c have registers storing the candidate optimum vectors mca, mcb and mcc, evaluate the evaluation values supplied from the corresponding evaluation value operation parts 1a to 1c and the candidate optimum vectors mca, mcb and mcc in accordance with the priority levels thereof, decide the candidate optimum vectors mca, mcb and mcc, and hold the decided candidate optimum vectors mca, mcb and mcc in the registers.

The candidate optimum vectors mca to mcc are supplied from the candidate vector determination parts 3a to 3c to the optimum vector decision part 4. The optimum vector decision part 4 regularly stores the candidate optimum vectors mca to mcc, and decides the candidate optimum vectors mca to mcc stored therein as the optimum vectors when evaluation operation for a single search window block is completed. The priority information generated from the priority generation part 2, the specific priority of which is described later in detail, is allotted to each search window block in accordance with the distance between a prescribed position in a search area and the search window block.

Figure 2:
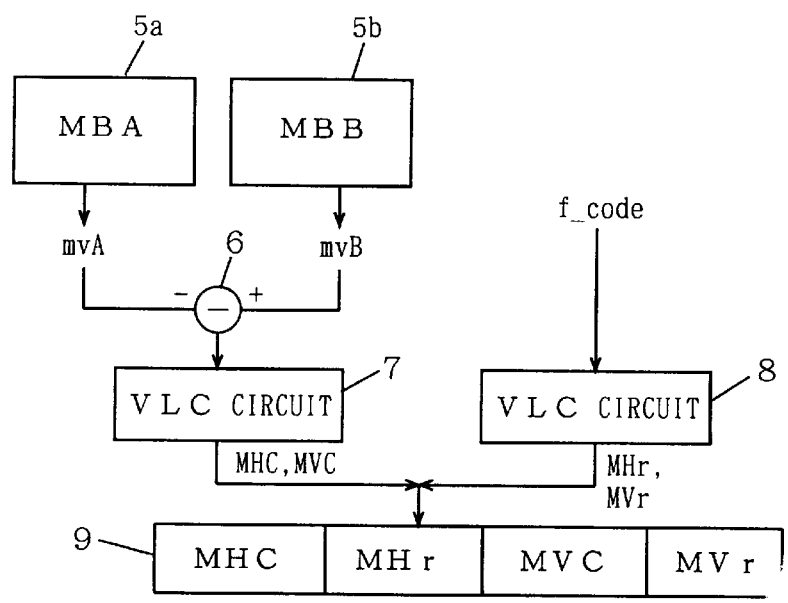
FIG. 2 schematically illustrates the structure of a part for generating variable-length coded motion vectors.
Figure 83:
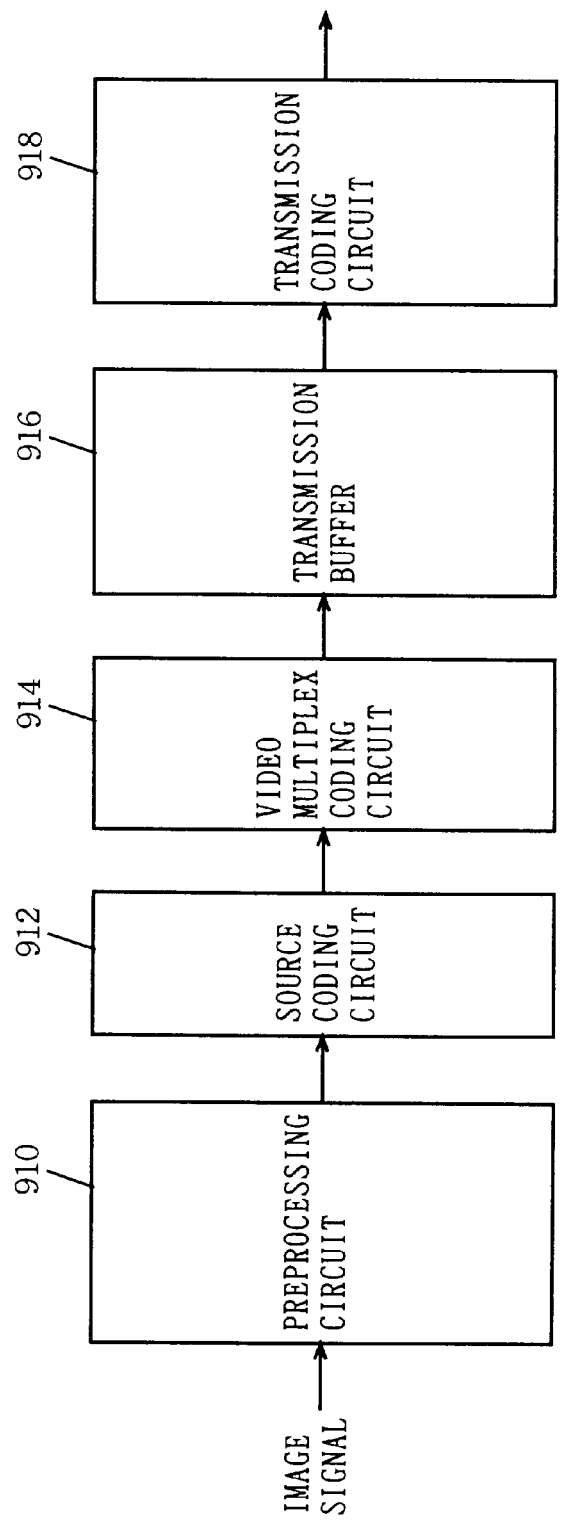
FIG. 83 schematically illustrates the overall structure of a conventional image signal coder.
Figure 84:
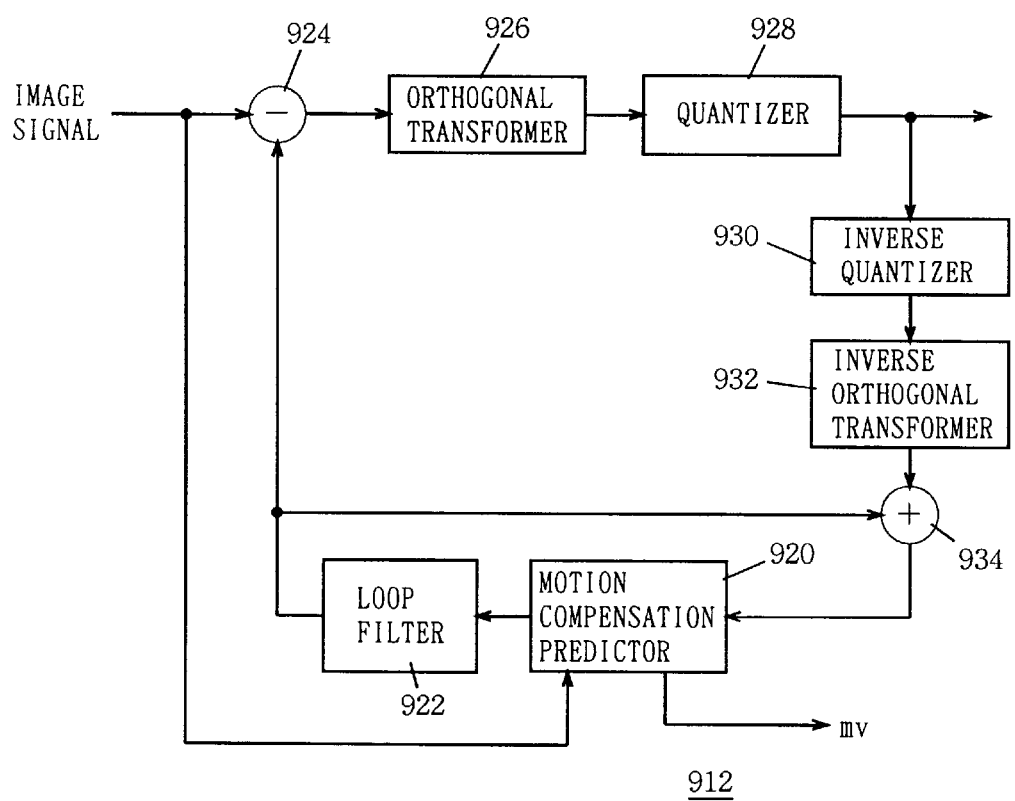
FIG. 84 schematically illustrates the structure of a source coding circuit shown in FIG. 83.
Figure 85A:
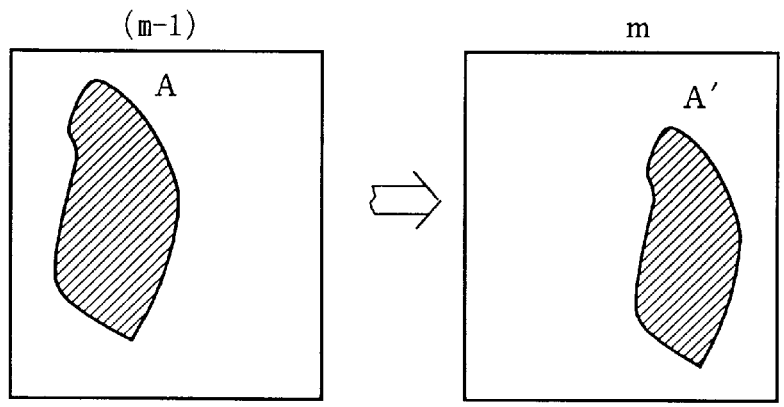
FIGS. 85A and 85B illustrate image motion compensation.
Figure 85B:
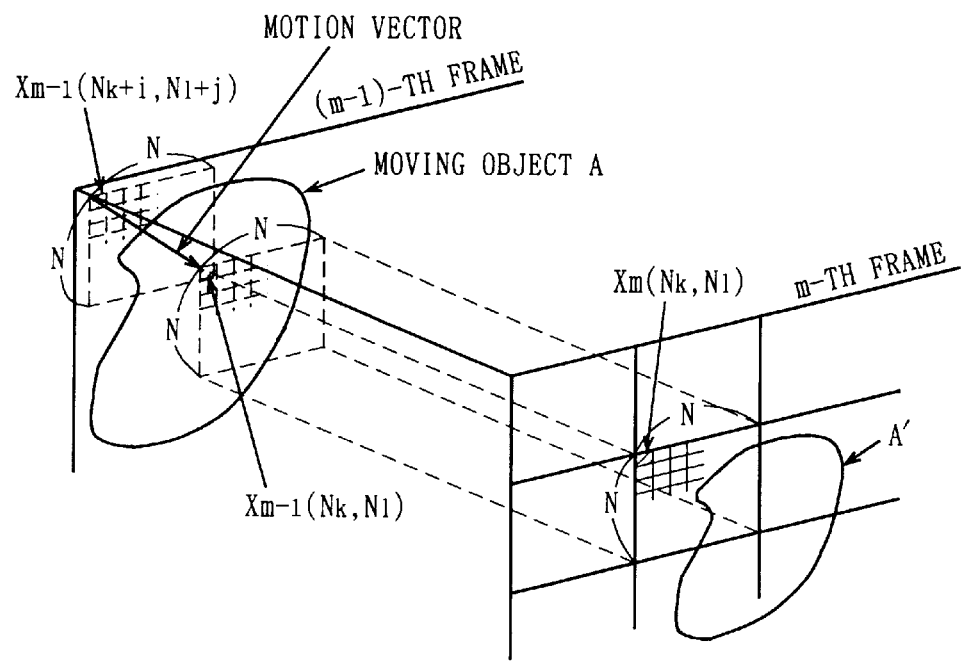
Figure 86:
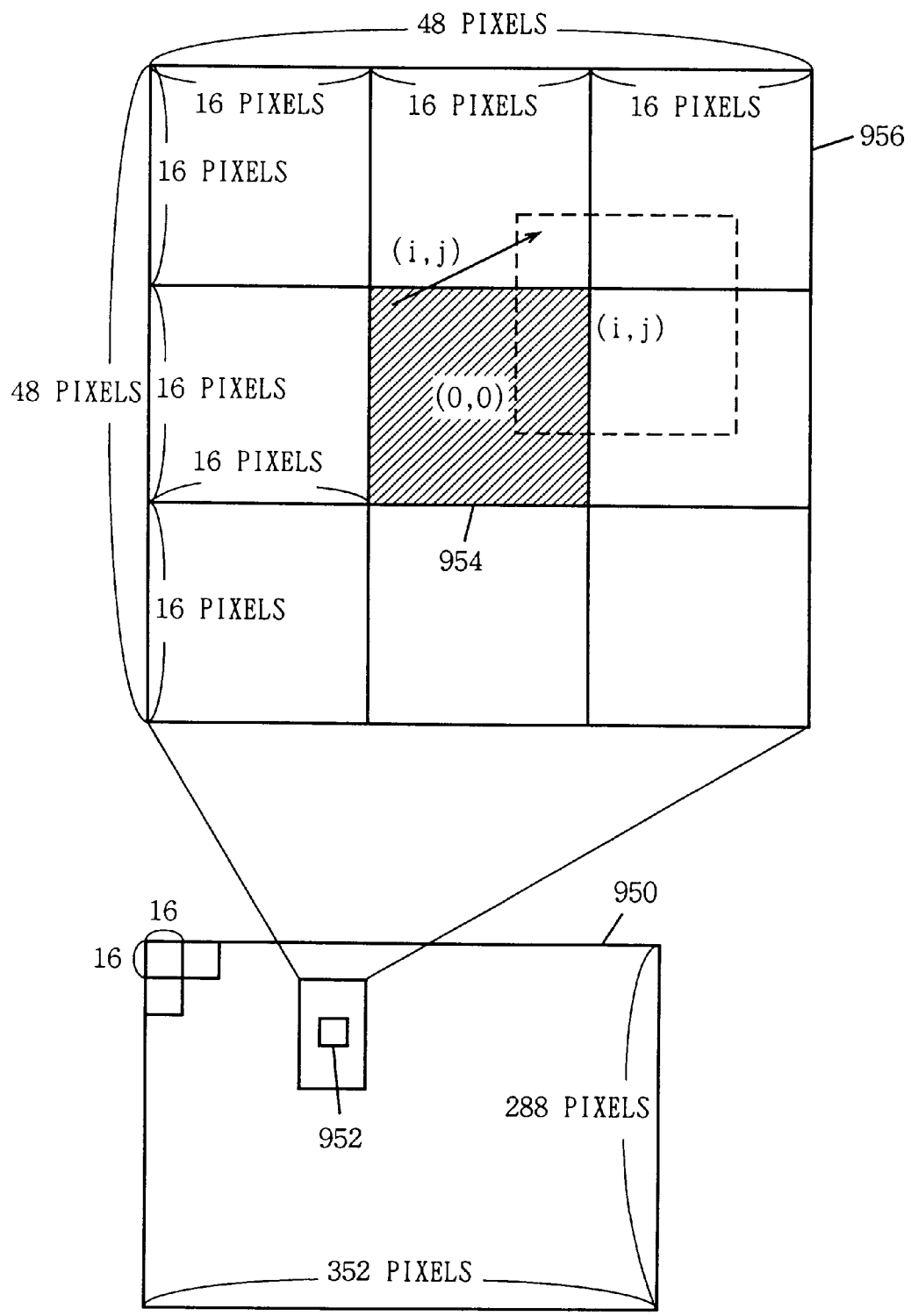
FIG. 86 illustrates an exemplary arrangement of a search area and a template block and the relation between the same and a motion vector in case of performing motion compensation by block matching.
Figure 87:
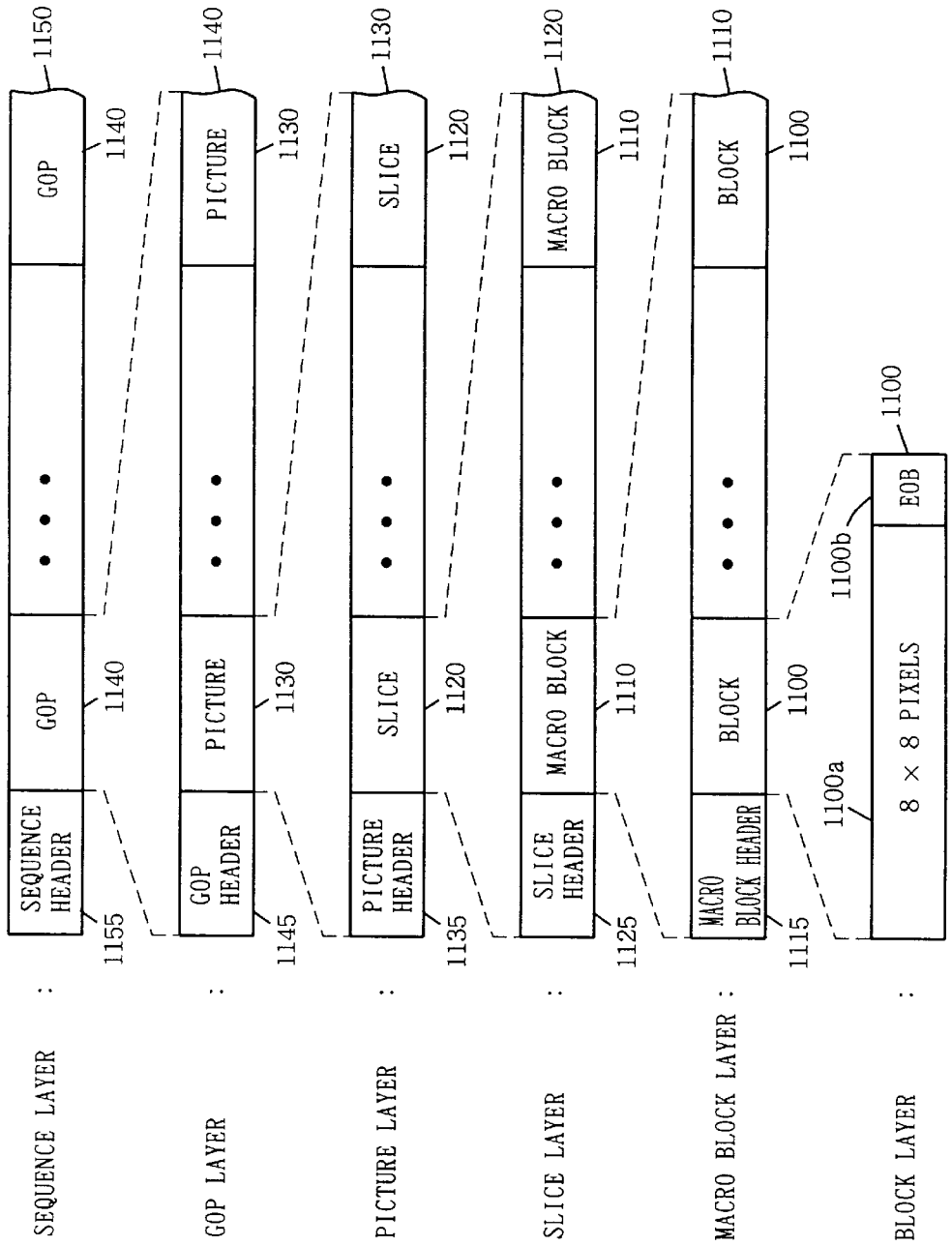
FIG. 87 schematically illustrates the structure of a bit stream of coded image data.

When the motion vector detector shown in FIG. 1 is employed, there is a high possibility that candidate motion vectors of high priority levels are decided as optimum vectors. Thus, there is a high possibility that the values of motion vectors of continuously processed macro blocks (template blocks) approximate to each other. This provides the following advantage:

FIG. 2 schematically illustrates video multiplex coding of motion vectors in the video multiplex coding circuit 214 shown in FIG. 83. It is assumed that mvA and mvB denote motion vectors for macro blocks 5a and 5b respectively. Coding of the motion vector mvB for the macro block (MBB) 5b is described. In this case, a subtracter 6 obtains the difference between the motion vectors mvA and mvB. The differential value outputted from the subtracter 6 is supplied to a VLC circuit 7. The VLC circuit 7 converts the differential motion vector information to a variable-length code word, and outputs horizontal and vertical components MHC and MVC of the differential motion vector information. On the other hand, another VLC circuit 8 is supplied with a code f_code indicating the range of a search area.

Figure 88:
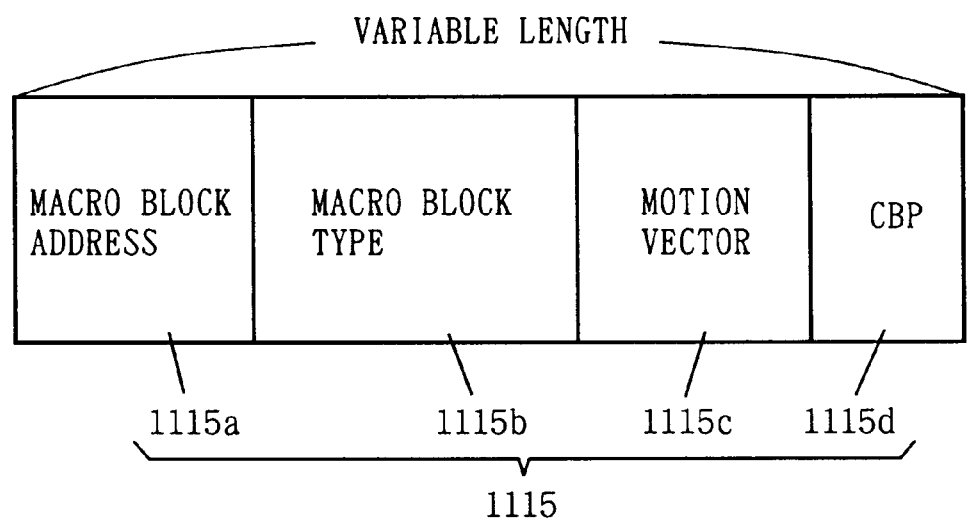
FIG. 88 schematically illustrates the structure of a macro block header of a macro block layer shown in FIG. 87.

The VLC circuit 8 generates an integer of a prescribed number of bits in accordance with the search area indication code f_code, converts the generated integer to variable-length code word, and generates codes MHr and MVr. These codes MHr and MVr are employed for modifying bits for the horizontal and vertical variable-length motion vector components MHC and MVC respectively. The horizontal and vertical motion vector components are generated with the motion vector components MHC and MVC in high-order bit positions and the codes MHr and MVr in low-order bit positions respectively. Thus, a motion vector component 9 is generated and transmitted as a field in the bit stream. The motion vector component 9 shown in FIG. 2 is stored in the motion vector area 1115c shown in FIG. 88.

The codes MHr and MVr are uniquely decided by the size of the search area (uniquely decided by the code f_code). On the other hand, the values of the variable-length motion vector components MHC and MVC are provided by the differential value. If the values of the motion vectors mvA and mvB of the macro blocks 5a and 5b are substantially identical to each other, therefore, the values of the variable-length motion vector components MHC and MVC are close to zero.

FIG. 3 is a list of variable-length codes of the variable-length motion vector components MHC and MVC. As shown in FIG. 3, the bit number of the variable-length code is 1 when the differential value is zero, and increased as the absolute value of the differential value is increased. If the values of the motion vectors mvA and mvB are substantially identical, therefore, the bit number of the motion vector component 9 to be transmitted can be reduced, and a high data transmission rate can be implemented in response. Further, the quantity of data to be transmitted is small, and hence the motion vector component 9 can be efficiently coded for any predictive system. In addition, another information for improving the picture quality can be additionally transmitted by reducing the bit number of the motion vector component 9.

When the search area is widened, the value of the code f_code is increased, and the bit numbers of the codes MHr and MVr from the VLC circuit 8 are also increased. The search area is widened when an image of a screen moves at a high speed, for example, and an optimum predictive image can be detected by widening the search area. At this time, correct motion vector information can be transmitted without increasing the overall bit number of the motion vector component 9 if the bit numbers of the variable-length motion vector components MHC and MVC are reduced, whereby detection of the optimum predictive image and image restoration can be performed and the picture quality can be improved in any mode.

[Embodiment]

FIG. 4 is a block diagram schematically showing the overall structure of a motion vector detector according to an embodiment of the present invention. The structure shown in FIG. 4 is adapted to code pixel data in units of frames.

Referring to FIG. 4, the motion vector detector includes an input part 12 for receiving search window (described later) pixel data Y and template block pixel data X included in a prescribed region of a search area and outputting the received data X and Y at prescribed timings respectively, an operation part 10 for computing three evaluation values (e.g., absolute differential sums) $\Sigma|a-b|$, $\Sigma o|a-b|$ and $\Sigma e|a-b|$ as to a displacement vector for a single template block on the basis of the data X and Y supplied from the input part 12, and a compare part 13 for receiving the three evaluation values $\Sigma|a-b|$, $\Sigma o|a-b|$ and $\Sigma e|a-b|$ obtained in the operation part 10, evaluating the same in accordance with priority assigned to each search window block and deciding a motion vector for each predictive mode in accordance with the results of the evaluation.

The evaluation value $\Sigma|a-b|$ corresponds to that of a frame predictive mode obtaining the evaluation value using all pixels of a current image block (template block), where a and b represent template block pixel data and corresponding pixel data of a reference image block (search window block) respectively. The evaluation value $\Sigma o|a-b|$ corresponds to that in accordance with an odd field predictive mode detecting a predictive image using pixels included in an odd field. The evaluation value $\Sigma e|a-b|$ is that computed in accordance with an even field predictive mode detecting a predictive image using pixels included in an even field.

The compare part 13 outputs motion vectors (optimum vectors) decided in accordance with the respective predictive modes, i.e., a block motion vector Vb decided in accordance with the frame predictive mode, an odd field block motion vector Vo decided in accordance with the odd field predictive mode and an even field block motion vector Ve decided in accordance with the even field predictive mode in parallel with each other.

Referring again to FIG. 1 in relation to the structure shown in FIG. 4, the evaluation value operation parts 1a to 1c correspond to the operation part 10, and the priority generation part 2, the candidate vector determination parts 3a to 3c and the optimum vector decision part 4 correspond to the compare part 13.

The operation part 10, the structure of which is described later, includes a processor array 10a including a plurality of element processors arranged in a two-dimensional array in correspondence to the respective pixels of the template block, and a total sum part 10b for sorting operation result values (absolute differential values in the embodiment) outputted from the element processors of the processor array 10a in accordance with the predictive modes and adding up the same for the respective classifications for obtaining the total sums. The total sum part 10b outputs the evaluation values $\Sigma|a-b|$, $\Sigma o|a-b|$ and $\Sigma e|a-b|$ for the respective predictive modes in parallel with each other.

The different element processors included in the processor array 10a store data of different template block pixels. The pixel data of the reference image block in the search area related to the template block are successively transmitted along a one-way direction through the element processors. The element processors provided in the processor array 10a execute operations of the template block pixel data and pixel data of a single search window block (reference image block). Therefore, each element processor computes the component of an evaluation value indicating the correlationship between a single template block and the search window block. The processor array 10a regularly stores the template block pixel data in a cycle for obtaining the optimum vectors for the template block. The search window block pixel data are shifted between the element processors in the processor array 10a by one pixel every operation cycle (evaluation value computing cycle).

The element processors are arranged in correspondence to the respective pixels of the template block. In the even and odd field predictive modes, the evaluation values are computed using pixels belonging to even and odd fields of the template block (and the search window block) respectively. A frame includes even and odd fields, and even and odd field pixels are alternately arranged on horizontal scan lines on the screen. Therefore, outputs of the element processors arranged in correspondence to even and odd field pixels express the components of evaluation values in accordance with the even and odd field predictive modes respectively. It is possible to compute evaluation values for the respective ones of the plurality of predictive modes by classifying such outputs of the element processors in response to the positions of the element processors arranged in the processor array 10a. In case of the frame predictive mode, the evaluation values of the even and odd fields are simply added up with each other. A specific structure of the operation part 10 shown in FIG. 4 is now described.

Figure 5:
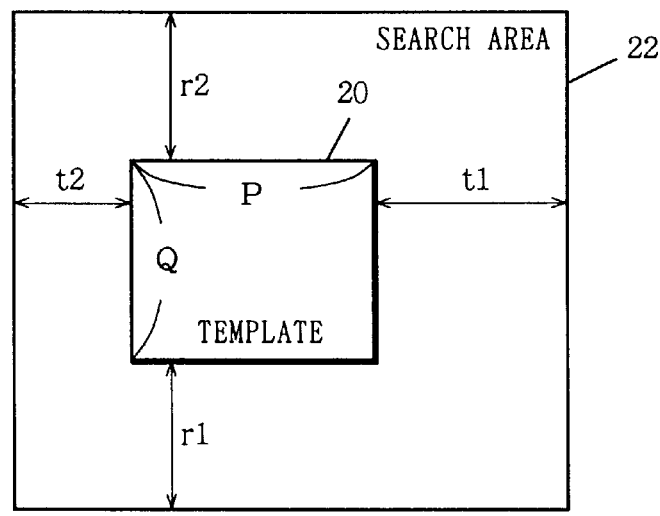
FIG. 5 illustrates exemplary structures of a search area and a template block employed by the motion vector detector shown in FIG. 4.

FIG. 5 illustrates the sizes of a template block 20 and a search area 22 utilized in the embodiment of the present invention. The template block 20 includes pixels arranged in Q rows and P columns. The search area 22 has horizontal and vertical search ranges of +t1 to −t2 and +r1 to −r2. Namely, the search area 22 includes (t2+P+t1)×(r2+P+r1) pixels. The size of the search area 22 is specified by the code f_code shown in FIG. 2.

Figure 6:
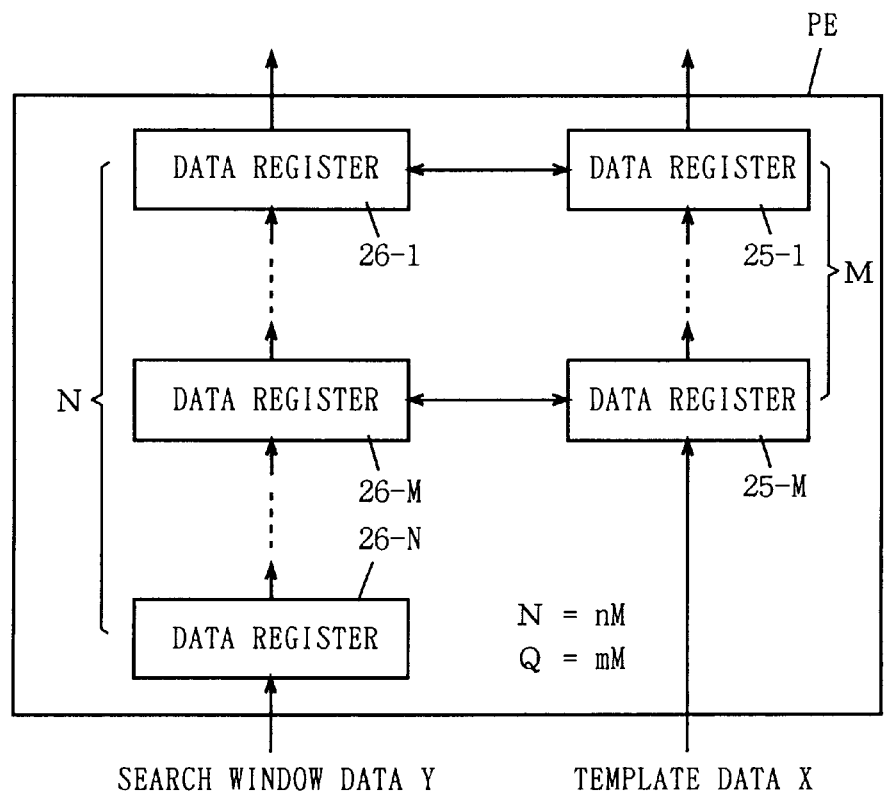
FIG. 6 schematically illustrates the structure of an element processor included in a processor array shown in FIG. 4.

FIG. 6 schematically illustrates the structure of each element processor PE included in the processor array 10a shown in FIG. 4. Referring to FIG. 6, the element processor PE includes M cascade-connected data registers 25-1 to 25-M for storing the template block pixel data X. These data registers 25-1 to 25-M store different template block pixel data X. The element processor PE also includes cascade-connected data registers 26-1 to 26-N of N stages for storing the search window pixel data Y. The number N is an integer multiple (n) of the number M. The number Q of the rows of the template block 20 shown in FIG. 6 is an integer multiple (n) of the stage number M of the data registers 25-1 to 25-M.

The element processor PE executes a prescribed operation (e.g., an absolute differential value operation) through the template block pixel data X stored in the M data registers 25-1 to 25-M. In this operation, the data registers 26-1 to 26-N for storing the search window pixel data Y may be in one-to-one correspondence to the data is registers 25-1 to 25-M for storing the template block pixel data X (N=M), for executing the prescribed operation through the data stored in the corresponding registers.

The element processor PE executes the operation in relation to M template block pixel data (hereinafter simply referred to as template data) X. Operation means (not shown in FIG. 6) provided in the element processor PE is utilized in a time-division multiplexing manner for the M data registers 25-1 to 25-M. In this case, therefore, single operation means is provided in each element processor PE. Each element processor PE is provided with a plurality of data registers 25-1 to 25-M for storing the template data X, whereby the number of the element processors PE is reduced. The outputs of the plurality of data registers 25-1 to 25-M for storing the template data X are selected in the multiplexing manner and supplied to the operation means so that the operation is executed a plurality of times in a transmission cycle for the search window block pixel data (hereinafter referred to as search window data) Y, whereby each element processor PE can output a plurality of components of evaluation values in the multiplexing manner, and the structure of the total sum part 10b for adding up the outputs from the element processors PE of the processor array 10a can be reduced (this is because the number of input signal lines for the total sum part 10b can be reduced). The search window data Y and the template data X are only unidirectionally transmitted as shown by arrows in FIG. 6.

Figure 7:
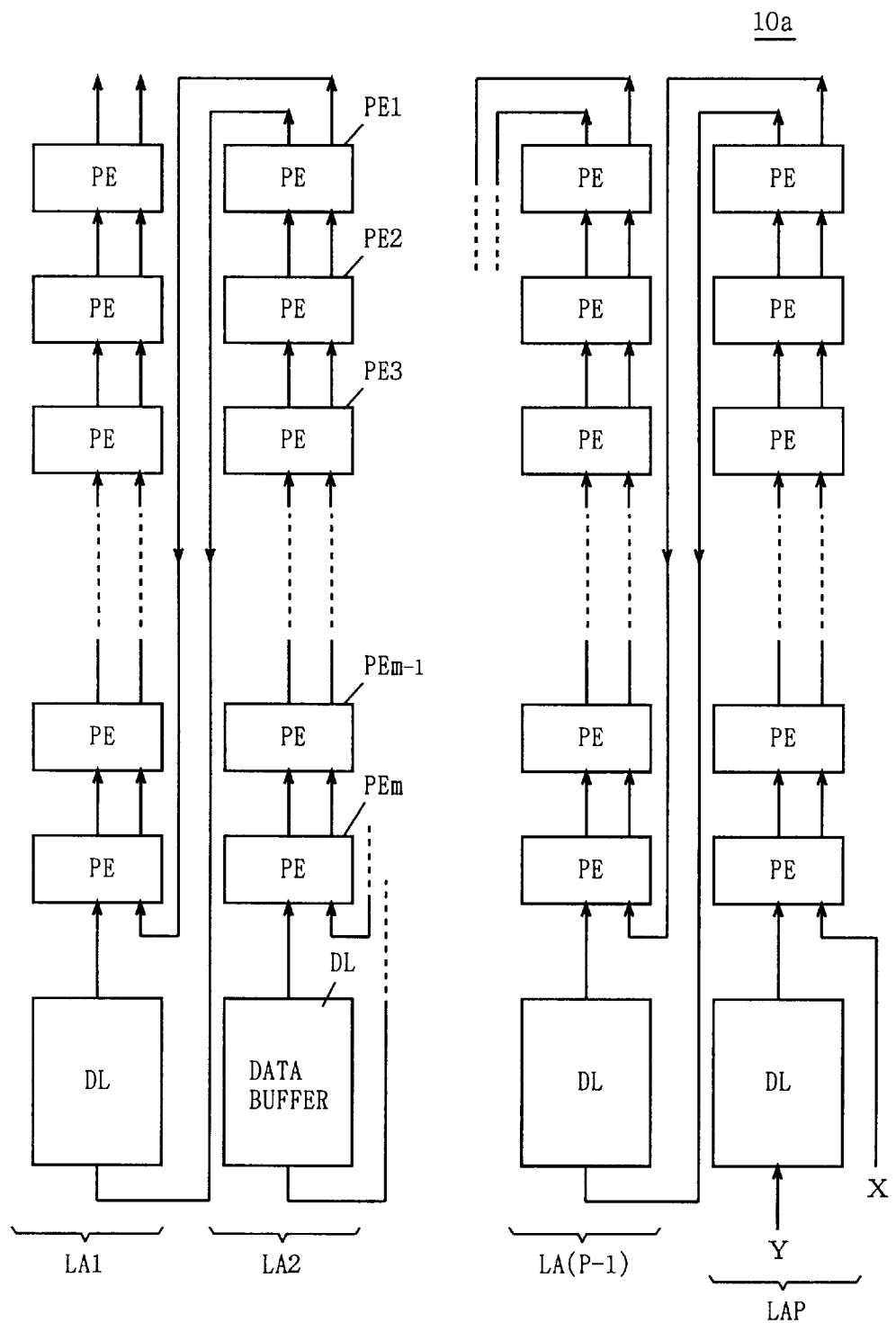
FIG. 7 schematically illustrates the overall structure of the processor array shown in FIG. 4.

FIG. 7 illustrates the structure of the processor array 10a shown in FIG. 4. Referring to FIG. 6, the processor array 10a includes linear processor arrays LA1 to LAP arranged in P columns. Each of the linear processor arrays LA1 to LAP, which are identical in structure to each other, includes m element processors PE1 to PEm arranged cascadedly, and a data buffer DL storing R (=r1+r2) search window data Y and serving also as delay means.

The element processors PE1 to PEm transmit the search window data Y and the template data X along a single direction (the vertical direction in FIG. 7) in each linear processor array LA (generically indicating LA1 to LAP). In data transfer to the adjacent linear processor array LA, the most upstream element processor PE1 supplies the search window data Y to the data buffer DL included in the upperstream linear processor array LA (the left side processor array LA in FIG. 7), and transmits the template data X to the most downstream element processor PEm of the upstream linear processor array LA.

Namely, the search window data Y are successively unidirectionally transmitted in the processor array 10*a* through the element processors PE and the data buffers DL, while the template data X are unidirectionally transmitted through the element processors PE alone. While the element processors PE are arranged in the form of a matrix of rows and columns in the structure shown in FIG. 7, the linear processor arrays LA1 to LAP receive the search window data Y and the template data X outputted from the most upstream element processors PE1 of the preceding stage linear processor arrays LA respectively. Therefore, the linear processor arrays LA1 to LAP which are connected cascadedly are substantially equivalent to a one-dimensional processor array.

Each data buffer DL has a delay function or a buffer function as hereinabove described, and has a function of outputting the supplied search window data Y in a first-in first-out (FIFO) manner. The data buffer DL may be formed by R data latches having shift functions (R stages of shift registers), or a register file storing R data.

Consider that a frame image 36 is split into 8×8=64 macro blocks and a motion vector is detected for each macro block. It is assumed that a template block TB1 for motion vector detection is formed by the macro block shown by slant lines in the one-frame image 36. For this template block TB1, motion vectors are detected in accordance with the three predictive modes respectively.

Figure 8A:
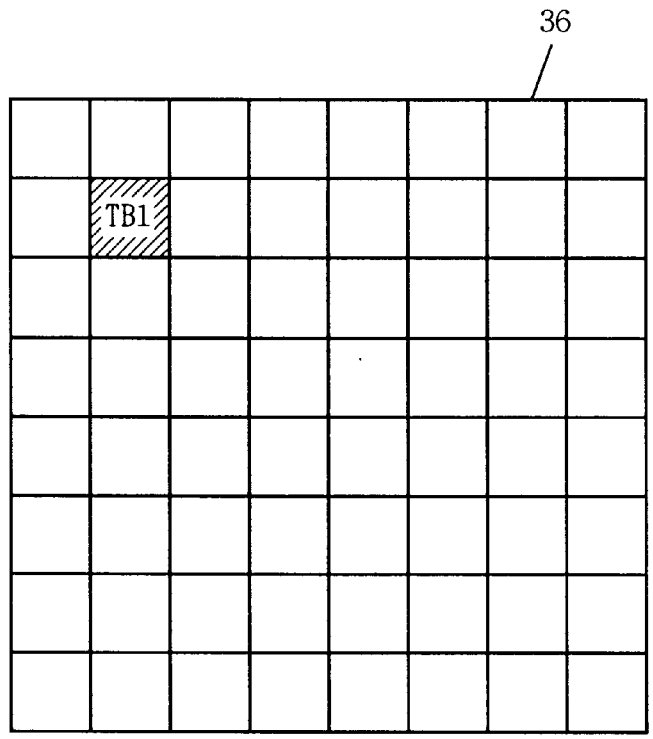
FIG. 8A illustrates an on-screen position of a template block.
Figure 8B:
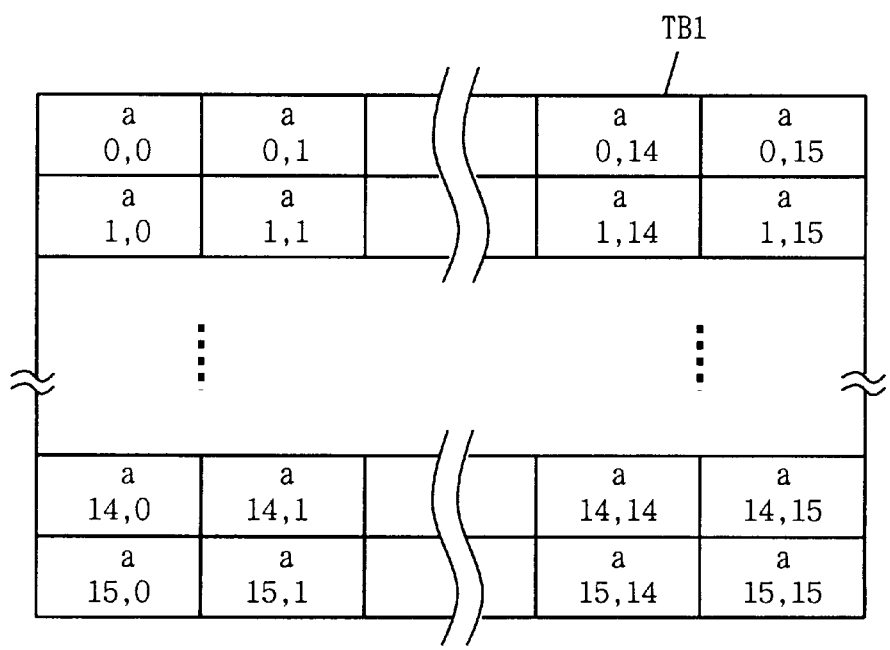
FIG. 8B illustrates an exemplary pixel arrangement of the template block shown in FIG. 8A.

It is assumed that the template block TB1 includes template data a(0, 0) to a(15, 15) arranged in 16 rows and 16 columns, as shown in FIG. 8B. In the template block TB1, pixels belonging to even and odd fields are arranged on the alternate rows. A system of detecting a motion vector by computing evaluation values using all template block pixels a(0, 0) to a(15, 15) shown in FIG. 8B corresponds to the frame predictive system, and a block motion vector Vb is decided.

Figure 9A:
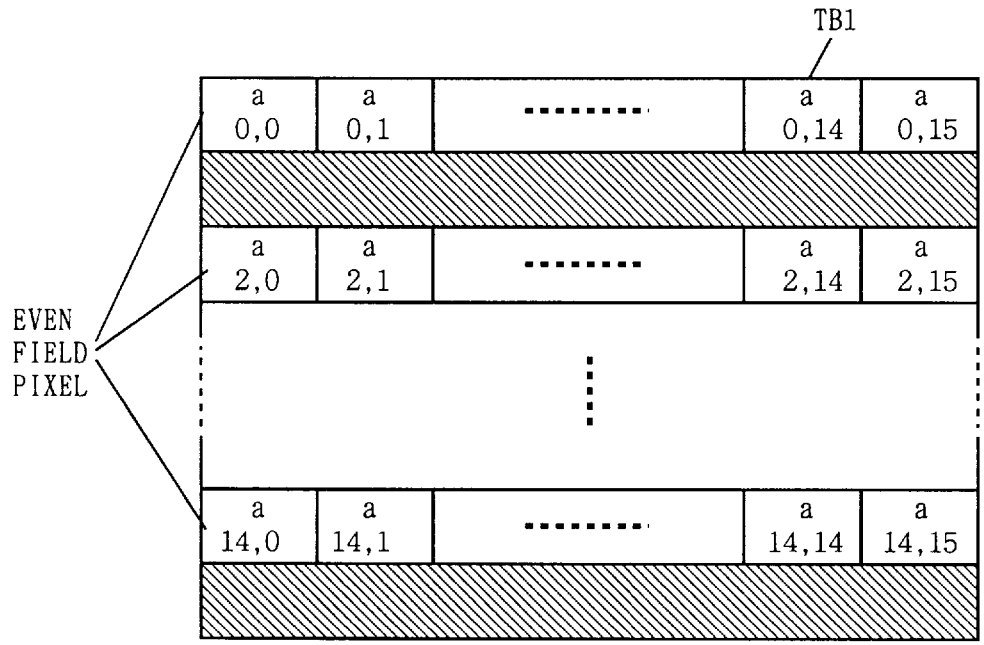
FIGS. 9A and 9B illustrate the structures of even and odd field subtemplate blocks respectively.

As shown in FIG. 9A, a predictive mode of computing evaluation values using pixels a(2k, 0) to a(2k, 15) included in an even field arranged on even rows (zeroth, second, . . . 14-th rows) of the template block TB1 provides an even field block motion vector Ve, where k=0 to 7.

Figure 9B:
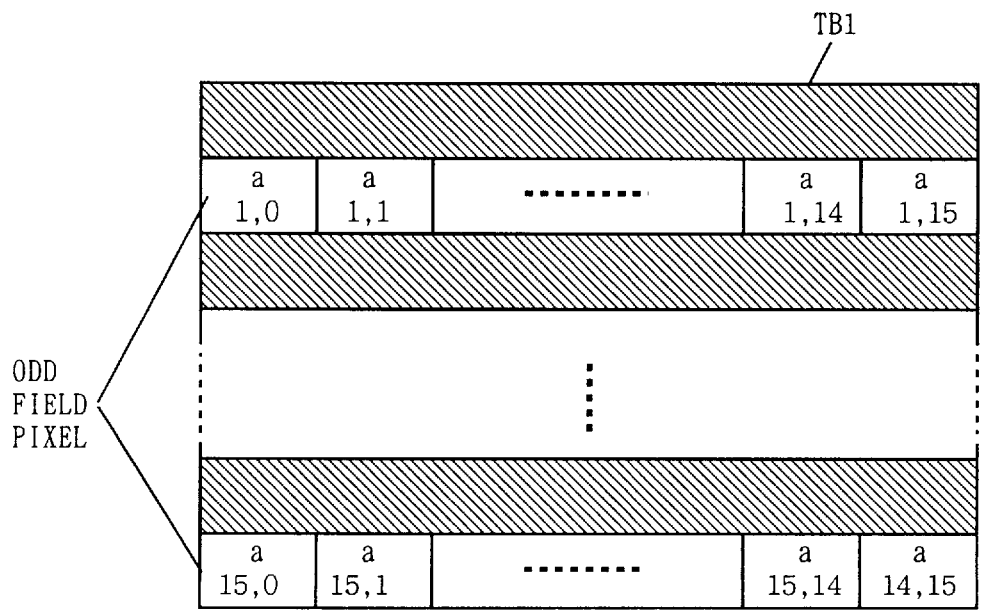

As shown in FIG. 9B, a predictive mode of computing evaluation values using pixels a(2k+1, 0) to a(2k+1, 15) arranged on first, third, . . . 15-th rows of the template block TB1 is an odd field predictive mode, and provides an odd field block motion vector Vo.

Figure 10:
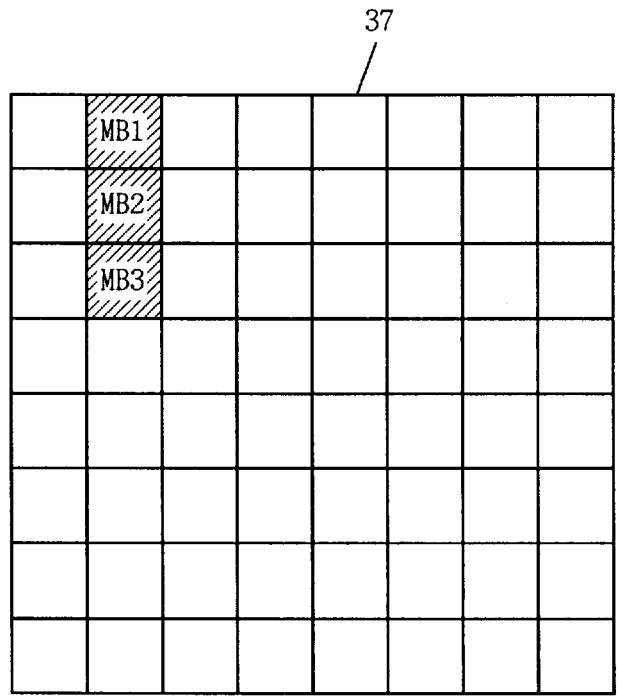
FIG. 10 illustrates a split structure of a reference image screen and an area including macro block pixel data stored in the processor array.
Figure 11:
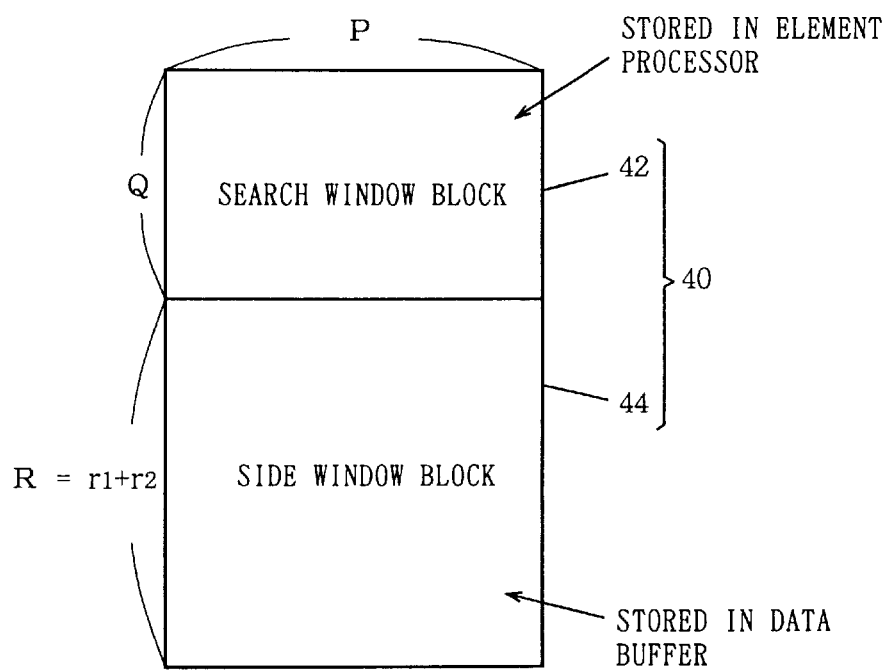
FIG. 11 illustratively shows states of reference image pixel data stored in the processor array shown in FIG. 4.

In order to search for a reference image for detecting a predictive image, the processor array 10*a* stores three macro blocks MB1, MB2 and MB3 in a preceding frame image 37, as shown in FIG. 10. The data registers 25-1 to 25-M of the element processors PE store the data of the pixels included in the template block TB1 shown in FIG. 8A. Each element processor PE stores data of Q/M vertically arranged template block pixels. Further, each element processor PE stores data of Q·n/m vertically adjacent search window block pixels. Therefore, the element processors PE of the processor array 10*a* store Q vertical data and P horizontal data, i.e., P·Q search window pixel data in total, as shown in FIG. 11. The P·Q pixel data are hereinafter referred to as search window block pixel data. The remaining R(=r1+r2)·P search window pixel data are stored in the data buffers DL. A block 44 formed by the pixel data stored in the data buffers DL is hereinafter referred to as a side window block.

In the following description, it is assumed that a search window 40 is formed by a search window block 42 and the side window block 44 shown in FIG. 11.

Figure 12:
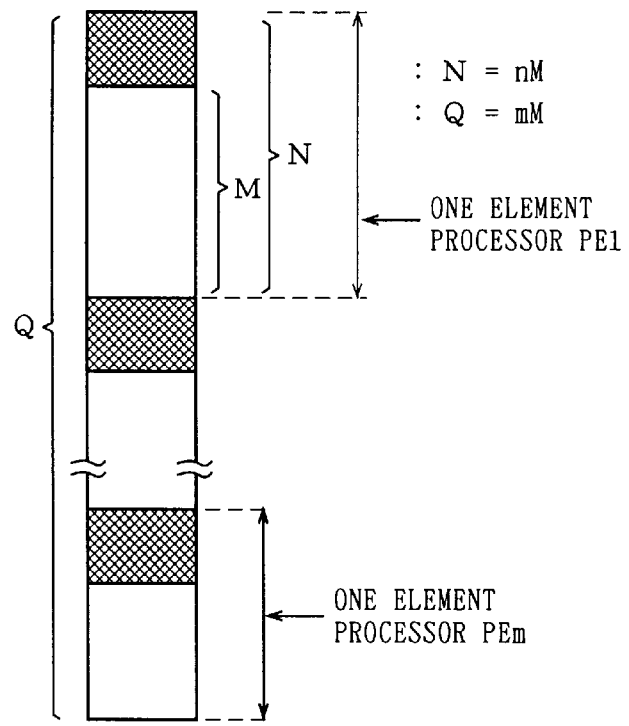
FIG. 12 illustratively shows states of reference image block pixel data and current image block pixel data stored in a linear processor array in the processor array shown in FIG. 4.
Figure 13:
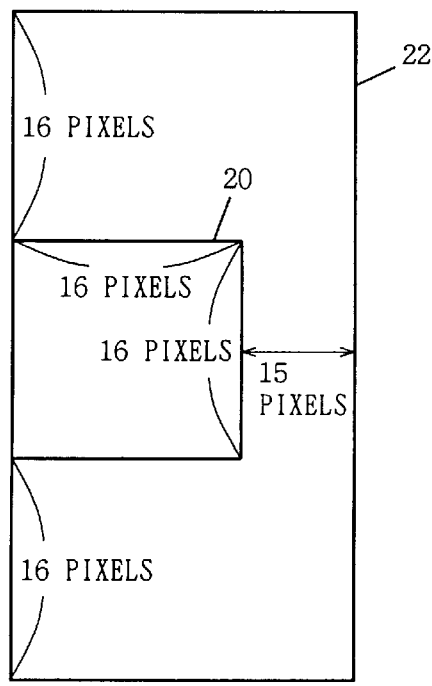
FIG. 13 illustrates a specific example of a motion vector search range and a current image block.

In general, each element processor PE stores M template block pixel data and N search window pixel data, as shown in FIG. 12. The element processors PE1 to PEm of each linear processor array LA store Q vertically adjacent search window pixel data and template pixel data. Specific operations are now described.

In order to simplify the following description, the following conditions are assumed:

Template Block Size: P=Q=16

Motion Vector Search Range: r1=r2=16, t2=0, t1 =15, m=16, M=N=1

In the above assumption, a motion vector search range 22 includes (16+16+16)×(16+15)=1488 pixels for a frame image. The template block 20 is formed by 16×16=256 pixels. From the condition M=N=1, each element processor PE stores single search window block pixel data and single template block pixel data.

Figure 14:
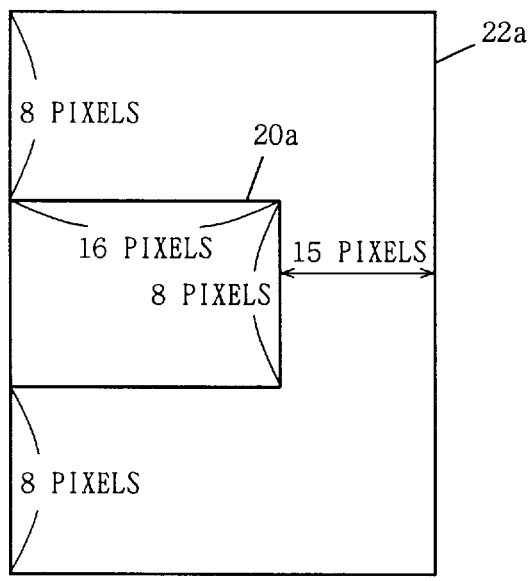
FIG. 14 illustrates a specific example of a current image block and a search area in case of employing an even or odd field subtemplate block.

FIG. 14 illustrates the structure of a search area for pixels of an even or odd field under the above assumption. As shown in FIG. 14, a template block of a frame structure includes pixels of even and odd fields. Therefore, a subtemplate block 20*a* formed by the pixels of the even or odd field has a structure of 16 by 8 pixels. Similarly, the search area also includes pixels of even and odd fields, and hence a subsearch area 22*a* is formed by (8+8+8)×(16+15)=744 pixels of the even or odd field. Namely, displacement vectors in frame and field predictive modes are different from each other. This is because the number of rows in each macro block of the frame unit is twice that in each macro block of the field unit.

Figure 15:
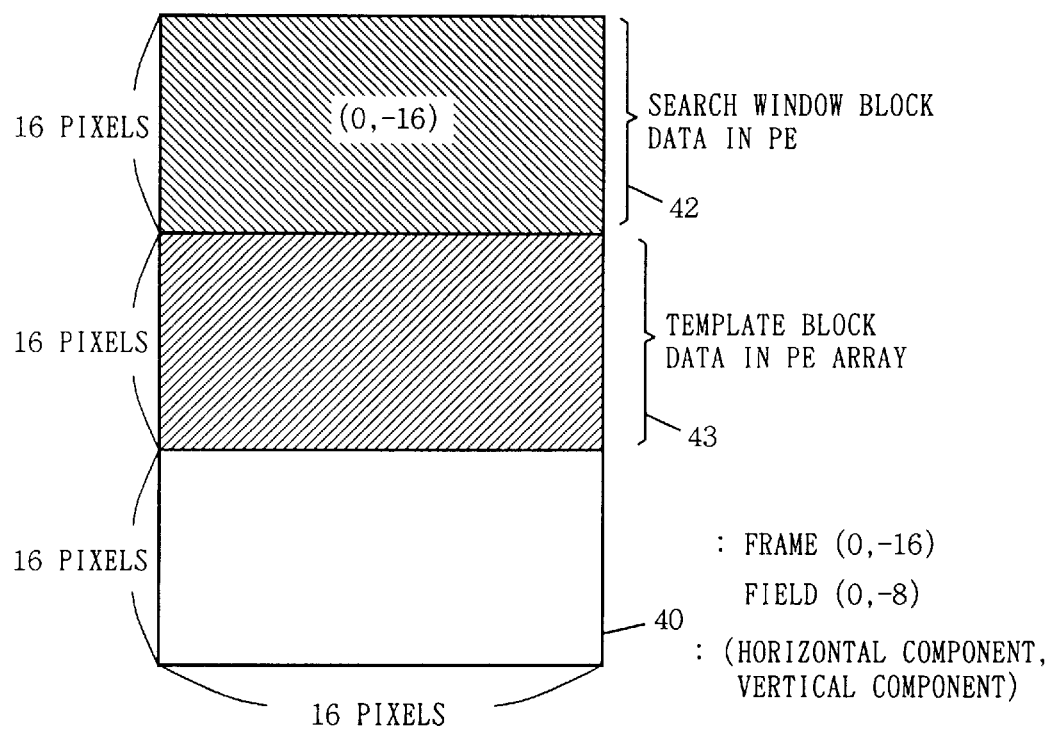
FIG. 15 illustrates situations of reference image block pixel data and template block pixel data stored in the processor array shown in FIG. 4.

FIG. 15 illustrates a state of data storage in the processor array 10*a* in a first operation cycle of motion vector detection. Referring to FIG. 15, pixel data of a template block 43 consisting of pixel data of 16 rows and 16 columns are stored in corresponding element processors PE in the processor array 10*a*. Further, pixel data of a search window block 42 of 16 rows and 16 columns are stored in respective element processors PE of the processor array 10*a*. This state corresponds to a frame displacement vector (0, −16) for the template block 20. The term "frame displacement vector" indicates a displacement vector employed for performing a predictive operation in accordance with the frame predictive mode. For an odd subtemplate block 20*a* formed by the pixels of the odd field, a displacement vector for the pixels of the odd field of the search window block 42 is employed and hence the state corresponds to an odd displacement vector (0, −8). Similarly for an even subtemplate block 20*a* including only the pixels included in the even field, the state corresponds to a displacement vector for the even field, i.e., an even field displacement vector (0, −8).

In this state, each element processor PE obtains a absolute differential value between the components of evaluation values of the template block pixel data stored therein and the corresponding search window block pixel data. The absolute differential values obtained in the respective element processors PE are transmitted to the total sum part 10b shown in FIG. 4. The total sum part 10b computes the total sum (odd subblock evaluation value) of the absolute differential values transmitted from the element processors PE corresponding to the odd subtemplate block and the total sum (even subblock evaluation value) transmitted from the element processors PE arranged in correspondence to the even subtemplate block independently of and in parallel with each other. The even and odd subblock evaluation values are computed and thereafter added up with each other. This addition corresponds to computing of the total sum of the absolute differential values transmitted from all element processors PE of the processor array 10a, whereby an evaluation value (block evaluation value) corresponding to the template block in accordance with the frame predictive mode is obtained. In the above operation, evaluation values for respective displacement vectors in accordance with the three predictive modes are obtained. The distinction between the predictive modes merely resides in the employed pixels. Therefore, evaluation values for a plurality of predictive modes can be computed in parallel with each other by classifying the outputs of the element processors PE.

Then, only the search window block pixel data are transferred by one pixel while holding the template block pixel data in the element processors PE of the processor array 10a.

Figure 16A:
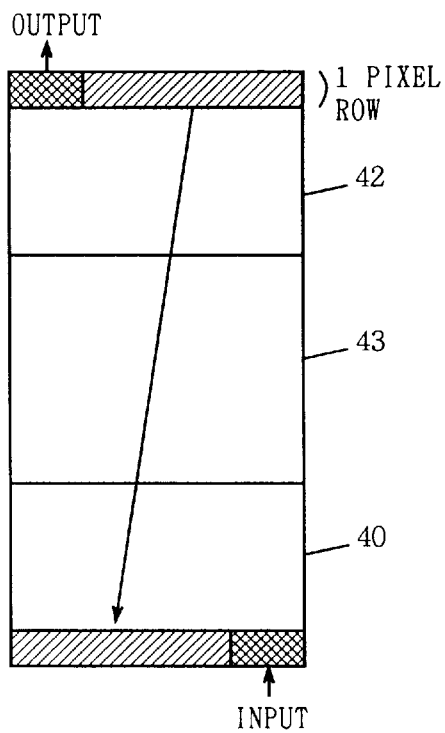
FIG. 16A illustrates a transfer state of search window pixel data in the processor array in case of horizontally moving a search window by one row, FIG. 16B illustratively shows the status of movement of the search window pixel data in the processor array.

In this state, the data of the uppermost row in the search window block 42 is transferred to the data buffer DL of the adjacent column and the first pixel data of the search window block 42 is shifted out in response, as shown in FIG. 16A. New search window block pixel data is inputted in parallel with this. FIG. 16A shows the search window block pixel data shifted out from and newly shifted in the data buffer DL in double slant lines respectively.

Figure 16B:
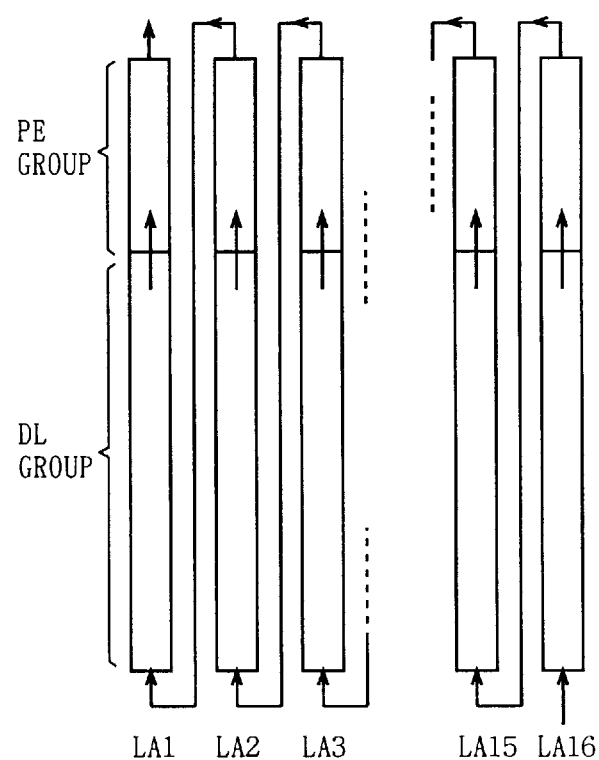
FIG. 16C illustrates a distributed state of the search window image data, stored in the processor array after inputting of the search window pixel data, in the search area.

In this state, the element processors PE of the processor array 10a store pixel data of a search window block 42a downwardly displaced by one row in the search window 40, as shown in FIG. 16B. Namely, the linear processor arrays LA1 to LA16 upwardly shift the search window pixel data by one pixel in FIG. 16B. In the linear processor arrays LA1 to LA16, the data buffers DL store the search window pixel data newly shifted therein. The data newly shifted in the processor group (PE group) are supplied from the corresponding data registers. Namely, the element processor group (PE group) stores the pixel data of the search window block 42a downwardly displaced by one pixel in the search window 40 through this one-pixel shift operation.

Figure 16C:
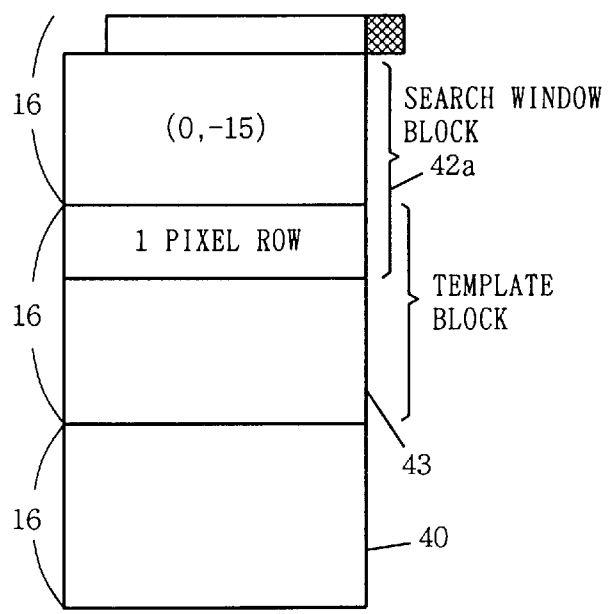

In this state, the block displacement vector for the template block 43 and the search window block 42a is (0, −15), as shown in FIG. 16C.

Figure 17A:
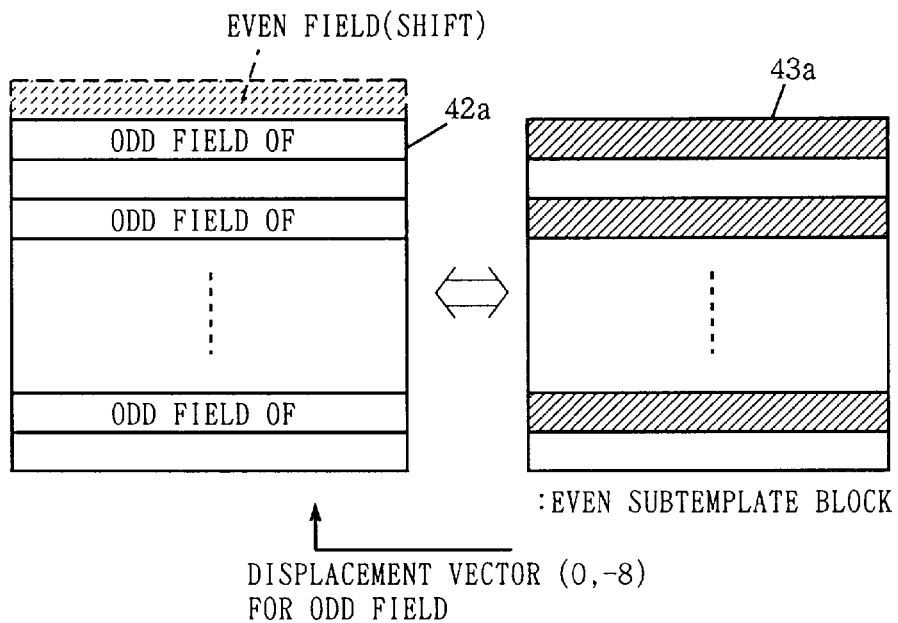
FIG. 17A illustratively shows a displacement vector for an odd field of an even field subtemplate block, and FIG. 17B illustratively shows a displacement vector for an even field of an odd field subtemplate block.

In this shift operation, even field pixels are shifted out from and in the search window block 42 by one row. Namely, the displacement vector for the even field moves by (0, −1). As to the odd field, the search window block 42a includes the same pixel data as those in the preceding cycle, and the displacement vector for the odd field remains unchanged. As shown in FIG. 17A, therefore, an even subtemplate block 43a (including the corresponding pixel data of slant areas in the processors PE) has a displacement vector (0, −8) for the odd field OF.

Figure 17B:
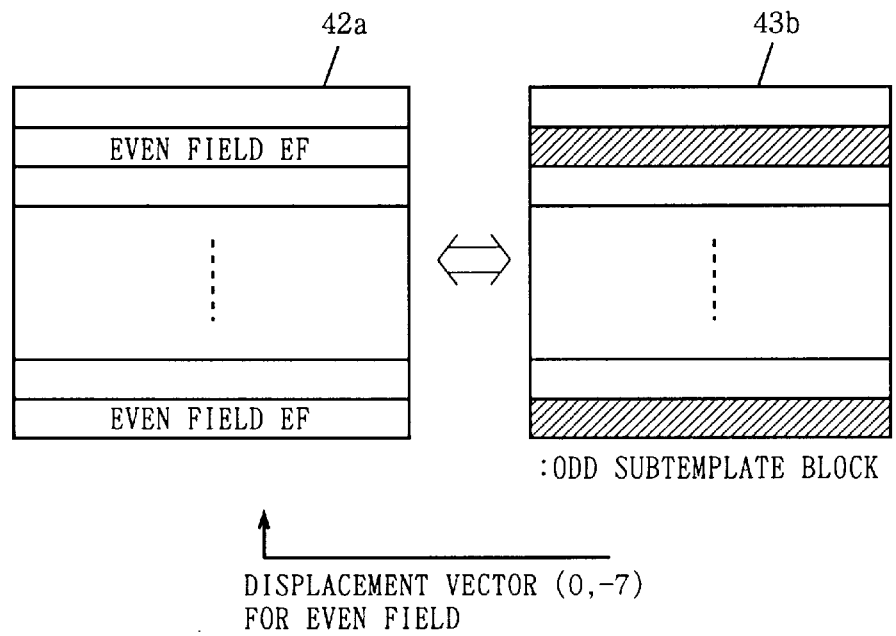

As shown in FIG. 17B, on the other hand, an odd subtemplate block 43b (slant areas) has a displacement vector (0, −7) for the even field EF. In this state, a total sum operation of absolute differential values is performed again similarly to the above, for outputting evaluation values of the template block 43, the even subtemplate block 43a and the odd subtemplate block 43b. Therefore, evaluation values for the even and odd fields are alternately outputted as those of the even subtemplate block 43a. Also as to the odd subtemplate block 43b, evaluation values for the odd and even fields are alternately outputted. In the even field predictive mode, the pixels of the even subtemplate block 43a are employed for obtaining a motion vector from both even and odd fields, while a motion vector is detected from the even and odd fields also as to the odd subtemplate block 43b.

Figure 18A:
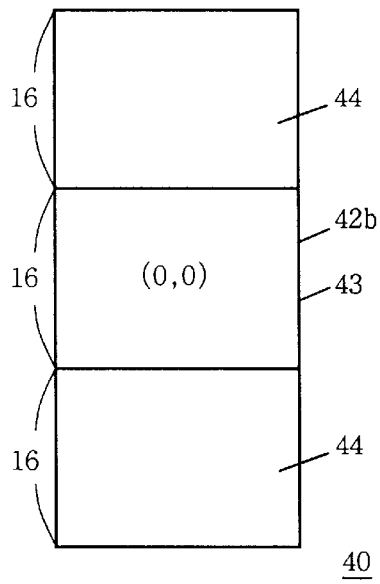
FIGS. 18A and 18B illustrate storage data in the processor array and positions in a search area in evaluation value computing.
Figure 18B:
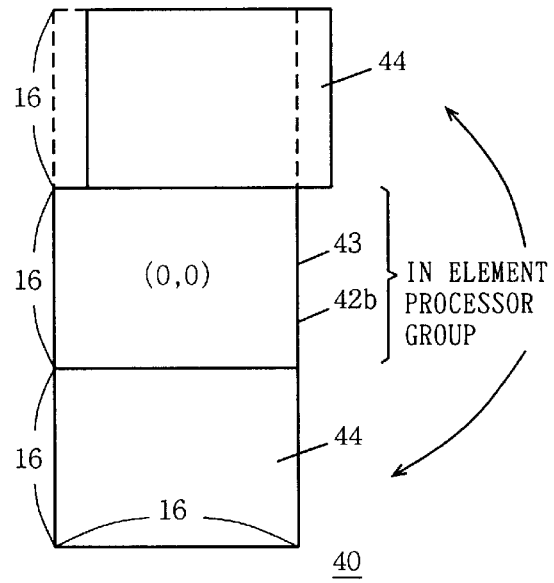

When the aforementioned operation is repeated and the displacement vector for the template block 43 reaches (0, 0), the displacement vector for the even field of the even subtemplate block 43a reaches (0, 0), while that for the odd field of the odd subtemplate block 43b also reaches (0, 0). In this state, a search window block 42b in the search window 40 corresponds to the true back position of the template block 43, as shown in FIG. 18A. In this state, the data of the search window 40 stored in the processor array 10a are rightwardly displaced by one column in an upper area of 16 by 16 pixels, as shown in FIG. 18B. The element processor group stores the pixel data of the search window block 42b and the template block 43, while the remaining pixel data of the side window block 43 are stored in the data buffer group. Thus, data unnecessary for the evaluation value computing are shifted out by one pixel while the search window data are newly shifted in the data buffer group by one pixel in parallel with the shift-out operation, so that new search window pixel data of the next column can be stored in parallel with the evaluation value computing.

Figure 19A:
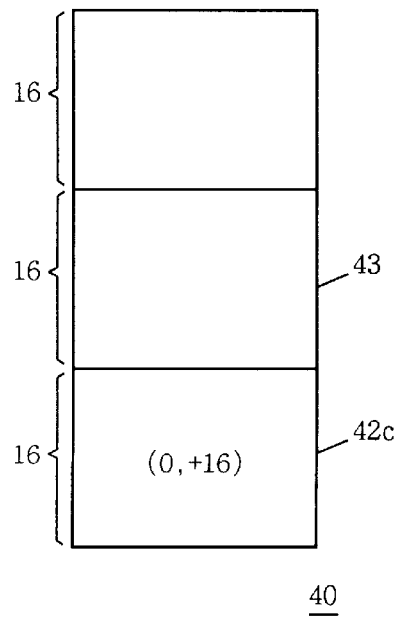
FIG. 19A shows a search window block reaching the lowermost part of the search window.

When the evaluation value computing is further repeatedly executed and the displacement vector for the template block 43 reaches (0, +16), the displacement vector for the even field of the even subtemplate block 43a reaches (0, +8), while that for the odd field of the odd subtemplate block 43b also reaches (0, +8). In this state, a search window block 42c is arranged on the lowermost area of the search window 40, as shown in FIG. 19A. After evaluation values for the respective displacement vectors of the three predictive modes are computed in this state, the processor array 10a shifts out unnecessary search window data PY1 by one pixel, and newly shifts search window pixel data PY2 therein.

Figure 19B:
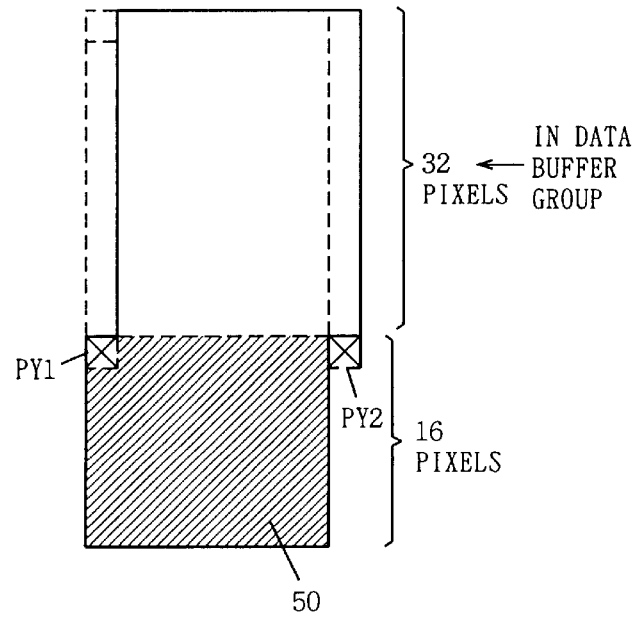
FIG. 19B illustrates the position of search window pixel data in the search area stored in the processor array in the state shown in FIG. 19A.

In this state, the element processors PE of the processor array 10a store pixel data of an area 49 shown by slant lines in FIG. 19B. In a next step, evaluation values are computed with respect to the search window rightwardly displaced by one column in the search area. In order to prepare the pixel data of the search window required for the next step in the processor array 10a, a shift operation is repeated 15 times after shifting the search window pixel data PY2 therein. Thus, 15 pixel data arranged on the same column as the pixel data PY1 are successively shifted out in the slant area 49 shown in FIG. 19B, while 15 pixel data following the pixel data PY2 are shifted therein in parallel with this. The data buffer group stores the pixel data of 32 rows and 16 columns shown in FIG. 19B.

Figure 20A:
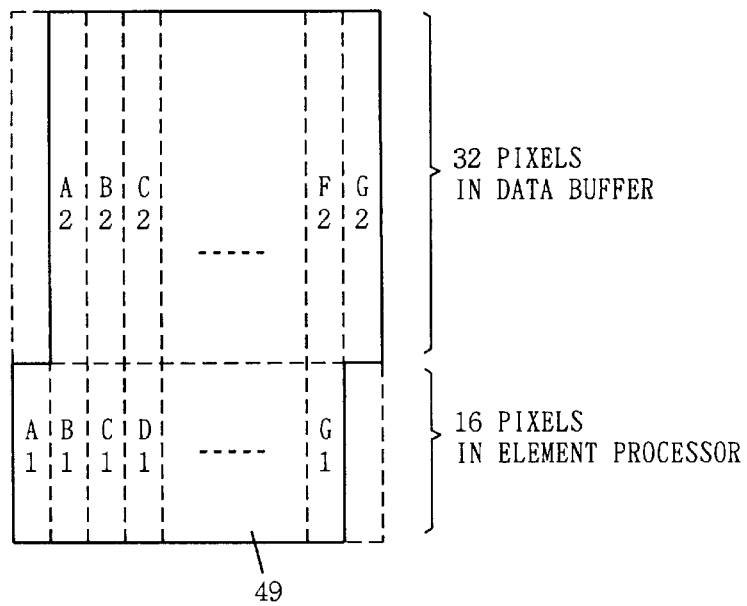
FIGS. 20A and 20B illustrate search window pixel data storage states in the processor array after evaluation value computing for a single search window and an operation of shifting 16 pixels in data buffers respectively.
Figure 20B:
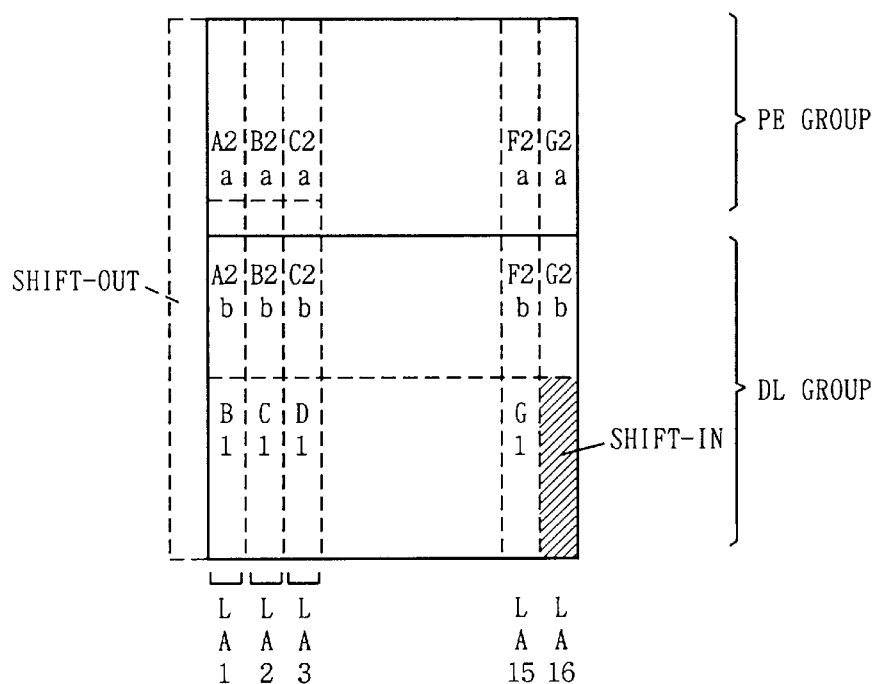
Figure 21:
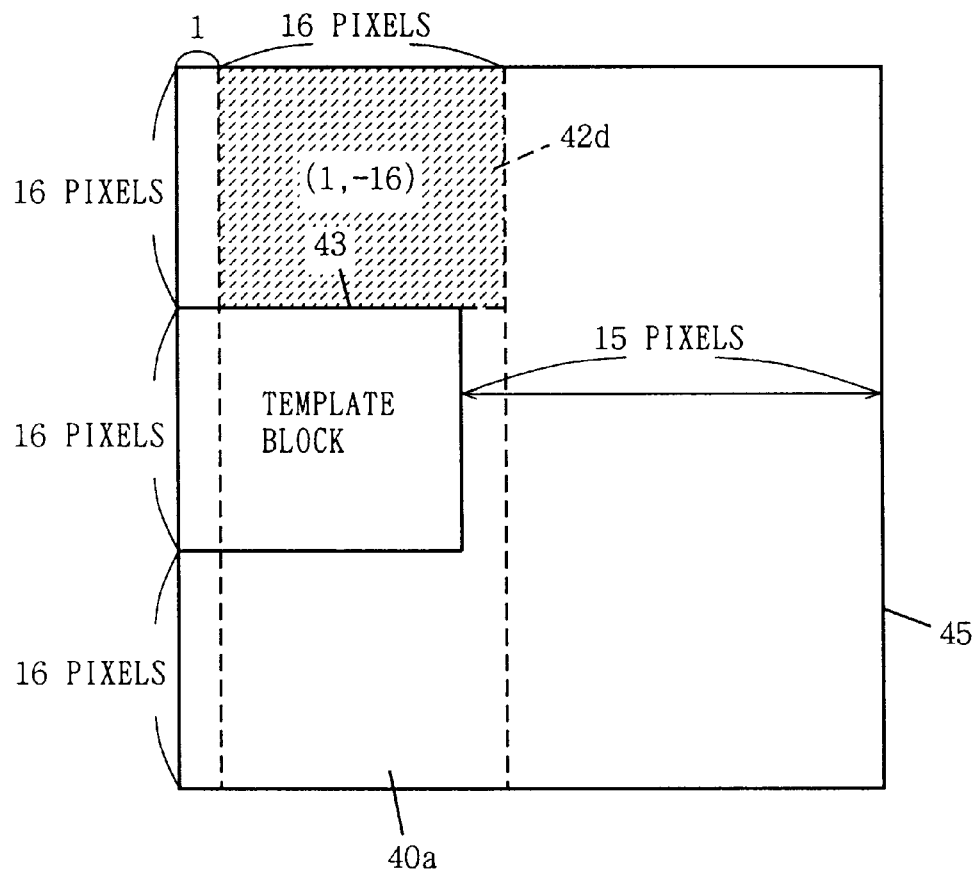
FIG. 21 illustrates the positional relation between the template block and the search window block in the state shown in FIG. 17B.
Figure 22:
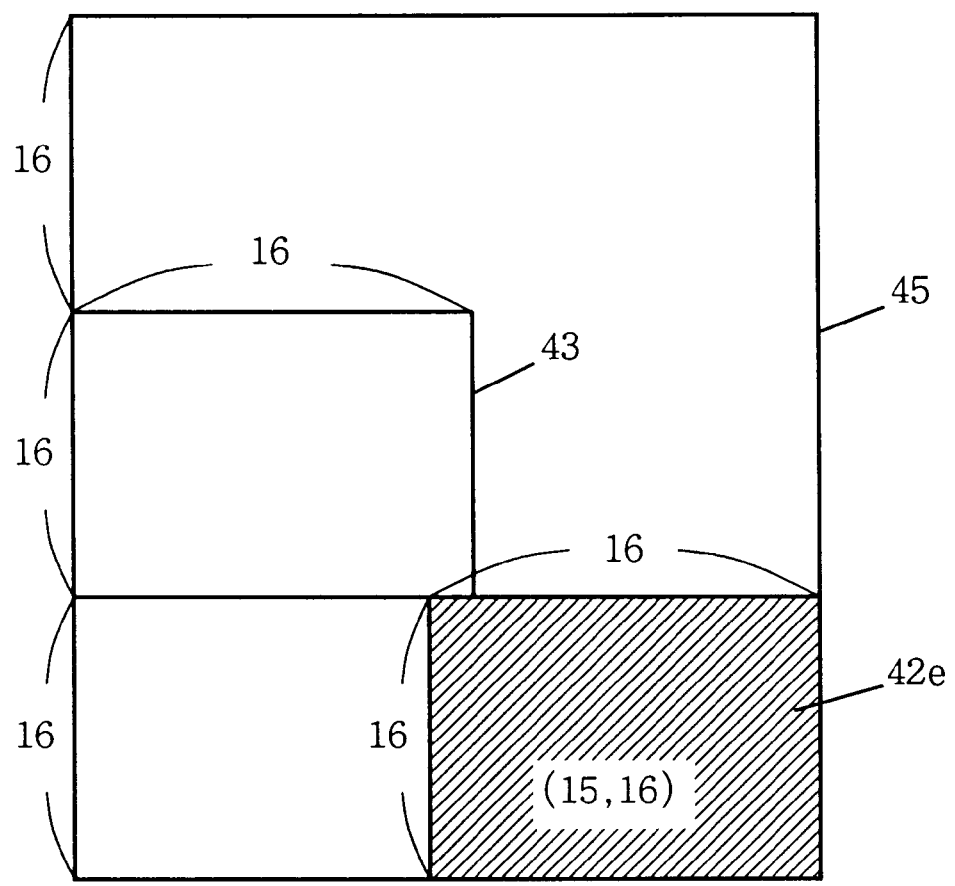
FIG. 22 illustrates the search window block reaching the final position in the search area.

The element processors PE store pixel data A1 to G1 of the area 49 while the data buffers DL store the remaining pixel data A2 to G2 as shown in FIG. 20A. The linear processor arrays LA1 to LA16 store groups of pixel data indicated by the same alphabetic symbols such as A1 and A2, B1 and B2 and the like. The data buffers DL input/ output the data in the first-in first-out manner. When 16 pixels shown in a slant area of FIG. 20B are shifted therein, therefore, the data buffers DL shift out all pixel data A1. In this state, each of the pixel data A2 to G2 stored in the data buffers DL is split into two parts, and pixel data A2a to G2a belonging to upper blocks are stored in the element processor group (PE group) and the remaining pixel data A2b to G2b and pixel data B1 to G1 are stored in the data buffer group (DL group). The linear processor array LA16 stores pixel data (shown by slant lines) shifted therein.

When the element processors PE and the data buffers DL are so arranged as to substantially form a linear array in the processor array 10a as hereinabove described, pixel data of a search window 40a rightwardly displaced by one column can be stored in the processor array 10a while those in a search window block 42d can be stored in the element processor group. In this state, the element processors PE store the pixel data of the search window block 42d corresponding to the block displacement vector (1, −16) for the template block 43 (corresponding to the displacement vector (1, −8) for the even field as to the even subtemplate block 43a and to the displacement vector (1, −8) for the odd field as to the odd subtemplate block 43b).

In this state, the aforementioned operation, i.e., computing of absolute differential values and the total sum, is executed again, for deriving evaluation values for the respective predictive modes.

When the aforementioned operation is executed (16+16+16)×(15+16+16)=2256 times, evaluation values are computed through a search window block 42e for a displacement vector (15, 16) for the template block 43. This search window block 42e corresponds to a displacement vector (15, +8) for the even field with respect to the even subtemplate block 43a, and to a displacement vector (15, +8) for the odd field with respect to the odd subtemplate block 43b. Namely, evaluation values are computed with respect to the search window block 42e on the lower right corner of a search area 45, whereby computing of all evaluation values for the template block 43 is completed.

After the evaluation values for the search window block 42e are computed, the compare part 13 (see FIG. 4) evaluates all computed evaluation values for the three predictive modes on the basis of the priority, for deciding displacement vectors obtained as the block motion vector for the template block 43 and motion vectors for the even and odd subtemplate blocks 43a and 43b in accordance with the results of the evaluation.

[Specific Structures of Respective Circuits]

Figure 23:
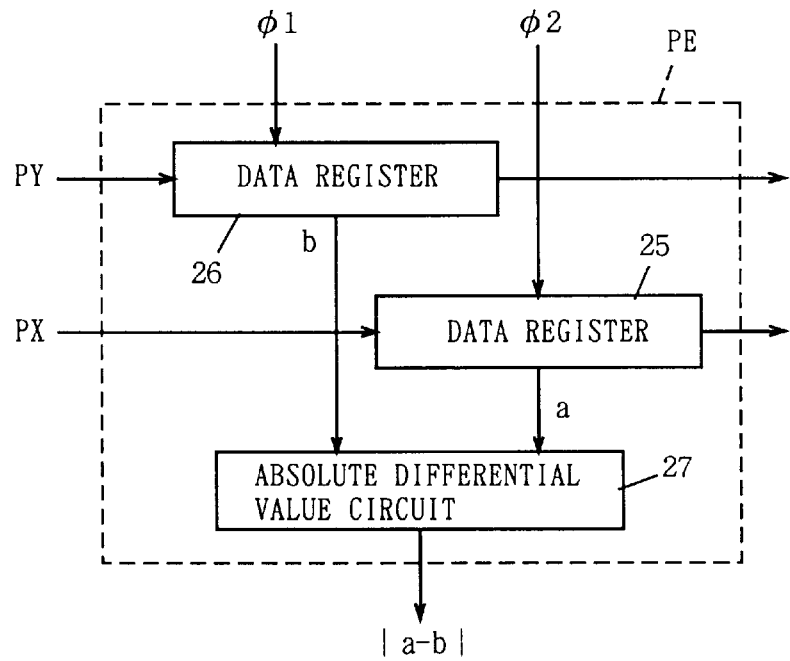
FIG. 23 illustrates an exemplary structure of the element processor included in the processor array shown in FIG. 4.

FIG. 23 illustrates a specific structure of each element processor PE. Referring to FIG. 23, the element processor PE includes a data register 25 for storing template block pixel data PX, a data register 26 for storing search window pixel data PY, and an absolute differential value circuit 27 for obtaining the absolute differential values of pixel data a and b stored in the data registers 25 and 26 respectively. The data register 25 unidirectionally transmits the data stored therein in response to a clock signal φ2, and the data register 26 transfers pixel data from an adjacent element processor PE or data buffer DL in accordance with a clock signal φ1. The data registers 25 and 26 can be formed by shift registers for transferring and latching data in response to the clock signals.

Alternatively, the data registers 25 and 26 can be formed by memories having separated write and read paths. The absolute differential value circuit 27 is formed in an appropriate structure in accordance with representation formats (two's complement notation, absolute value notation and the like) of the pixel data a and b. If the sign of the differential value is inverted when the difference between the pixel data a and b is negative, a circuit structure of an arbitrary format can be employed for the absolute differential value circuit 27.

Figure 24:
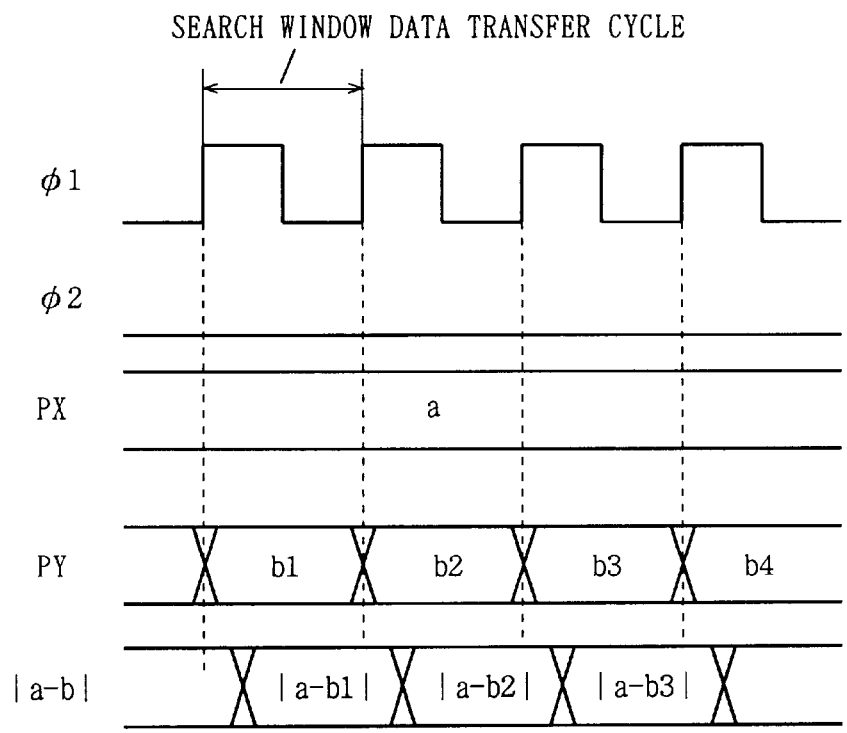
FIG. 24 is a timing chart representing operations of the element processor shown in FIG. 23.

FIG. 24 is a waveform diagram representing the operations of the element processor PE shown in FIG. 23. As shown in FIG. 24, the clock signal φ2 is not generated but fixed in an inactive state (low level in FIG. 24) in a template block motion vector detection cycle. The clock signal φ1 defines a transfer cycle for the search window pixel data PY. The search window pixel data PY is stored in the data register 26 and transferred in accordance with the clock signal φ1. The template block pixel data PX in the data register 25 is not transferred but the data register 25 stores the template block pixel data, a, corresponding to the element processor PE during the motion vector detection cycle for a single template block. The pixel data, b, stored in the data register 26 is successively changed to b1, b2, ... every cycle of the clock signal φ1. The absolute differential value circuit 27 outputs absolute differential values |a−b1|, |a−b2|, ... in the respective cycles of the clock signal φ1. Therefore, each element processor PE computes components of evaluation values in the search window pixel data transfer cycle.

[Structure of Total Sum Part]

Figure 25:
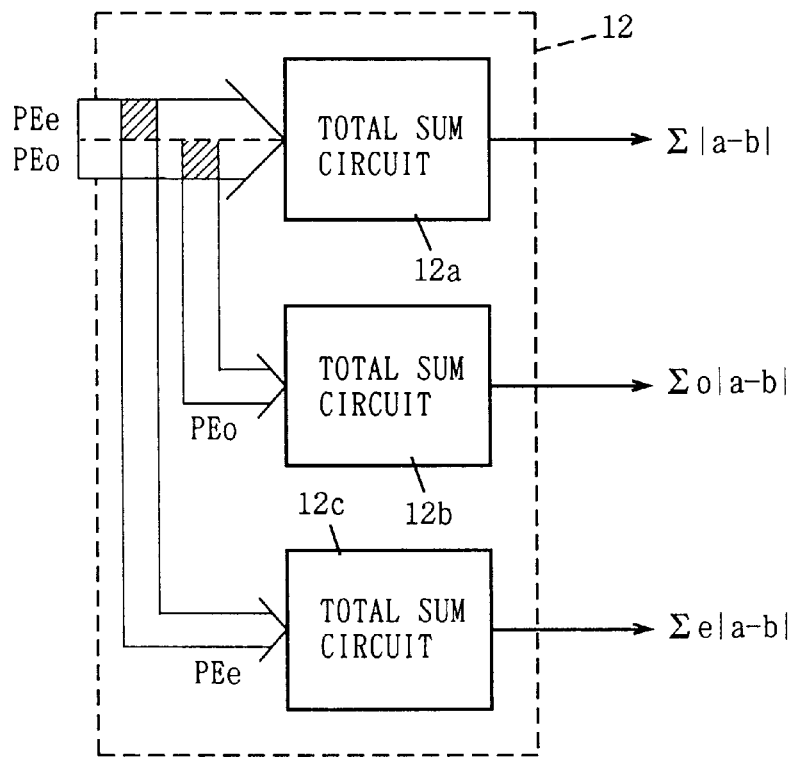
FIG. 25 illustrates a specific structure of a total sum part shown in FIG. 4.

FIG. 25 illustrates the structure of the total sum part 12 shown in FIG. 4. Referring to FIG. 4, the total sum part 12 includes a total sum circuit 12a for receiving all outputs of the element processors PE included in the processor array 10a in parallel with each other and obtaining the total sum thereof, a total sum circuit 12b for receiving the outputs of element processors PEo (element processors corresponding to pixels forming an odd subtemplate block) arranged in correspondence to pixels of an odd field among the element processors PE included in the processor array 10a and obtaining the total sum thereof, and a total sum circuit 12c for receiving outputs of element processors PEe (element processors arranged in correspondence to pixels forming an even subtemplate block) arranged in correspondence to pixels of an even field among the element processors PE included in the processor array 10a in parallel with each other and obtaining the total sum thereof. The total sum circuits 12a, 12b and 12c operate in parallel with each other, and output the evaluation values Σ|a−b|, Σo|a−b| and Σe|a−b| respectively. The total sum circuits 12a to 12c are provided in correspondence to the respective predictive modes and driven in parallel with each other, whereby the evaluation values corresponding to the respective predictive modes can be computed and outputted in parallel with each other. The output signals from the even and odd field element processors PEe and PEo in the element processors PE are classified simply by wiring connection.

[Modification 1 of Total Sum Part]

Figure 26:
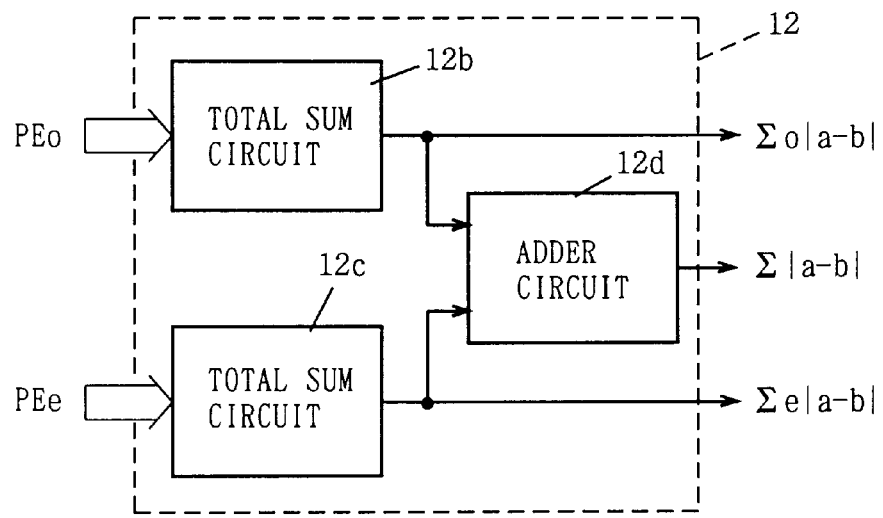
FIG. 26 illustrates another structure of the total sum part shown in FIG. 4.

FIG. 26 illustrates the structure of a modification 1 of the total sum part 12. The total sum part 12 shown in FIG. 26 includes a total sum circuit 12b for computing an evaluation value for an odd subtemplate block, a total sum circuit 12c for deriving an evaluation value for an even subtemplate block, and an adder circuit 12d for adding up outputs of these total sum circuits 12b and 12c. The adder circuit 12d outputs the evaluation value Σ|a−b| for the template block. The template block is obtained by combining even and odd subtemplate blocks with each other. Therefore, the evaluation value Σ|a−b| is obtained by adding up the even and odd subtemplate block evaluation values $\Sigma e|a-b|$ and $\Sigma o|a-b|$. The scale of the adder circuit 12d is smaller than that of the total sum circuit 12a for adding up all outputs of the element processors PE in the processor array 10a and obtaining the total sum. Therefore, evaluation values in a plurality of predictive modes can be simultaneously computed at a high speed without increasing the device scale of the total sum part 12.

[Modification 2 of Total Sum Part]

Figure 27:
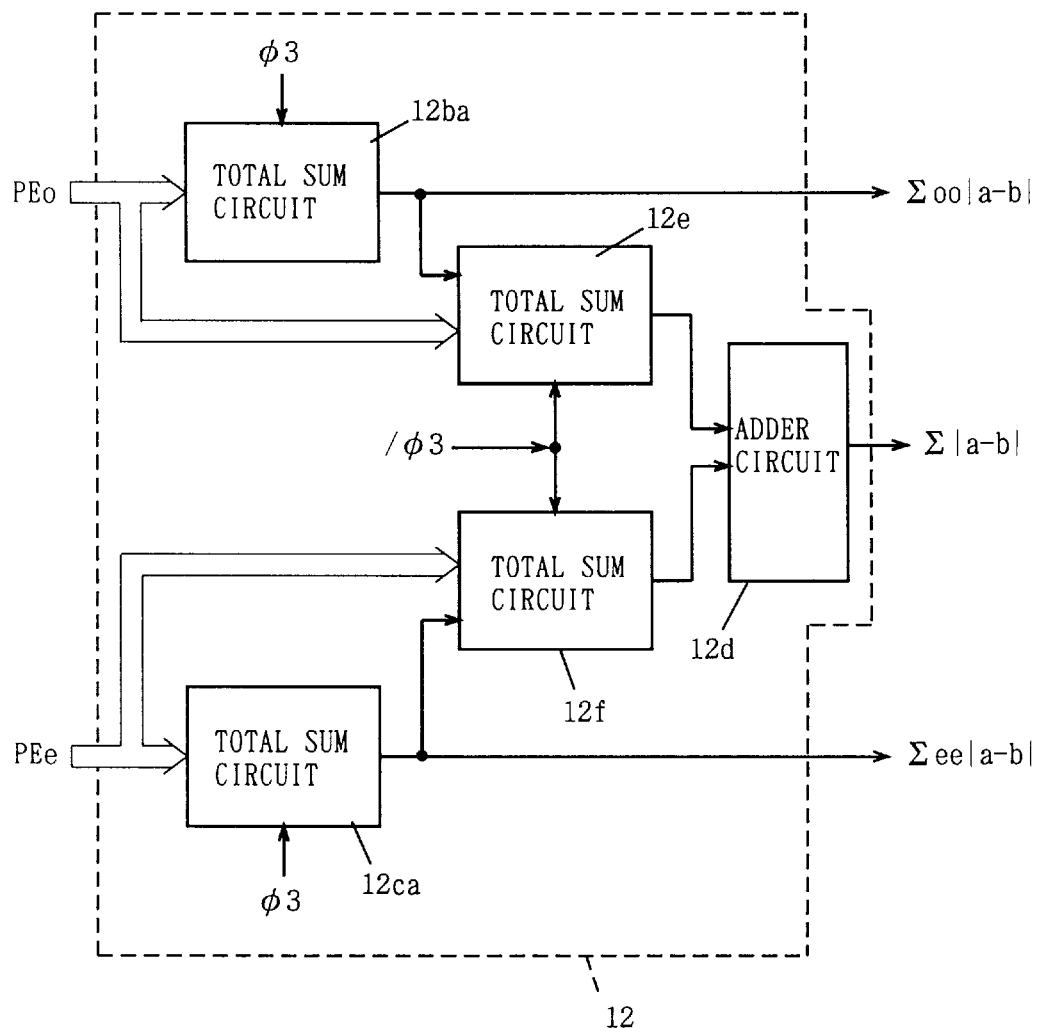
FIG. 27 illustrates still another structure of the total sum part shown in FIG. 4.

FIG. 27 schematically illustrates the structure of a modification 2 of the total sum part 12 shown in FIG. 4. Referring to FIG. 27, the total sum part 12 includes a total sum circuit 12ba for receiving outputs of the element processors PEo corresponding to the pixels of an even subtemplate block for adding up the same and obtaining the total sum in response to a clock signal φ3, a total sum circuit 12ca for receiving the outputs of the element processors PEe arranged in correspondence to the pixels of the even subtemplate block and computing the total sum in response to the clock signal φ3, a total sum circuit 12e for receiving outputs of the total sum circuit 12ba and the element processors PEo arranged in correspondence to the pixels of the odd subtemplate block and obtaining the total sum in accordance with a clock signal /φ3, a total sum circuit 12f for receiving outputs of the element processors PEe for the even subtemplate block and the total sum circuit 12ca and computing the total sum in accordance with the clock signal /φ3, and an adder circuit 12d for adding up outputs of the total sum circuits 12e and 12f. The total sum circuit 12ba outputs an evaluation value $\Sigma oo|a-b|$. This evaluation value $\Sigma oo|a-b|$ is the total sum of absolute differential values of the pixels of the odd subtemplate blocks and the odd fields included in the search window block.

Figure 28:
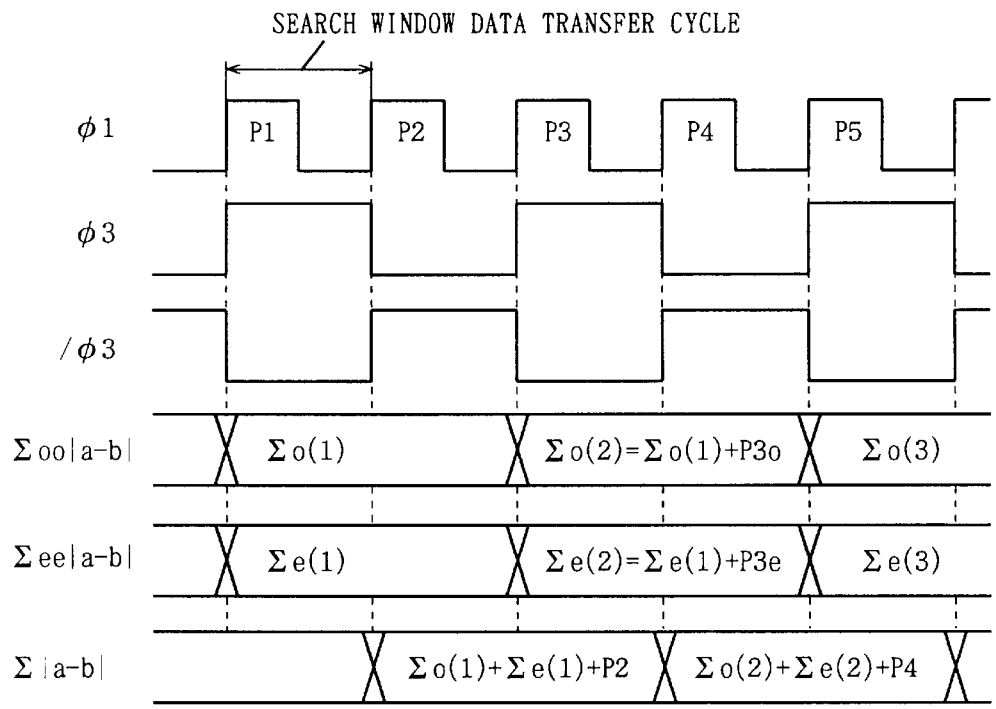
FIG. 28 is a timing chart representing operations of the total sum part shown in FIG. 27.

The total sum circuit 12ca outputs an absolute differential sum $\Sigma ee|a-b|$ of the pixels included in the even subtemplate block and the even field included in the search window block as an evaluation value. The adder circuit 12d outputs the evaluation value $\Sigma|a-b|$ of the template block. Operations of the total sum part 12 shown in FIG. 27 are now described with reference to FIG. 28 which is an operation timing chart thereof.

The clock signal φ3 has a cycle twice that of a clock signal φ1 defining the search window pixel data transfer cycle. The total sum circuits 12ba and 12ca are activated to perform the total sum operation when the clock signal φ3 is at a high level, while holding and outputting the results of the total sum computing when the clock signal φ3 is in an inactive state of a low level. The total sum circuits 12e and 12f performs the total sum operation on the supplied data when the inverted signal (180° out of phase) of the clock signal φ3, i.e., the clock signal /φ3 is at a high level, while holding and continuously outputting the results of the total sums when the clock signal /φ3 is at a low level.

Symbol P denotes the outputs of all element processors PE of the processor array 10a. When the clock signal φ3 goes high, the total sum circuits 12ba and 12ca incorporate supplied absolute differential value P1 (PEo and PEe) and perform the total sum operation, and output the total sum operation results 3o(1) and 3e(1) respectively. At this time, the total sum circuits 12e and 12f perform no total sum operation but hold and output total sum operation results obtained in the preceding cycle.

When the clock signal φ3 falls to a low level, the element processors PE of the processor array 10a supply absolute differential value P2. In this state, the total sum circuits 12ba and 12ca perform no operations but hold preceding total sum operation results. On the other hand, the total sum circuits 12e and 12f perform the total sum operation of the outputs of the total sum circuits 12ba and 12ca and the currently supplied output P2 of the element processors PE. Therefore, the adder circuit 12d outputs an evaluation value $3o(1)+3e(1)+P2$.

Then, the clock signal φ1 rises to a high level and the element processors PE output absolute differential value P3. The total sum circuits 12ba and 12ca obtain and output total sums $3o(2)$ $(=3o(2)+P3o)$ and $3e(2)$ $(=3e(1)+P3e)$ respectively, where symbols P3o and P3e denote the outputs of the element processors PE arranged in correspondence to the pixels of the odd and even subtemplate blocks respectively. Then, the element processors PE supply absolute differential value P4, and the total sum circuits 12e and 12f perform the total sum operation and the adder circuit 12a outputs an evaluation value $3o(2)+3e(2)+P4$. The operation is thereafter repeated.

Figure 29:
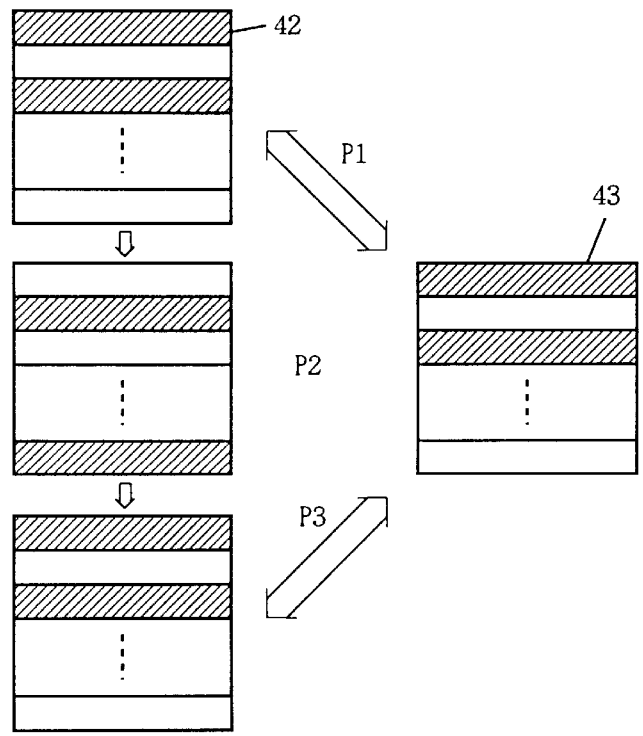
FIG. 29 illustratively represents the operations of the total sum part shown in FIG. 27.

The total sum circuits 12ba and 12ca obtains the total sums while skipping alternate pixels respectively, and the total sum circuits 12e and 12f obtains the total sums while compensating the skipped pixel data. As shown in FIG. 29, therefore, the pixel data of the subtemplate block (a block formed by slant areas in the template block 43) are subjected to absolute differential value operations with respect to pixel data included in the same field in the search window block 42. Namely, the absolute differential values of the odd subtemplate block are obtained only through the pixels belonging to the odd field in the search window block 42. On the other hand, the absolute differential values of the even subtemplate block are obtained only through the pixels of the even field in the search window block 42. Thus, it is possible to implement (i) motion vector detection employing all pixel data in the template block and the search area in case of frame units, (ii) a mode of deciding a motion vector only through the pixels belonging to the odd subtemplate block and the odd field in the search area, and (iii) a mode of deciding the motion vector only through the pixels belonging to the even subtemplate block and the even field in the search area.

[Modification 3 of Total Sum Part]

Figure 30:
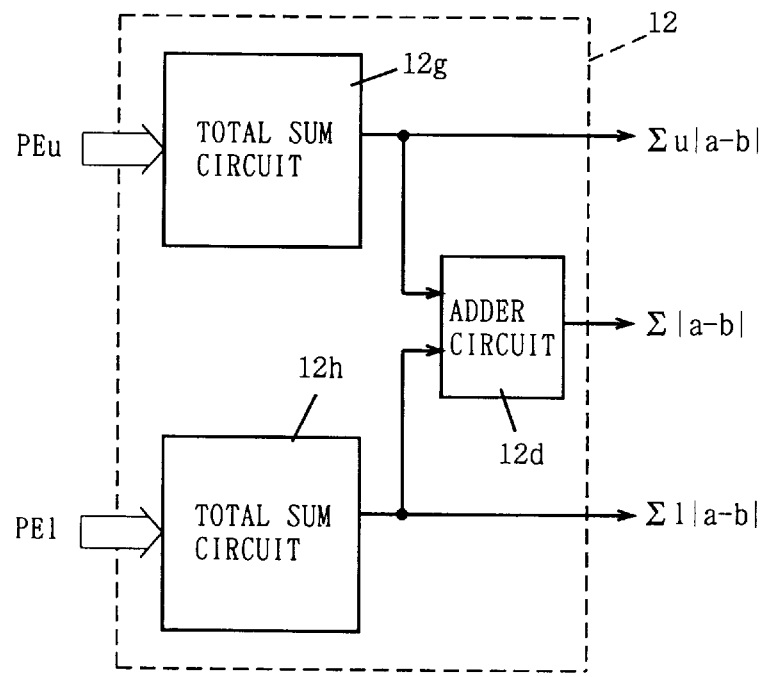
FIG. 30 illustrates a further structure of the total sum part shown in FIG. 4.

FIG. 30 schematically illustrates the structure of a modification 3 of the total sum part 12 of the motion vector detector according to the present invention. The total sum part 12 shown in FIG. 30 outputs evaluation values $\Sigma|a-b|$, $\Sigma u|a-b|$ and $\Sigma l|a-b|$ as to the template block and upper and lower blocks of the template block respectively. The element processors PE are arranged in correspondence to the respective pixels of the template block. Therefore, outputs PEu and PEl of the element processors PE provided in correspondence to the pixels of the upper and lower blocks of the template block can be classified by changing the wiring connection between the element processors PE and the total sum part 12.

Referring to FIG. 30, the total sum part 12 includes a total sum circuit 12g for receiving the output PEu of the element processors PE arranged in correspondence to the pixels of the upper block of the template block among the element processors PE included in the processor array 10a and obtaining the total sum, a total sum circuit 12h for obtaining the total sum of the output PEl of the element processors PE arranged in correspondence to the lower block of the template block among those included in the processor array 10a, and an adder circuit 12d for adding up outputs of the total sum circuits 12g and 12h. The total sum circuits 12g and 12h output the evaluation values $\Sigma u|a-b|$ and $\Sigma l|a-b|$ for the upper and lower blocks of the template block. The adder circuit 12d outputs the evaluation value Σ|a−b| for the template block.

Figure 31:
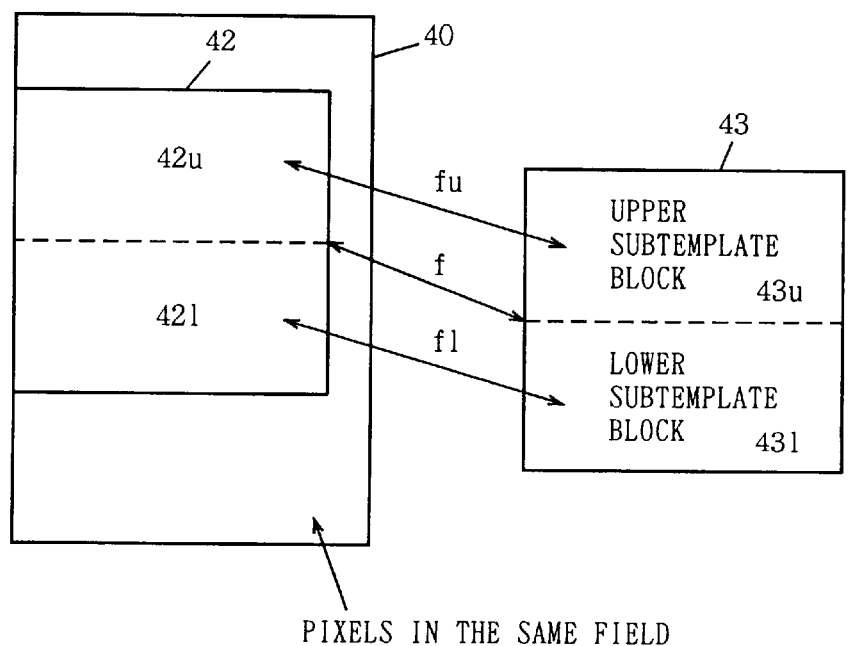
FIG. 31 illustrates correspondence between a template block and a search window block in the total sum part shown in FIG. 30.

In case of employing the total sum part 12 shown in FIG. 30, the screen is formed by a single field as shown in FIG. 31. A template block 43 is vertically split into two blocks, i.e., an upper subtemplate block 43u formed by the pixels of the upper block and a lower subtemplate block 43l formed by the pixels included in the lower block.

Similarly, a search window block 42 is also vertically split into upper and lower blocks 42u and 42l. In the upper subtemplate block 43u, an evaluation value is computed in accordance with a displacement vector fu for the upper block 42u in the search window block 42. In the lower subtemplate block 43l, an evaluation value for a displacement vector f1 for the lower block 42l of the search window block 42 is computed. The calculation of the evaluation value for the displacement vector f as to the template block 43 and the search window block 42 provides an evaluation value of a displacement vector for the search window block 42.

In the processor array 10a, the element processors PE obtain the absolute differential values of the corresponding pixel data in the template block 43 and the search window block 42 respectively. In a single operation cycle, therefore, the displacement vectors of the upper and lower subtemplate blocks 43u and 43l and the template block 43 are identical to each other.

When the structure shown in FIG. 30 is employed, motion vector detection for the template block 43, that for the upper subtemplate block 43u and that for the lower subtemplate block 43l can be simultaneously executed in a coding system performing coding in the units of fields, and the optimum motion vector can be detected in accordance with a plurality of predictive modes.

The structures of the total sum parts 12 shown in FIGS. 25 to 27 may be combined with that of the total sum part 12 shown in FIG. 30, for detecting the motion vectors of the even and odd fields in frame-unit coding, while obtaining an evaluation value for the overall template block by calculating the evaluation values of the upper and lower subtemplate blocks in field-unit coding. This can be readily implemented by splitting the element processors PE into four areas of even and odd lines and upper and lower halves for obtaining the total sums of the outputs of the element processors PE in the four areas respectively and selectively combining the outputs of the total sum circuit 12 in accordance with the coding system.

[Structure 1 of Compare Circuit]

Figure 32:
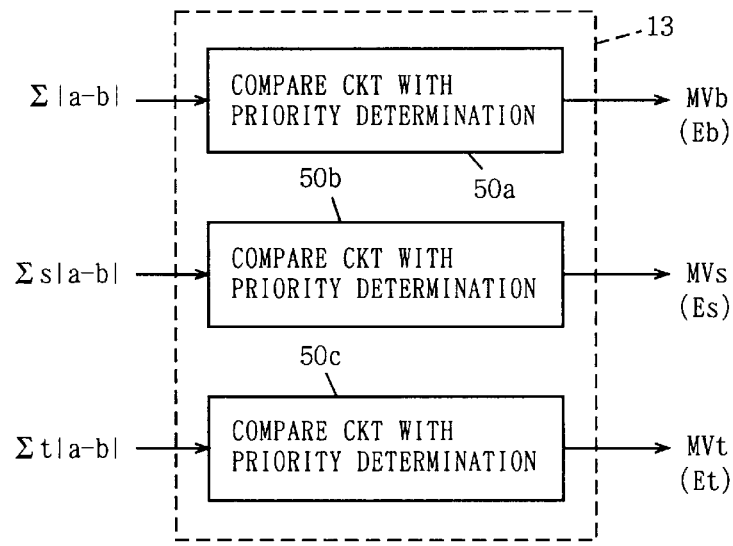
FIG. 32 schematically illustrates the structure of a compare part shown in FIG. 4.

FIG. 32 schematically illustrates a structure 1 of the compare circuit 13 shown in FIG. 4. Referring to FIG. 32, the compare part 13 includes compare circuits 50a, 50b and 50c with priority determination provided in correspondence to evaluation values Σ|a−b|, Σs|a−b| and Σt|a−b| computed in accordance with the predictive systems. Each of the compare circuits 50a to 50c with priority determination includes a register in its interior, for storing a candidate optimum vector and an optimum evaluation value and comparing a supplied evaluation value with the optimum evaluation value stored in the register. If the supplied evaluation value is smaller than the optimum evaluation value stored in the register, the compare circuit stores the supplied evaluation value in the register as a new optimum evaluation value. If the supplied evaluation value is identical to that stored in the register, on the other hand, the compare circuit decides the optimum evaluation value and the corresponding optimum vector in accordance with predetermined priority.

The compare part 13 evaluates the evaluation values and outputs optimum vectors MVb, MVs and MVt corresponding to the respective predictive modes. Here, why these vectors MVb, MVs and MVt are called not motion vectors but optimum vectors is that a structure of performing further selection from the plurality of predictive modes and deciding a motion vector in accordance with the predictive system having the minimum evaluation value may be employed. Further, appropriate optimum vectors may be employed as motion vectors in accordance with the respective predictive modes and applications, or the average value of these optimum vectors may be employed as a motion vector. At this time, the compare circuits 50a to 50c with priority determination may output evaluation values Eb, Es and Et corresponding to the respective optimum vectors.

Figure 33:
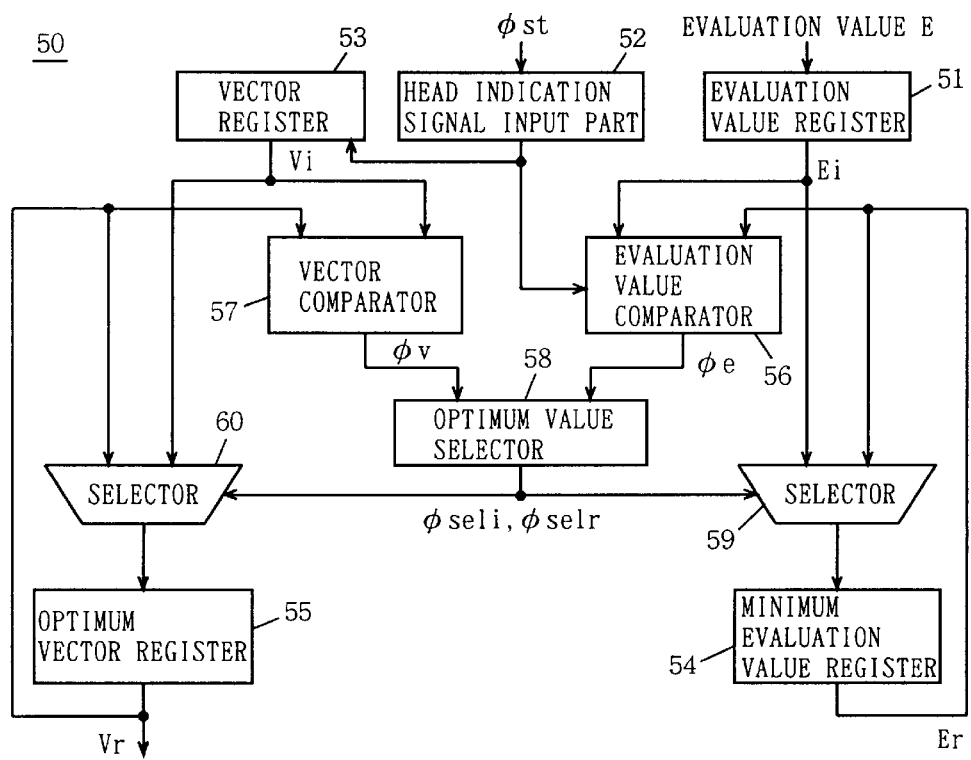
FIG. 33 illustrates an exemplary structure 1 of a compare circuit with priority determination shown in FIG. 32.

FIG. 33 schematically illustrates representatively compare circuit 50 with priority determination shown in FIG. 32. The compare circuits 50a to 50c with priority determination are identical in structure to each other, and hence FIG. 33 representatively shows the structure of a single compare circuit 50 with priority determination. An evaluating operation is performed for each predictive mode.

Referring to FIG. 33, the compare circuit 50 with priority determination includes an evaluation value register 51 storing an evaluation value E supplied from the total sum part 12, a head indication signal input part 52 for receiving a head indication signal φst indicating that an evaluation value for the first search window block is supplied from a controller (not shown), and a vector register 53 for generating a displacement vector indicating a search window block position corresponding to the evaluation value E supplied from the total sum part 12. The head indication signal φst is activated only when a motion vector as to the first search window block (reference image block) is detected as to a single template block.

The vector register 53 is formed by a counter, for example, and its count value is reset to an initial value in accordance with activation of the head indication signal φst supplied from the head indication signal input part 52. The evaluation value register 51 updates its stored value in accordance with a signal (clock signal defining an evaluation cycle) indicating that a new evaluation value is supplied, and the count value of the counter forming the vector register 53 is incremented in accordance with this clock signal.

The compare circuit 50 with priority determination further includes a minimum evaluation value register 54 storing a minimum evaluation value Er, an optimum vector register 55 storing an optimum displacement vector (hereinafter referred to as an optimum vector) Vr serving as a candidate optimum vector, an evaluation value comparator 56 for comparing an evaluation value Ei from the evaluation value register 51 with the minimum evaluation value Er from the minimum evaluation value register 54, a vector comparator 57 for comparing priority levels of a displacement vector Vi from the vector register 53 and the optimum displacement vector Vr from the optimum vector register 55, an optimum value selector 58 for outputting selection signals φseli and φselr for selecting either the evaluation value Ei newly inputted and the corresponding displacement vector Vi or the minimum evaluation value Er and the optimum vector Vr, in accordance with output signals φe and φv of the evaluation value comparator 56 and the vector comparator 57 respectively, a selector 59 for selecting either the evaluation value Ei of the evaluation value register 51 or the minimum evaluation value Er from the minimum evaluation value register 54 in accordance with the selection signals φseli and φselr from the optimum value selector 58, and a selector 60 for selecting either the displacement vector Vi or the optimum displacement vector Vr in accordance with the selection signals φseli and φselr. An output of the selector 59 is supplied to and stored in the minimum evaluation value register 54. An output of the selector 60 is supplied to and stored in the optimum vector register 55.

The evaluation value comparator 56 generates a signal for unconditionally selecting the input evaluation value Ei from the evaluation value register 51 when the head indication signal φst from the head indication signal input part 52 is in an active state. In inactivation of the head indication signal φst, on the other hand, the evaluation value comparator 56 compares the input evaluation value Ei with the minimum evaluation value Er, and outputs the signal φe in accordance with the result of the comparison. The vector comparator 57 compares the priority levels of the displacement vector Vi and the optimum vector Vr with each other, and outputs a signal indicating the result of the comparison. When the priority levels are identical to each other, the vector comparator 57 outputs a signal for selecting the optimum displacement vector Vr.

When the output signal φe of the evaluation value comparator 56 indicates that the input evaluation value Ei and the minimum evaluation value Er are identical to each other, the optimum value selector 58 generates the selection signals φseli and φselr in accordance with the output signal φv of the vector comparator 57. When the input evaluation value Ei and the minimum evaluation value Er are different from each other, on the other hand, the optimum value selector 58 generates the selection signals φseli and φselr in accordance with the output signal φe of the evaluation value comparator 56. Operations of the compare circuit 50 with priority determination shown in FIG. 33 are now described with reference to a flow chart shown in FIG. 34.

After the processor array 10a stores pixel data of a single template block and pixel data of the first search window block for the template block and performs operational processing, the total sum part 12 supplies evaluation values in accordance with the respective predictive modes. The evaluation value register 51 stores the evaluation values, and then supplies the same to the evaluation value comparator 56. The head indication signal φst from the head indication signal input part 52 is activated due to the evaluation values for the first search window block. In accordance with this activation of the head indication signal φst, the evaluation value comparator 56 outputs a signal indicating that the evaluation value supplied from the evaluation value register 51 is small. The vector register 53 sets its count value at the initial value in response to the activation of the head indication signal φst, and generates a displacement vector indicating the position (evaluation point) of the first search window block. The vector comparator 57 regularly compares the priority levels of the optimum displacement vector Vr from the optimum vector register 55 and the displacement vector Vi from the vector register 53. In accordance with the output signals φe and φv from the evaluation value comparator 56 and the vector comparator 57, the optimum value selector 58 executes the following processing:

In accordance with the output signal φe from the evaluation value comparator 56, the optimum value selector 58 determines whether or not the input evaluation value Ei and the minimum evaluation value Er are equal to each other (whether or not the difference therebetween is zero) (step S1). If the head indication signal φst supplied from the head indication signal input part 52 is in an active state, the evaluation value comparator 56 indicates that the input evaluation value Ei is smaller. Therefore, the optimum value selector 58 sets the selection signals φseli and φselr so as to select the smaller evaluation value Ei (step S2). As to the first search window block for which the head indication signal φst is activated, therefore, the selector 59 selects the input evaluation value Ei from the evaluation value register 51 and stores the same in the minimum evaluation value register 54. Further, the selector 60 selects the displacement vector Vi for the first search window block from the vector register 53 and stores the same in the optimum vector register 55.

Figure 34:
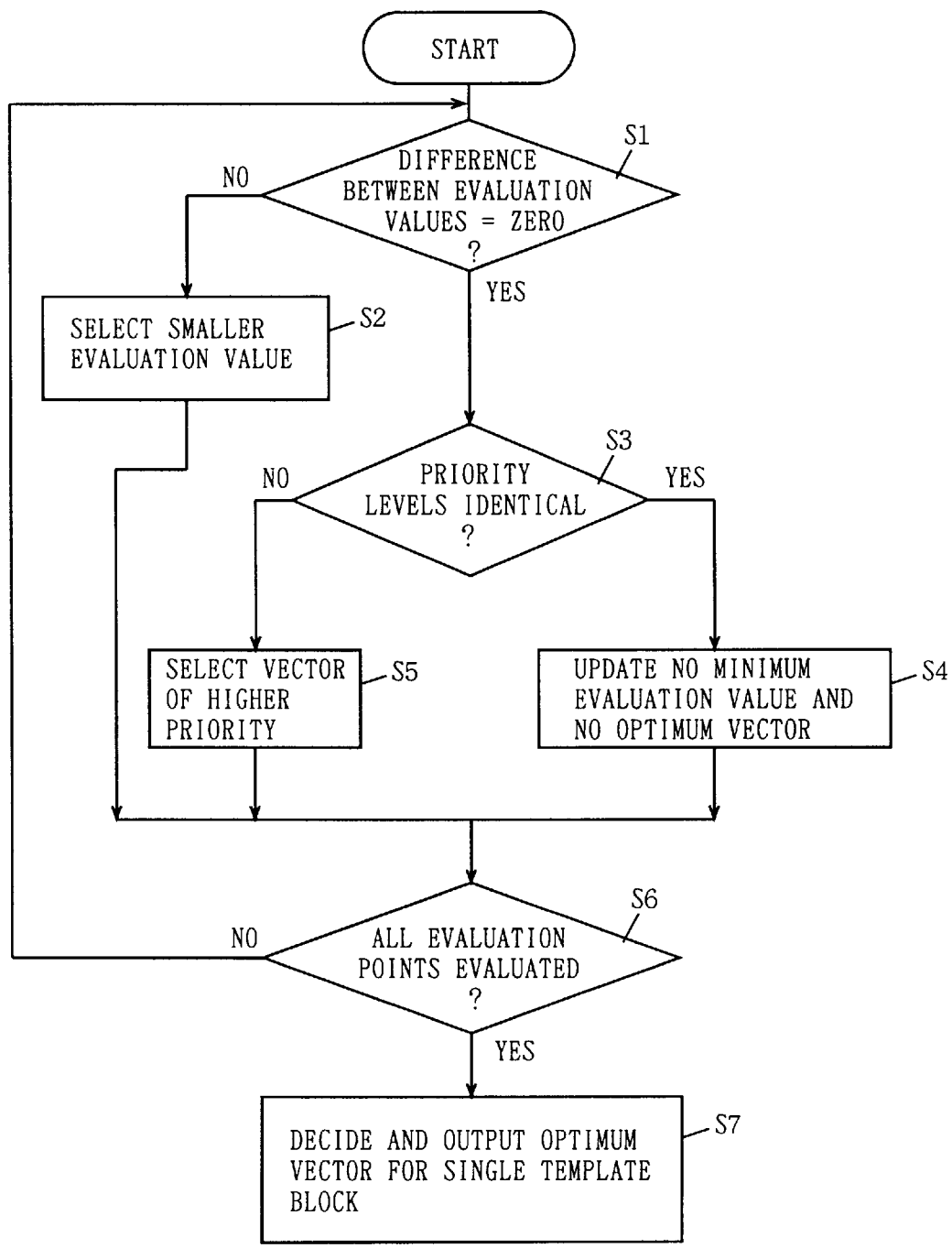
FIG. 34 is a flow chart showing operations of the compare circuit shown in FIG. 33.

The head indication signal φst is inactivated, and the determination at the step S1 in FIG. 34 is first executed as to the evaluation value of the following search window block. The evaluation value comparator 56 compares the input evaluation value Ei supplied from the evaluation value register 51 with the minimum evaluation value Er supplied from the minimum evaluation value register 54. On the other hand, the vector comparator 57 compares the priority levels of the displacement vector Vi from the vector register 53 and the optimum vector Vr from the optimum vector register 55. If the output signal φe from the evaluation value comparator 56 indicates that the difference therebetween is nonzero, the optimum value selector 58 sets the selection signals φseli and φselr so as to select the smaller evaluation value, similarly to the operation in activation of the head indication signal φst (step S2).

If the output signal φe of the evaluation value comparator 56 indicates that the input evaluation value Ei and the minimum evaluation value Er stored in the minimum evaluation value register 54 are identical to each other, on the other hand, the optimum value selector 58 determines the priority levels of the optimum vector Vr stored in the optimum vector register 55 and the displacement vector Vi outputted from the vector register 53 (step S3). If the priority levels of the displacement vector Vi and the optimum vector Vr are identical to each other, the optimum value selector 58 sets the selection signals φseli and φselr to the states selecting the minimum evaluation value Er from the minimum evaluation value register 54 and the optimum vector Vr from the optimum vector register 55. In this case, therefore, the minimum evaluation value Er and the optimum vector Vr are not updated (step S4). If the priority levels are different from each other, on the other hand, the optimum value selector 58 sets the selection signals φseli and φselr to the states selecting the vector having higher priority and the corresponding evaluation value (step S5).

The aforementioned evaluation is executed for each search window block (evaluation point) in the search area (step S6). When all evaluation points are completely evaluated, the minimum evaluation value register 54 stores the minimum evaluation value and the optimum vector register 55 stores the corresponding displacement vector, and the minimum evaluation value and the optimum vector have the highest possible priority level. Thus, the optimum vector for a single template block is decided, and outputted to a next stage circuit (not shown) (step S7).

The compare circuit 50 with priority determination shown in FIG. 33 is provided in correspondence to each of the plurality of predictive modes, and the displacement vectors are evaluated in the predictive modes on the basis of the priority levels and the evaluation values.

When the evaluation values are identical to each other, the displacement vector of higher priority is selected as the optimum vector, and there is a high possibility that the displacement vector of higher priority is decided as the optimum vector. Thus, there is a high possibility that a motion vector (optimum vector) for each template block is provided by the displacement vector having a high priority level, whereby variation of motion vectors between the template blocks can be reduced, and the amount of codes of coded motion vectors in motion vector coding can be reduced in response.

Figure 35:
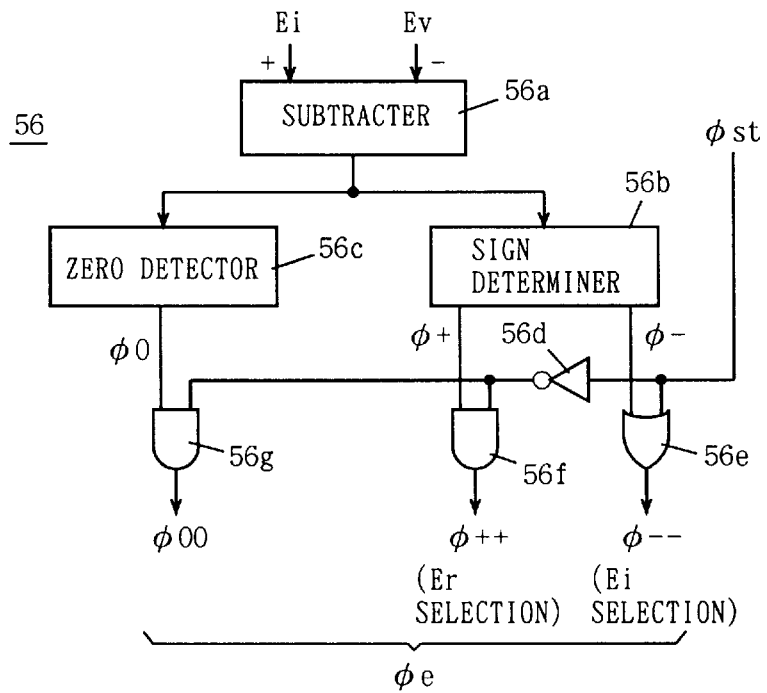
FIG. 35 schematically illustrates the structure of an evaluation value comparator shown in FIG. 33.

FIG. 35 schematically illustrates an exemplary structure of the evaluation value comparator 56 shown in FIG. 33. Referring to FIG. 35, the evaluation value comparator 56 includes a subtracter 56a performing subtraction of the input evaluation value Ei and the minimum evaluation value Er, a sign determiner 56b for determining the sign of an output signal from the subtracter 56a, and a zero detector 56c for detecting whether or not the output signal of the subtracter 56a indicates zero. The subtracter 56a subtracts the minimum evaluation value Er from the input evaluation value Ei. This subtracter 56a represents its subtraction result with a sign. The sign determiner 56b determines the sign of the output signal from the subtracter 56a. If the input evaluation value Ei is larger than the minimum evaluation value Er, a plus indication signal $\phi$+ is brought into a high level of an active state. If the input evaluation value Ei is smaller than the minimum evaluation value Er, on the other hand, a minus indication signal $\phi$– is brought into an active state of a high level. The zero detector 56c brings a zero detection signal $\phi$0 into an active state of a high level when the output value of the subtracter 56a is zero.

The evaluation comparator 56 further includes an invertor 56d for receiving the first indication signal $\phi$st, an OR circuit 56e for receiving the minus indication signal $\phi$– and the head indication signal $\phi$st, an AND circuit 56f receiving an output signal of the invertor 56d and the plus indication signal $\phi$+, and an AND circuit 56g receiving the output signal of the invertor 56d and the zero detection signal $\phi$0. The OR circuit 56e outputs a selection indication signal $\phi$–– for selecting the input evaluation value Ei. The AND circuit 56f outputs a selection signal $\phi$++ for selecting the minimum evaluation value Er supplied from the minimum evaluation value register 54. The AND circuit 56g outputs an output selection signal $\phi$00 indicating which one of the output signals from the vector comparator 57 and the evaluation value comparator 56 is validated. The signals $\phi$00, $\phi$++ and $\phi$–– correspond to the signal $\phi$e shown in FIG. 33.

If the input evaluation value Ei is larger than the minimum evaluation value Er in the structure shown in FIG. 35, the plus and minus indication signals $\phi$+ and $\phi$– from the sign determiner 56b go high and low respectively. If the input evaluation value Ei is smaller than the minimum evaluation value Er, on the other hand, the plus and minus indication signals $\phi$+ and $\phi$– enter inactive and active states of low and high levels respectively. When the head indication signal $\phi$st is in an active state of a high level, the selection signal $\phi$–– from the OR circuit 56e goes high, and the signals $\phi$++ and $\phi$–– from the AND circuits 56f and 56g go low. In activation of the head indication signal $\phi$st, therefore, the input evaluation value Ei is selected. In inactivation of the head indication signal $\phi$st, on the other hand, the output signal from the invertor 56d goes high, and the OR circuit 56e and the AND circuits 56f and 56g operate as buffers. In this state, the selection signals $\phi$++ and $\phi$–– are generated in accordance with the plus and minus indication signals $\phi$+ and $\phi$–. Namely, the selection signal $\phi$–– is activated when the input evaluation value Ei is smaller than the minimum evaluation value Er. If the input evaluation value Ei is larger than the minimum evaluation value Er, on the other hand, the selection signal $\phi$++ is activated. When the input evaluation value Ei and the minimum evaluation value Er are equal to each other, the output selection signal $\phi$00 is activated. In this state, the selection signal $\phi$00 is generated in accordance with the output signal of the vector comparator 57.

Figure 36:
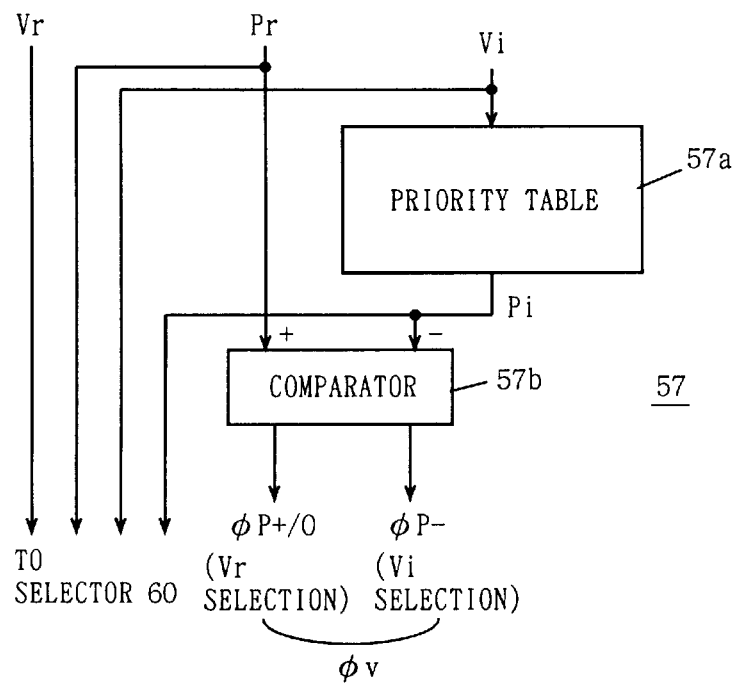
FIG. 36 schematically illustrates the structure of a vector comparator shown in FIG. 33.

FIG. 36 illustrates an exemplary structure of the vector comparator 57 shown in FIG. 33. Referring to FIG. 36, the vector comparator 57 includes a priority table 57a for storing priority levels of the respective positions (evaluation points) of the search window blocks in the search area in the form of a table, and a comparator 57b for comparing priority information Pi from the priority table 57a and priority Pr of the optimum vector Vr stored in the optimum vector register 55 (see FIG. 33). The corresponding priority information Pr is stored in linkage with the optimum vector Vr stored in the optimum vector register 55. The priority table 57a outputs data indicating the corresponding priority with the input displacement vector Vi as the address. The comparator 57b subtracts the priority Pi read from the priority table 57a from the priority Pr of the optimum vector Vr.

The comparator 57b outputs selection signals $\phi$p+/0 and $\phi$p– in accordance with the subtraction result. The signal $\phi$p+/0 is activated if the priority Pr is higher than the priority Pi. The signal $\phi$p– is activated when the priority Pr is lower than the priority Pi. Selection of the optimum vector Vr is specified when the signal $\phi$p+/0 is active, while selection of the input displacement vector Vi is specified when the signal $\phi$p– is active. The optimum vector Vr and the corresponding priority Pr as well as the input displacement vector Vi and the corresponding priority Pi are supplied to the selector 60 shown in FIG. 33.

The signals $\phi$p+/0 and $\phi$p– correspond to the signal $\phi$v shown in FIG. 33.

If the priority Pr is higher than or identical to the priority Pi in the structure shown in FIG. 36, the signal $\phi$p+/0 is activated for selecting the optimum vector Vr. If the priority Pr is lower than the priority Pi, on the other hand, the signal $\phi$p– is activated for selecting the input displacement vector Vi.

Figure 37:
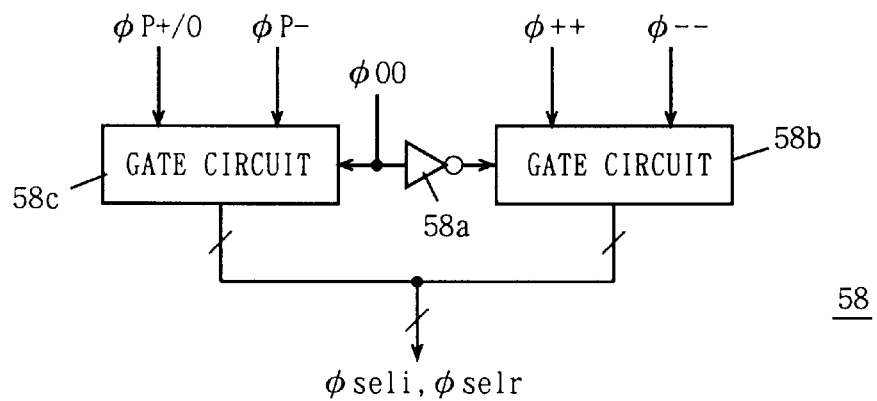
FIG. 37 schematically illustrates the structure of an optimum value selector shown in FIG. 33.

FIG. 37 schematically illustrates an exemplary structure of the optimum value selector 58 shown in FIG. 33. Referring to FIG. 37, the optimum value selector 58 includes an invertor 58a receiving the output selection signal $\phi$00, a gate circuit 58b for passing the selection signals $\phi$++ and $\phi$–– when an output signal of the invertor 58a is in an active state of a high level, and a gate circuit 58c which is activated, when the output selection signal $\phi$00 is in an active state of a high level, for passing the selection signals $\phi$p+/0 and $\phi$p–. Outputs of the gate circuits 58b and 58c are connected in common, for outputting the selection signals $\phi$seli and $\phi$selr.

The gate circuits 58b and 58c are brought into output high impedance states in inactivation thereof. When the input evaluation value Ei and the optimum evaluation value Er are identical to each other, the output selection signal $\phi$00 is brought into an active state of a high level, the gate circuit 58c is activated, and the gate circuit 58b is inactivated. In this state, therefore, the selection signals $\phi$seli and $\phi$selr are generated in accordance with the signals $\phi$p+/0 and $\phi$p–. When the input evaluation value Ei and the optimum evaluation value Er are different from each other, on the other hand, the output selection signal $\phi$00 enters an inactive state of a low level, the gate circuit 58b is activated, and the gate circuit 58c is inactivated. In this state, therefore, the selection signals $\phi$seli and $\phi$selr are generated in accordance with the selection signals $\phi$++ and $\phi$––.

The selection signals $\phi$seli and $\phi$selr are supplied to the selectors 59 and 60 shown in FIG. 33. When the selection signal $\phi$seli is in an active state, the input evaluation value Ei and the input displacement vector Vi from the vector register 55 are selected (with the corresponding priority data). If the selection signal φselr is in an active state, on the other hand, the minimum evaluation value Er from the minimum evaluation value register 54 and the optimum vector Vr from the optimum vector register 55 are selected (with the corresponding priority data).

Each of the selectors 59 and 60 may be formed by a general structure of selecting one of two ports in accordance with a selection signal, although this structure is not shown.

[Priority Distribution 1]

Figure 38:
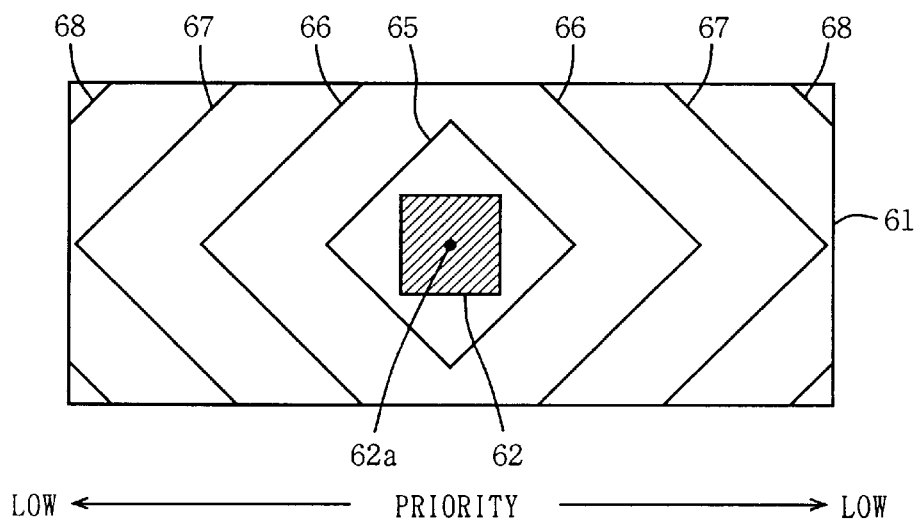
FIG. 38 illustrates an exemplary priority distribution 1 in the compare circuit shown in FIG. 33.

FIG. 38 illustrates an exemplary priority distribution 1 in a search area 61. Referring to FIG. 38, the search area 61 is split into rhombic areas around an evaluation value 62a of a true back search window block 62. Evaluation points (displacement vectors) are present on boundary lines 65, 66, 67 and 68 between the rhombic areas. The priority levels of the evaluation points are increased toward the true back position 62a. If the displacement vectors on the lines 65 and 68 provide the same evaluation values, for example, the displacement vector on the line 65 having a higher priority level is selected.

Thus, the priority is assigned to each evaluation point (search window block position) around the true back position 62a, whereby a motion vector can be detected around the true back position 62a, and hence variation of motion vectors between template blocks can be suppressed.

In the structure shown in FIG. 38, the lines 65, 66, 67 and 68 may be densely arranged so that no evaluation points are present between these lines 65 to 68. Alternatively, the lines 65 to 68 may be so arranged that other evaluation points are present therebetween. In this case, a plurality of displacement vectors having the same priority levels are horizontally present in each rhombic area. Allocation of the areas provided with the priority levels may be appropriately set depending on the applications. This also applies to the following examples, and split areas include both of only sides and of rectangular areas and sides thereof.

[Priority Distribution 2]

Figure 39:
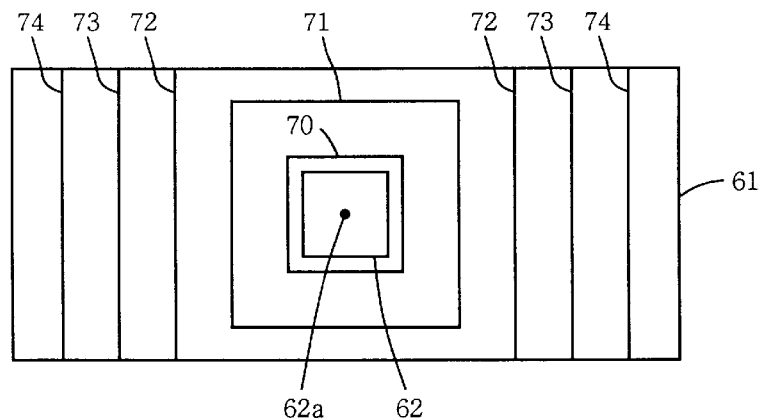
FIG. 39 illustrates an exemplary priority distribution 2 in the compare circuit shown in FIG. 33.

FIG. 39 illustrates an exemplary priority distribution 2 in a search area 61. Referring to FIG. 39, the search area 61 is split into substantially square areas around a true back position 62a. Evaluation points (displacement vectors) are present on sides 70, 71, 72, 73 and 74 of the respective square areas. A plurality of evaluation points may be present in areas between the square areas. The priority levels are lowered as the areas are located away from the central point 62a. If the displacement vectors on the lines 70 and 74 have the same evaluation values, for example, the displacement vector on the line 70 is selected.

Also when the search area 61 is split into the square areas shown in FIG. 39, an effect similar to that of the priority distribution shown in FIG. 38 can be attained. The priority distribution shown in FIG. 38 is applicable to a motion in an arbitrary direction, and that shown in FIG. 39 is applicable to a linear motion (horizontal or vertical motion) of the overall screen.

[Structure 2 of Compare Circuit]

Figure 40:
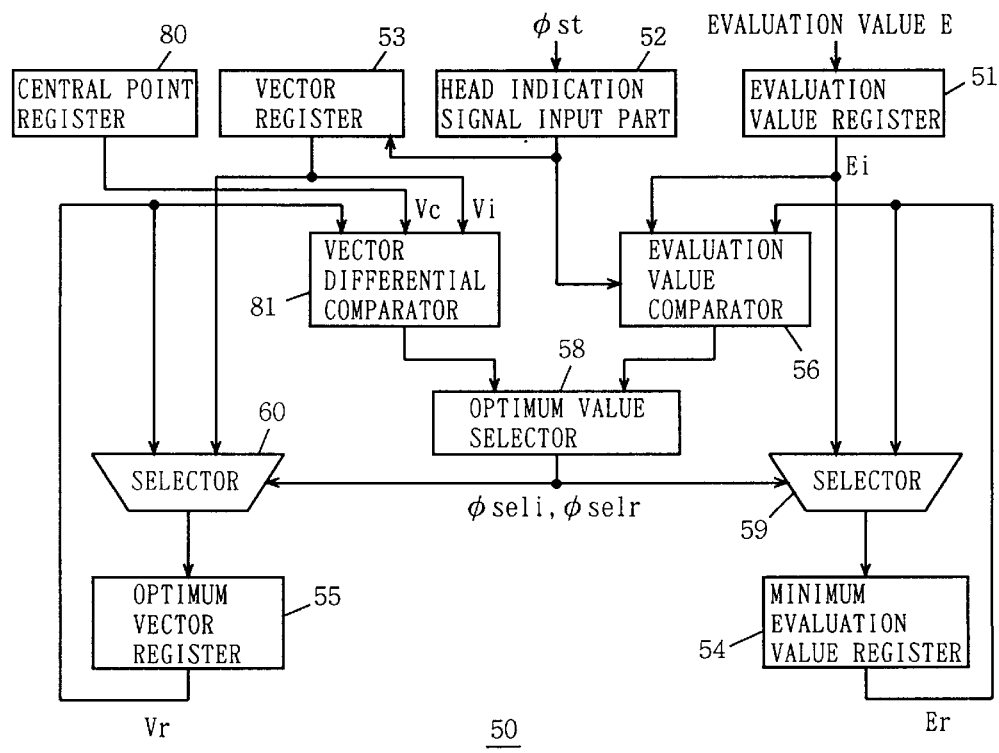
FIG. 40 schematically illustrates an exemplary structure 2 of the compare circuit shown in FIG. 32.

FIG. 40 illustrates the structure of a modification of the compare circuit 50 with priority determination shown in FIG. 33. The compare circuit 50 with priority determination shown in FIG. 40 is different in structure from that shown in FIG. 33 in a point that FIG. 40 circuit includes a central point register 80 for generating a central vector indicating the central position of priority levels in a search area, and a vector differential comparator 81 for comparing the difference between the displacement vector Vi from the vector register 53 and a central vector Vc from the central point register 80 with the priority of the optimum vector Vr from the optimum vector register 55. The remaining structure of this compare circuit 50 is identical to that shown in FIG. 33, and corresponding portions are denoted by the same reference numerals.

Figure 41:
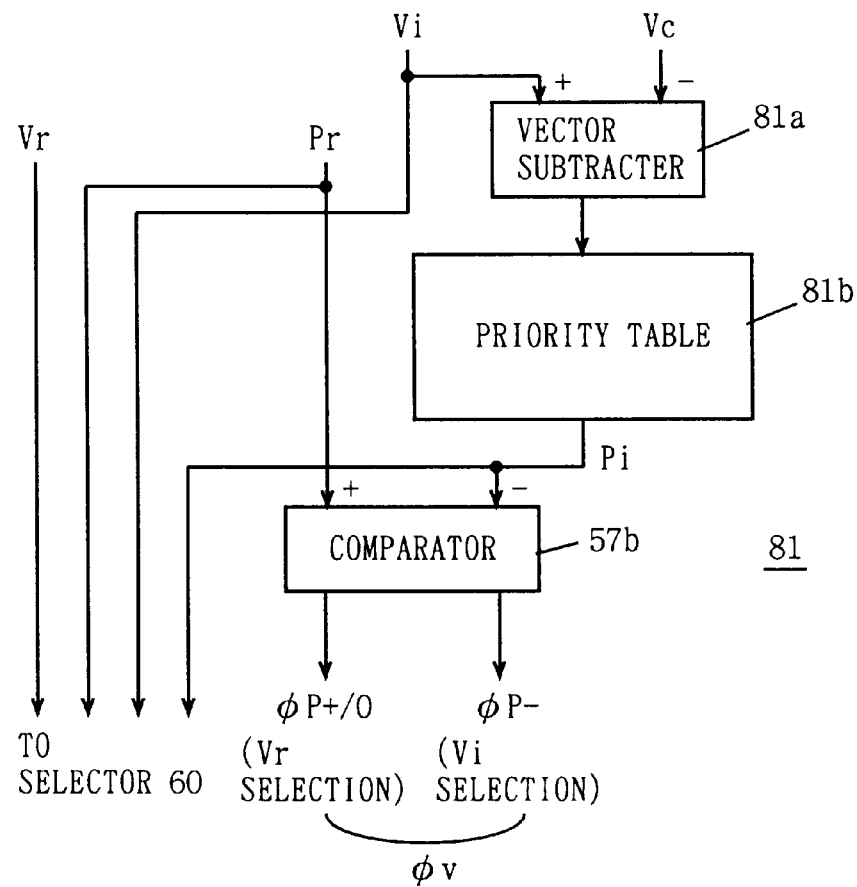
FIG. 41 schematically illustrates the structure of a vector differential comparator shown in FIG. 40.

FIG. 41 schematically illustrates an exemplary structure of the vector differential comparator 81 shown in FIG. 40. Referring to FIG. 41, the vector differential comparator 81 includes a vector subtracter 81a for subtracting the central vector Vc from the input displacement vector Vi, a priority table 81b for outputting corresponding priority with an output vector from the vector subtracter 81a as an address thereto, and a comparator 57b for comparing the priority Pr of the optimum vector Vr and the priority Pi read from the priority table 81b. The structures of the priority table 81b and the comparator 57b are identical to those shown in FIG. 36. The priority table 81b stores the priority data for each search window block position (evaluation point) around a true back position of the search area. In this case, the priority table 81b stores the priority levels of evaluation points of a search area which is wider than the actual search area, in order to accommodate such a case that the position indicated by the central vector Vc is present in the vicinity of any of four corners of the search area.

Figure 42:
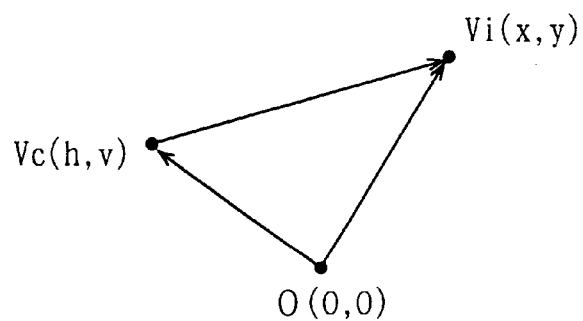
FIG. 42 illustrates operations of the vector differential comparator shown in FIG. 40.

The vector subtracter 81a subtracts the central vector Vc from the input displacement vector Vi. As shown in FIG. 42, values of horizontal and vertical components of the input displacement vector Vi=(x, y) and the central vector Vc=(h, v) are decided around the true back position, i.e., the origin O (0, 0). When the vector subtracter 81a subtracts the central vector Vc from the input displacement vector Vi, the vector obtained as the result has horizontal and vertical components with the central vector Vc=(h, v) as the origin. Namely, the true back position moves to the position indicated by the central vector Vc. Therefore, the priority levels are distributed around the position indicated by the central vector Vc. Thus, the position indicated by the central vector Vc has the highest priority, and there is a high possibility that the motion vector is detected in the vicinity thereof. If the value of the central vector Vc is fixedly set, it is possible to reliably make the values of motion vectors substantially identical to each other in case of a screen structure in which motions are made regularly unidirectionally changing at regular intervals, for example, thereby reducing the amount of codes of the motion vectors in response.

[Priority Distribution 1]

Figure 43:
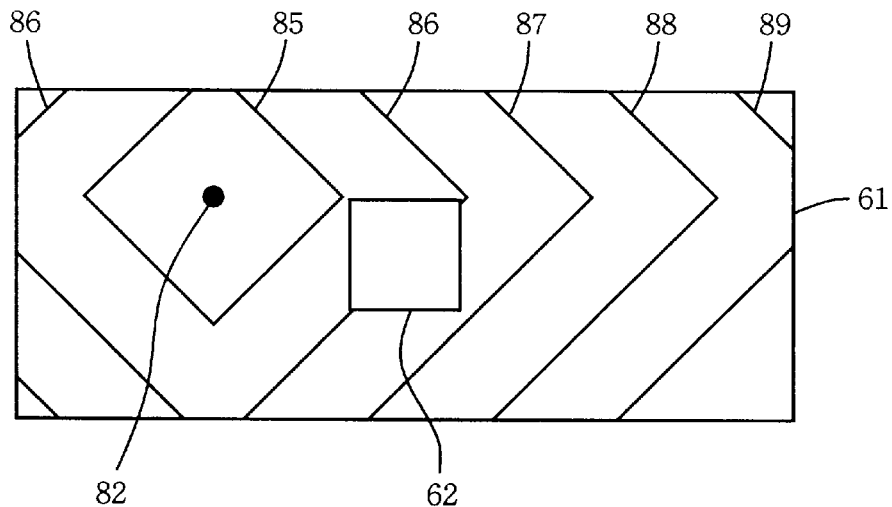
FIG. 43 illustrates an exemplary priority distribution 1 in the compare circuit shown in FIG. 40.

FIG. 43 illustrates a priority distribution 1 in a search area 63 in the structure shown in FIG. 40. Referring to FIG. 43, lines 85, 86, 87, 88 and 89 are so arranged as to form rhombic areas around a central point 82 indicated by a central vector in the search area 63. Evaluation points are present on these lines 85 to 89. The central point 82 is present on a position different from that of a true back search window block 62. The priority levels are increased toward the central point 82.

As clearly understood from the priority distribution shown in FIG. 43, there is a high possibility that an evaluation point close to the central point 82 is decided as a motion vector.

[Priority Distribution 2]

Figure 44:
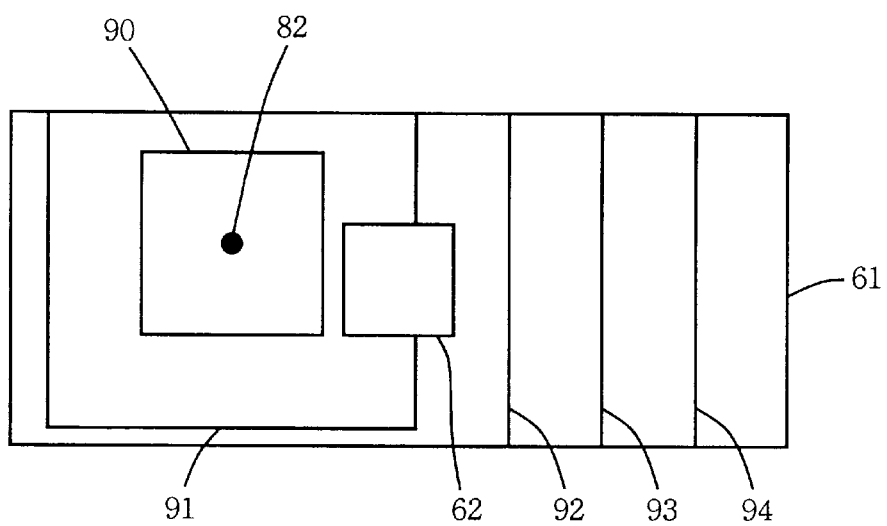
FIG. 44 illustrates an exemplary priority distribution 2 in the compare circuit shown in FIG. 40.

FIG. 44 illustrates a modification of the priority distribution in the compare circuit 50 shown in FIG. 40. Referring to FIG. 44, lines 90, 91, 93, 94 and 95 forming squares are arranged around a central point 82. While evaluation points are present on the lines 90 to 94, a plurality of evaluation points (search window block positions) may be horizontally present between these lines 90 to 94. Also in the distribution shown in FIG. 44, the priority levels are lowered as the areas are located away from the central point 82 in a horizontal direction. Also when the priority distribution forming squares is implemented as shown in FIG. 44, there is a high possibility that an evaluation point close to the central point 82 is detected as a motion vector, and variation of such motion vectors can be suppressed in response.

In accordance with the structure of the compare circuit 50 shown in each of FIGS. 40 to 44, it is possible to detect the motion vectors around arbitrary points, reduce the amount of codes allotted to the motion vectors in transmission, transmit other codes related to the picture quality, and form a high-efficiency image coding system of high picture quality.

[Structure 3 of Compare Circuit]

Figure 45:
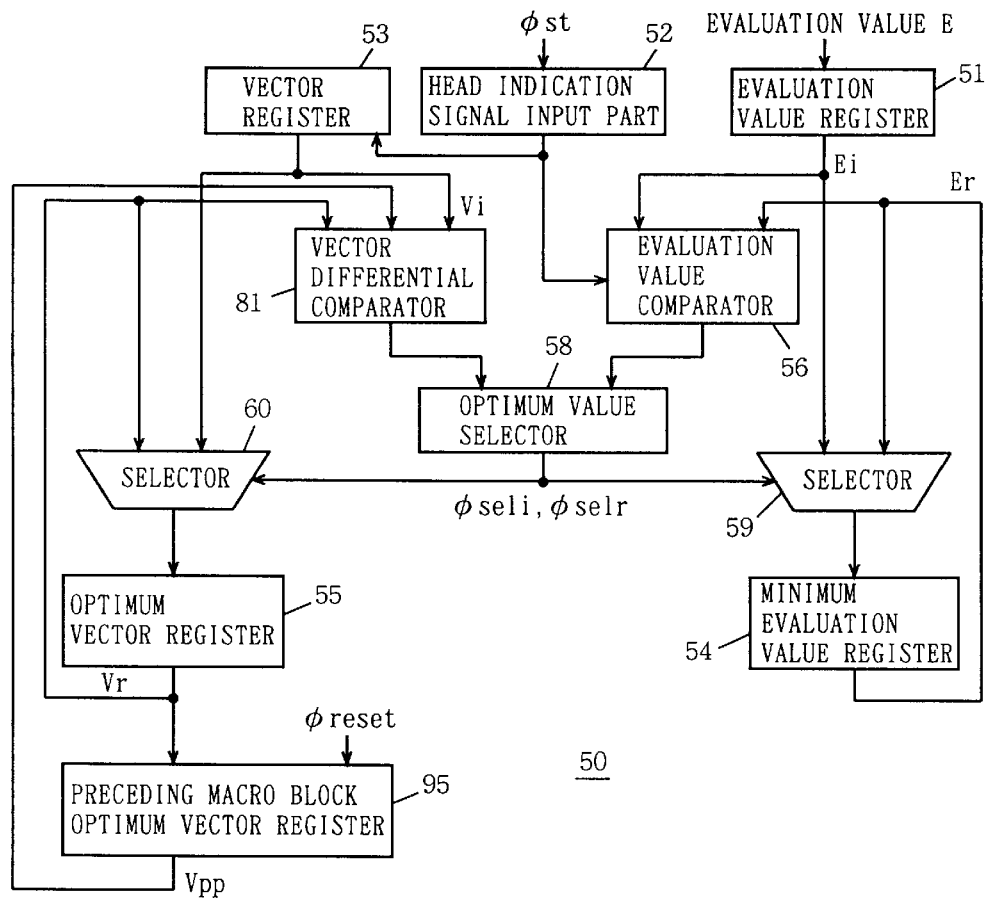
FIG. 45 illustrates an exemplary structure 3 of the compare circuit shown in FIG. 32.

FIG. 45 schematically illustrates the structure of another modification of the compare circuit 50 according to the present invention. The compare circuit 50 shown in FIG. 45 is different in structure from that shown in FIG. 40 in the following point: In place of the central point register 80, a preceding macro block optimum vector register 95 is provided for storing the optimum vector of a preceding macro block from an optimum vector register 55. The preceding macro block is a template block having a motion vector being its optimum vector detected immediately in advance of a template block under evaluation. An optimum vector Vp stored in the preceding macro block optimum vector register 95 is supplied to a vector differential comparator 81. The vector differential comparator 81 obtains the difference between the preceding macro block optimum vector Vp and a displacement vector Vi from a vector register 53, and compares the priority levels of a vector obtained as the result of this differentiation and an optimum vector Vr from the optimum vector register 55.

Therefore, the structure of the vector differential comparator 81 is identical to that shown in FIG. 41, except that the preceding macro block optimum vector Vp is supplied in place of the central vector Vc. The preceding macro block optimum vector register 95 has a reset function, for resetting its stored value to zero by a reset signal φreset. This reset signal φreset is asserted when the head of a slice and the preceding macro block are subjected to intramacro-block processing. Since continuity of the macro blocks is lost in this case, the optimum vector is searched for around the central vector Vc in detection thereof.

Operations of the compare circuit 50 shown in FIG. 45 are identical to those of the structures shown in FIGS. 33 and 40, except that the preceding macro block optimum vector Vp is employed in place of the central point vector Vc. In the structure of the circuit 50, the central point in the search area 63 moves to a position indicated by the preceding macro block optimum vector Vp. Therefore, the priority levels are distributed around the position indicated by the preceding macro block optimum vector Vp. Thus, there is a high possibility that the motion vector of the template block under evaluation takes a value identical to or approximate to the optimum vector Vp of the preceding macro block while there is a high possibility that the motion vector differential value is made zero in motion vector coding, whereby the amount of codes of motion vectors to be transmitted can be reduced. In both of images having small and large amounts of motions respectively, therefore, for adjacent macro blocks (coding is generally performed in units of macro blocks in raster scan order), change amounts of motion vectors between the adjacent macro blocks are small, and the amounts of codes of motion vectors can be reliably reduced even for greatly changing images.

In place of the optimum vector Vp of the preceding macro block, the motion vector may be employed. The reset signal φreset is asserted by observing each header information.

[Priority Distribution 1]

Figure 46:
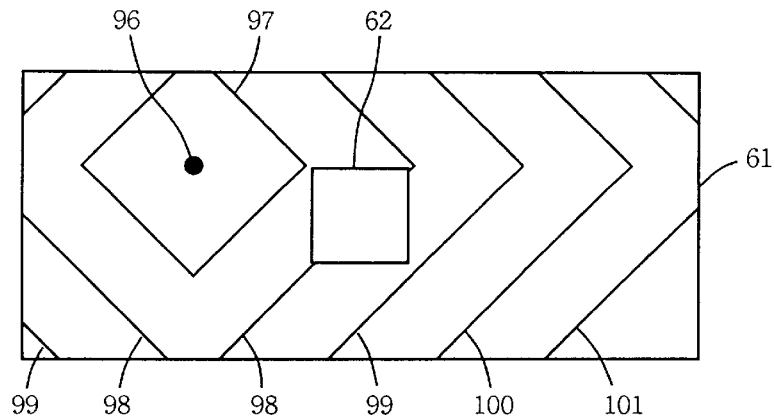
FIG. 46 illustrates an exemplary priority distribution 1 of the compare circuit shown in FIG. 45.

FIG. 46 illustrates an exemplary priority distribution in the compare circuit 50 shown in FIG. 45. Referring to FIG. 46, a search area 61 is split into a plurality of areas by lines 97, 98, 99, 100 and 101 forming radially drawn or distributed rhombi around an evaluation point 96 indicated by an optimum vector Vp of a preceding macro block. A search window block 62 at the true back of the search area 61 is positioned at a central portion of the search area 61. The evaluation point 96 indicated by the optimum vector Vp of the preceding macro block is different from the position of the true back search window block 62. The priority levels are lowered as the distances between the areas and the evaluation point 96 are increased. When evaluation values of evaluation points on the lines 99 and 100 are identical to each other, for example, the evaluation point, i.e., a displacement vector on the line 99 is selected.

The priority distribution shown in FIG. 46 is different from that shown in FIG. 43 merely in a point that the evaluation point indicated by the optimum vector Vp of the preceding macro block is employed as the central point. In this case, there is a high possibility that the template block under evaluation has the same motion vector as the preceding macro block, and the amount of motion vector codes can be reliably reduced even for a greatly moving image.

[Priority Distribution 2]

Figure 47:
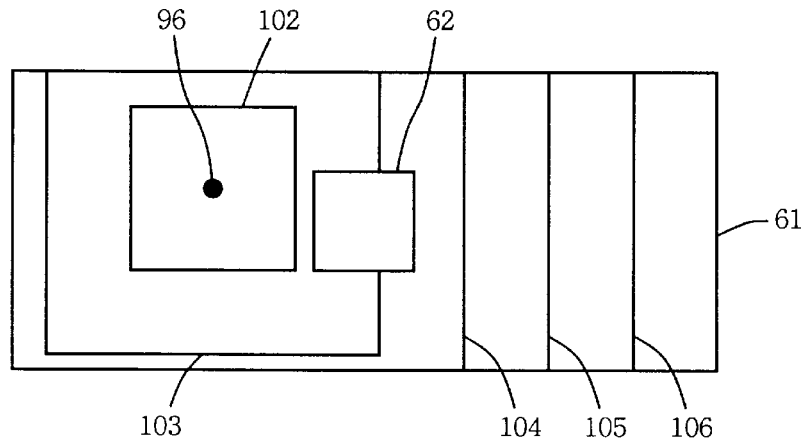
FIG. 47 illustrates an exemplary priority distribution 2 of the compare circuit shown in FIG. 45.

FIG. 47 illustrates another exemplary priority distribution in the compare circuit 50 shown in FIG. 45. As shown in FIG. 47, lines 102, 103, 104, 105 and 106 are arranged in a search area 61 to form a plurality of square areas around an evaluation point 96 indicated by an optimum vector Vp of a preceding macro block. A plurality of evaluation points may be present in a horizontal direction between adjacent ones of the lines 102 to 106. Evaluation points are arranged on the lines 102 to 106 respectively. The priority levels are reduced as the distances between the areas and the evaluation point 96 are increased. When evaluation values of the evaluation points on the lines 104 and 105 are identical to each other, for example, a displacement vector corresponding to the evaluation point on the line 104 is selected.

Also when the search area 61 is split into square areas for distributing the priority levels, there is a high possibility that the evaluation point 96 indicated by the optimum vector Vp of the preceding macro block is selected as the optimum vector of the template block under evaluation similarly to the priority distribution shown in FIG. 46, the values of motion vectors between macro blocks can be substantially equalized with each other regardless of presence/absence and degrees of motions, whereby the amount of motion vector codes can be reduced.

In case of utilizing the compare circuit 50 shown in FIG. 45, as hereinabove described, the priority levels are distributed around the position indicated by the optimum vector Vp of the preceding macro block, whereby it is possible to increase the possibility that the motion vector of the template block under evaluation takes the same value as the motion vector indicated by the preceding macro block.

Therefore, the values of the motion vectors of adjacent macro blocks can be substantially equalized with each other, whereby the amount of motion vector codes can be reduced in response. Consequently, it is possible to transfer a larger number of codes related to the picture quality, resulting in an image coding system of high picture quality.

[Structure 4 of Compare Circuit]

Figure 48:
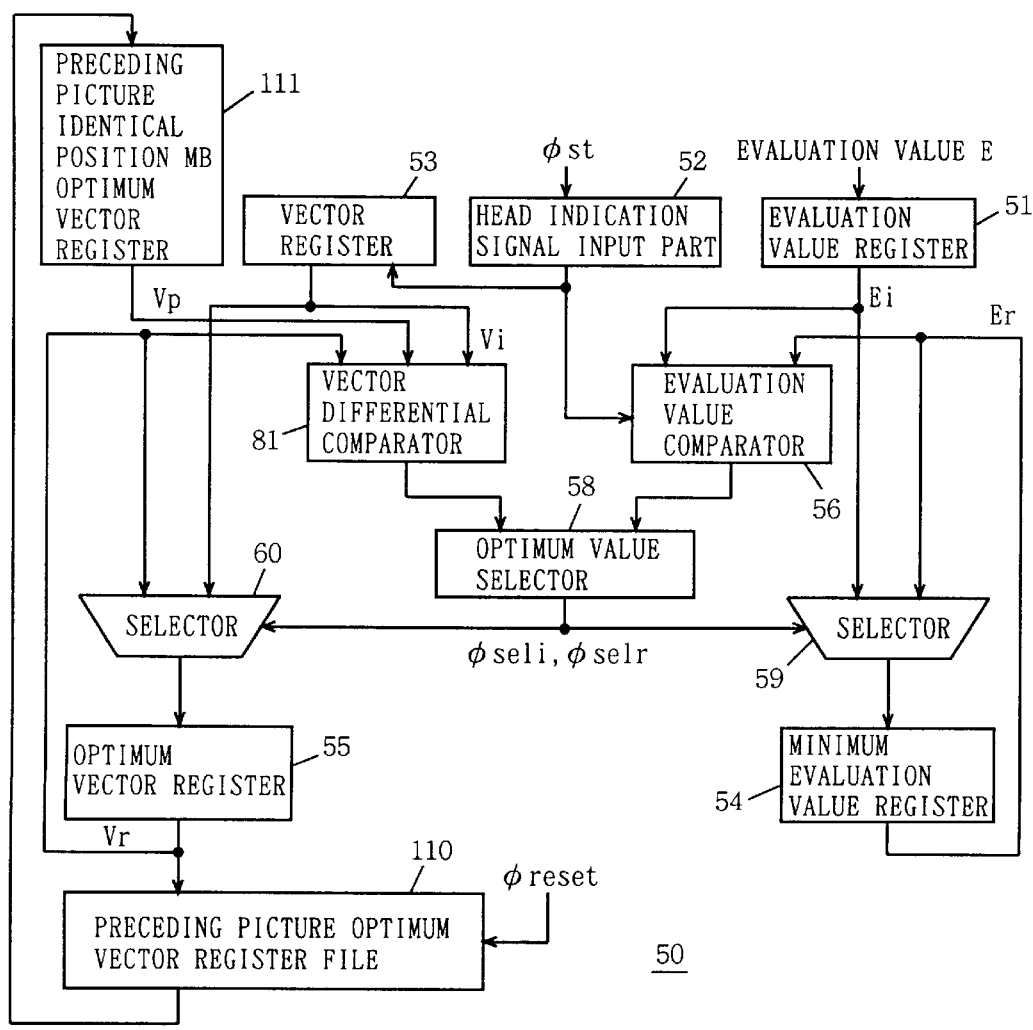
FIG. 48 illustrates an exemplary structure 4 of the compare circuit shown in FIG. 32.

FIG. 48 schematically illustrates a structure 4 of the compare circuit 50 according to an embodiment of the present invention. The structure of the compare circuit 50 shown in FIG. 48 is different from that shown in FIG. 46 in the following points: The compare circuit 50 is provided with an optimum vector register file 110 storing an optimum vector for each macro block (template block) of a preceding picture processed temporally immediately in advance of a current picture including a template block (macro block) under evaluation, and a preceding picture identical position macro block (MB) optimum vector register 111 storing the optimum vector of the macro block located on the same position as the template block under evaluation from the preceding picture optimum vector register file 110.

The preceding picture optimum vector register file 110 stores each optimum vector from an optimum vector register 55 in an FIFO (first-in first-out) manner for each template block. The preceding picture identical position MB optimum vector register 111 stores each optimum vector read from the preceding picture optimum vector register file 110 and supplies the same to a vector differential comparator 81. The vector differential comparator 81 obtains the difference between the optimum vector Vp supplied from the preceding picture identical position macro block (MB) optimum vector register 111 and a displacement vector Vi from a vector register 53, and compares the priority levels of the differential vector and the optimum vector read from the optimum vector register 55 with each other. Thus, the compare circuit 50 shown in FIG. 48 is identical in structure and processing to that shown in FIG. 46, except that the optimum vector of the macro block on the same position in the preceding picture is employed in place of the optimum vector of the preceding macro block.

Also in the structure shown in FIG. 48, a reset signal φreset is asserted, a corresponding optimum vector of the optimum vector register 110 is reset and an optimum vector is searched for around a central vector of "0" when the head of a slice having a possibility of destructing continuity between macro blocks and when the preceding macro block is subjected to intra-macro block processing. Alternatively, the register 111 may be reset.

Due to the vector difference computing in the vector differential comparator 81, the priority levels are distributed around a position indicated by the optimum vector of the macro block of the same position in the preceding picture. In case of an image train continuously changing little by little, therefore, it is possible to reduce the change amount of motion vectors of the respective template blocks (macro blocks). Thus, it is possible to correctly detect predictive images, motion vectors are not abruptly changed between images, change amounts of motion vectors in respective macro blocks are small in response, it is possible to substantially equalize values of motion vectors between adjacent macro blocks with each other, the amount of codes of the motion vectors can be reduced in response, and further picture improvement can be thereby implemented.

[Exemplary Priority Distribution 1]

Figure 49:
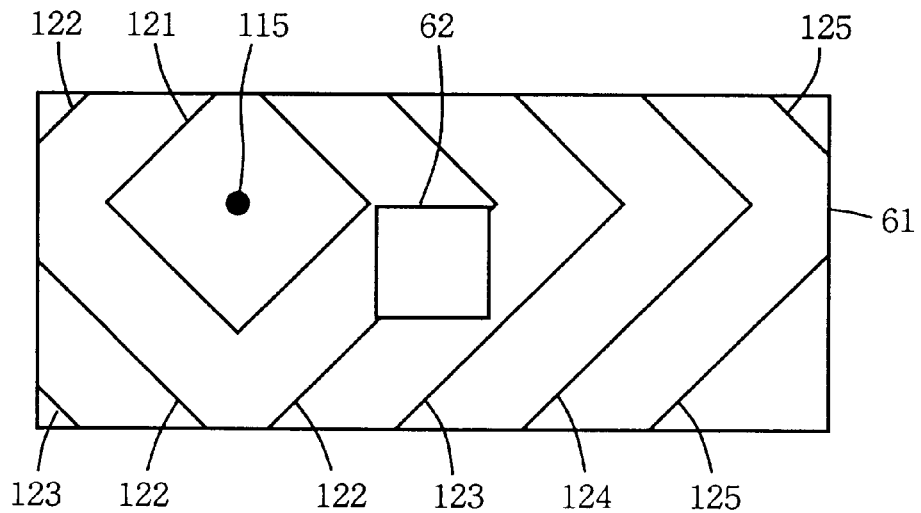
FIG. 49 illustrates an exemplary priority distribution 1 of the compare circuit shown in FIG. 48.

FIG. 49 illustrates an exemplary priority distribution 1 in a search area 61 in the compare circuit 50 shown win FIG. 48. Referring to FIG. 49, the search area 61 is split into a plurality of areas through lines 121, 122, 123, 124 and 125 which are formed to define radially arranged rhombic areas around an evaluation point 115 indicated by an optimum vector of a macro block of the same position in a preceding picture. Evaluation points for displacement vectors in the search area 61 are arranged on the lines 121 to 125 respectively. The priority levels are lowered as the distances between the areas and the evaluation point 115 are increased. A true back search window block 62 for the template block under evaluation is present at the center of the search area 61, and an evaluation point 115 indicated by the optimum vector of the macro block of the same position in the preceding picture is displaced from the true back position. When evaluation values of the evaluation points on the lines 123 and 124 are identical to each other, for example, the evaluation point on the line 123 is selected.

[Exemplary Priority Distribution 2]

Figure 50:
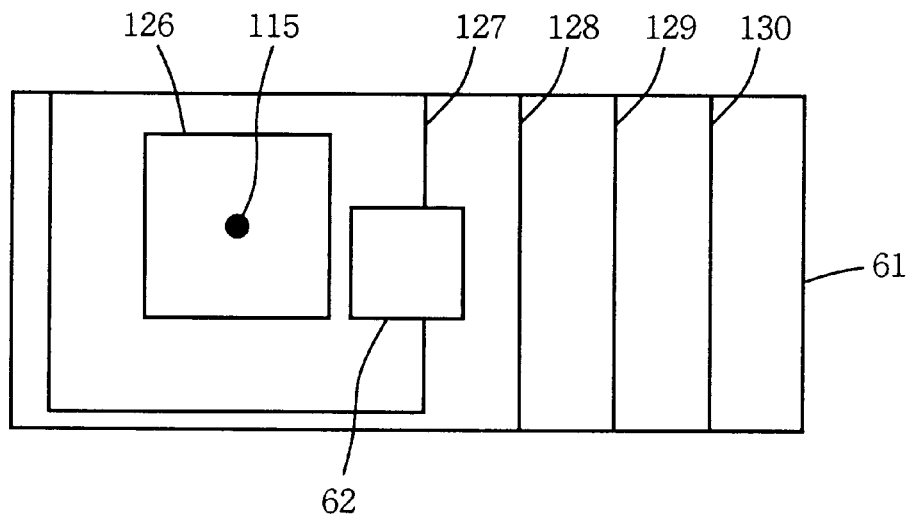
FIG. 50 illustrates an exemplary priority distribution 2 of the compare circuit shown in FIG. 48.

FIG. 50 illustrates an exemplary priority distribution 2 in case of employing the compare circuit 50 shown in FIG. 48. Referring to FIG. 50, a search area 61 is split into a plurality of square areas radially arranged by lines 126, 127, 128, 129 and 130 around an evaluation point 115 indicated by an optimum vector of a macro block of the same position in a preceding picture. Also in FIG. 50, the evaluation point 115 indicated by the optimum vector of the macro block of the same position in the preceding picture is shown being on a position different from that of a true back search window block 62. Also in the distribution shown in FIG. 50, the priority levels are lowered as the distances between the areas and the evaluation point 115 are increased.

In case of the priority arrangement shown in FIG. 49 or 50, it is possible to increase the possibility that a value similar to that of the optimum vector of the macro block of the same position in the preceding picture is taken as the optimum vector of the template block in evaluation.

In the compare circuit 50 shown in FIG. 48, the preceding picture is not that preceding in display order but a picture temporally precedent in processing order. In coding, no motion vector of an I picture but those of P and B pictures are detected. Therefore, an optimum vector of a P or B picture is employed as the preceding picture. In case of the B picture, forward prediction and backward prediction are performed with different pictures which are processed immediately precedently in time. The order of this processing is different from the image reproduction order, and hence images are so uncontinuous that a plurality of pictures may be present between the preceding picture and the picture under evaluation. In this case, however, only several images are present, to cause no significant image change. Even if an optimum vector of a picture precedently processed in processing order is employed, therefore, it is possible to suppress a significant change of the motion vector, resulting in no particular problem.

According to this structure of the compare circuit 50, as hereinabove described, the priority is assigned around the evaluation point 115 indicated by the optimum vector of the macro block of the same position in the preceding picture, whereby changes of the motion vectors can be suppressed, significant fluctuation of the amount of codes of the motion vectors can be suppressed over the pictures, and the amount of codes of the motion vectors to be transmitted on the average can be reduced in response.

[Structure 5 of Compare Circuit]

Figure 51:
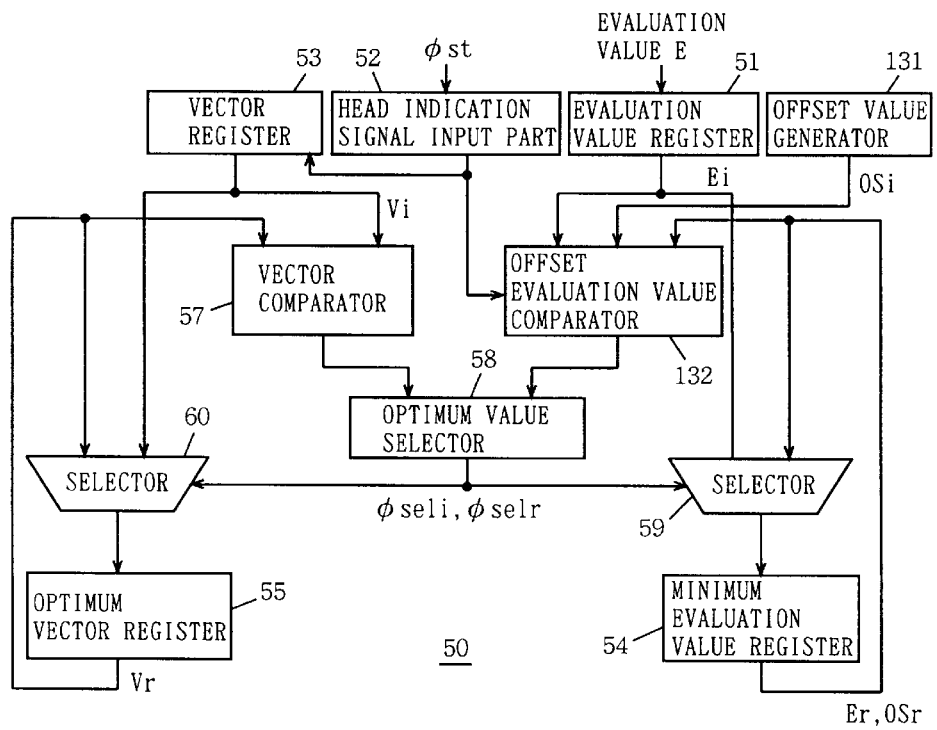
FIG. 51 illustrates an exemplary structure 5 of the compare circuit shown in FIG. 32.

FIG. 51 schematically illustrates a structure 5 of the compare circuit 50 according to the present invention. The compare circuit 50 shown in FIG. 51 is different from that shown in FIG. 33 in a point of providing an offset value to each evaluation value. The compare circuit 50 shown in FIG. 51 includes an offset value generator 131 for providing an offset value OSi to an input evaluation value Ei from an evaluation value register 51, and an offset evaluation value comparator 132 for adding up the input evaluation value Ei with the offset value OSi from the offset value generator 131 while adding up a minimum evaluation value Er read from a minimum evaluation value register 54 with a corresponding offset value OSr and comparing the addition results with each other. The remaining structure of the compare circuit 50 is identical to that shown in FIG. 33, and corresponding portions are denoted by the same reference numerals.

Figure 52:
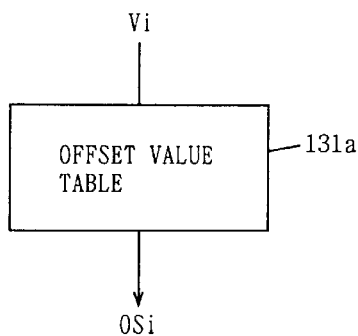
FIG. 52 schematically illustrates the structure of an offset value generator shown in FIG. 51.

The offset value generator 131, an exemplary structure of which is shown in FIG. 52, for example, is formed by an offset table 131a storing offset values in the form of a table with an input displacement vector Vi from a vector register 53 as an address thereto. An offset value for a search window block (evaluation point) under evaluation is outputted as read data.

Figure 53:
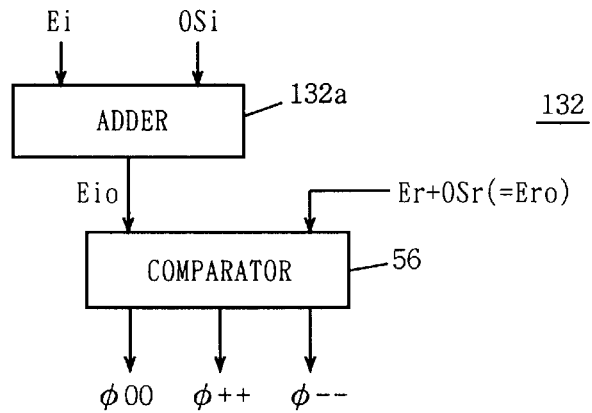
FIG. 53 schematically illustrates the structure of an offset evaluation value comparator shown in FIG. 51.

FIG. 53 schematically illustrates the structure of the offset evaluation value comparator 132 shown in FIG. 51. Referring to FIG. 53, the offset evaluation value comparator 132 includes an adder 132a for adding up the input evaluation value Ei with the offset value OSi from the offset value generator 131, and a comparator 56 for comparing an offset evaluation value Eio from the adder 132a with an added value Ero of the minimum evaluation value Er supplied from the minimum evaluation value register 54 and the corresponding offset value OSr. The comparator 56, which is identical in structure to that shown in FIG. 35, outputs an output selection signal φ00, a minimum evaluation value selection signal φ++, and an input evaluation value selection signal φ--.

The minimum evaluation value register 54 stores the corresponding offset value OSr along with the minimum evaluation value Er. Alternatively, the minimum evaluation value register 54 may store either the offset evaluation value Eio outputted from the adder 132a or the offset minimum evaluation value Ero under control by the optimum value selector 58 shown in FIG. 51. The offset evaluation value comparator 132 compares the offset evaluation values with each other and it is not particularly necessary to store evaluation and offset values independently of each other.

When the offset input evaluation value Eio and the offset minimum evaluation value Ero are identical to each other, the optimum value selector 58 controls operations of selectors 59 and 60 in accordance with an output result of a vector comparator 57. The vector comparator 57 shown in FIG. 51 assigns priority to each search window block in a search area. The priority may be distributed either in rhombic or square shapes, or an evaluation point close to a central portion in the search area may be simply selected. Alternatively, the priority may not particularly be assigned to each block, since the offset value can be utilized as priority information.

Provision of the offset value to each evaluation value means that priority is assigned to the search window block corresponding to the evaluation value. If the offset value is large, the offset evaluation value is increased and there is a small possibility that the same is detected as a motion vector in response. This is equivalent to reduction of the priority. Namely, it is possible to select a search window block having the smallest possible offset value in an evaluation stage, i.e., high priority, and variation of optimum vectors can be suppressed in response.

In the aforementioned structure, the minimum evaluation value register 54 may store only the minimum evaluation value Er, and no offset value OSr is provided. The priority can be assigned in accordance with the offset values, and the evaluation values can be further reliably evaluated.

[Exemplary Offset Value Distribution 1]

Figure 54:
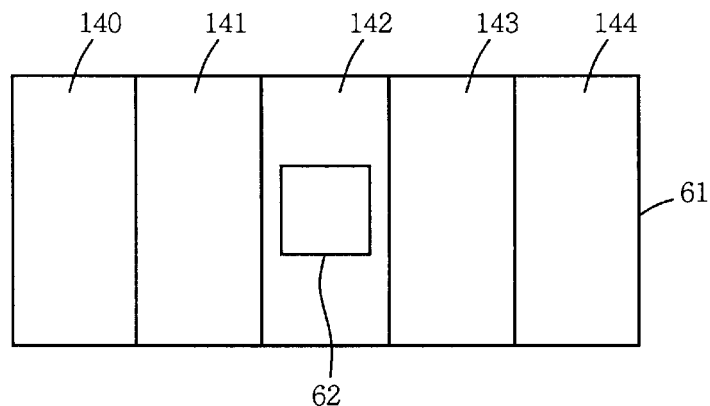
FIG. 54 illustrates an exemplary offset value distribution 1 in the compare circuit shown in FIG. 51.

FIG. 54 illustrates an exemplary distribution of offset values generated by the offset value generator 131 shown in FIG. 51. Referring to FIG. 54, a search area 61 is split into a plurality of areas 140, 141, 142, 143 and 144 by vertically extending lines.

The areas 140 to 144 are arranged around a true back search window block 62. The area 142 is given an offset value of zero, the areas 141 and 143 are allotted intermediate offset values, and the areas 140 and 144 are given the largest offset value, for example. The search area 61 is split into the plurality of areas 140 to 144 in a horizontal direction, and hence there is a high possibility that a motion vector is set in an area having a small offset value even if a horizontal component value is increased, and variation between motion vectors can be suppressed in response.

[Exemplary Offset Value Distribution 2]

Figure 55:
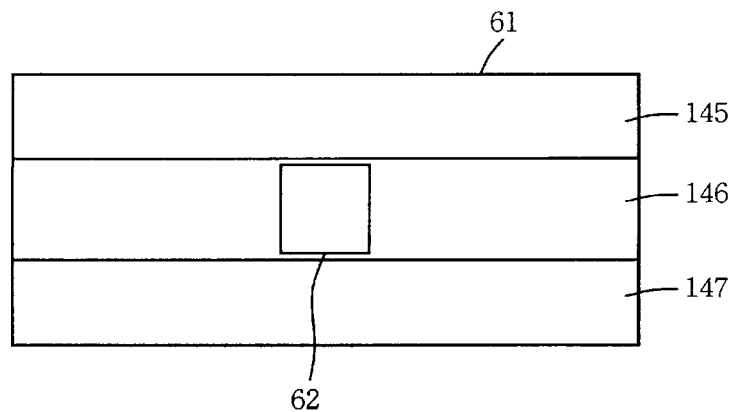
FIG. 55 illustrates an exemplary offset value distribution 2 in the compare circuit shown in FIG. 51.

FIG. 55 illustrates another exemplary distribution of offset values generated by the offset value generator 131 shown in FIG. 51. Referring to FIG. 55, a search area 61 is vertically split into three areas 145, 146 and 147 by horizontally extending lines. These areas 145 to 147 are arranged with a true back search window block 62 centered. The area 146 is given an offset value of zero, for example, and the areas 145 and 147 are given large offset values. In this case, it is possible to increase a possibility of selecting a displacement vector in the area 146 as an optimum vector. Referring to FIG. 55, it is possible to limit an optimum vector distribution range to the area 146 in a case in which there is a possibility that the motion vectors are changed in relation to a vertical motion, and variation of the motion vectors can be suppressed in response.

[Exemplary Offset Value Distribution 3]

Figure 56:
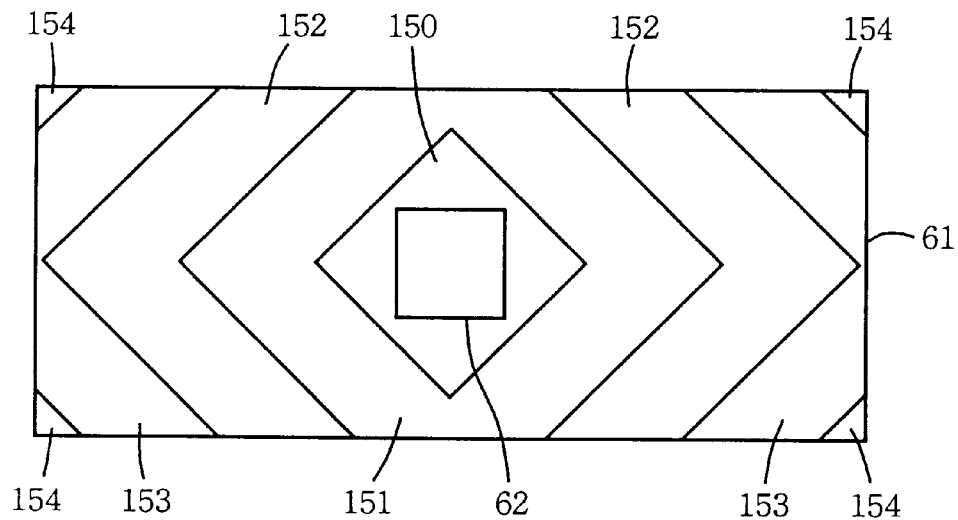
FIG. 56 illustrates an exemplary offset value distribution 3 in the compare circuit shown in FIG. 51.

FIG. 56 illustrates still another exemplary offset value distribution in the compare circuit 50 shown in FIG. 51. In the offset value distribution shown in FIG. 56, a search area 61 is radially split into rhombic areas 150, 151, 152, 153 and 154 with a true back search window block 62 centered. In case of selecting an optimum vector particularly in the area 150, the area 150 is given an offset value of zero and offset values are successively increased from the area 150 toward the area 154. Thus, an evaluation value of a search window block including an evaluation point in the area 150 can be reduced below those in the remaining areas 151 to 154, the optimum vector can be searched for in the area 150, and variation of motion vectors can be suppressed in response.

[Exemplary Offset Value Distribution 4]

Figure 57:
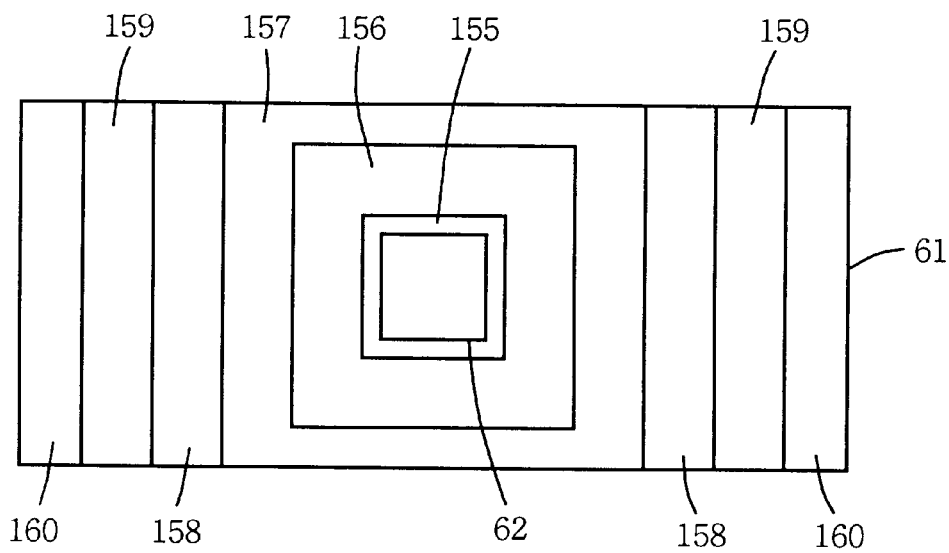
FIG. 57 illustrates an exemplary offset value distribution 4 in the compare circuit shown in FIG. 51.

FIG. 57 illustrates a further exemplary distribution of offset values generated by the offset value generator 131 shown in FIG. 51. Referring to FIG. 57, a search area 61 is radially split into square areas 155, 156, 157, 158, 159 and 160 with a true back search window block 62 centered. A plurality of evaluation points are present in each area along the horizontal direction. Boundary lines may be drawn for respective horizontal components of displacement vectors.

Also when the search area 61 is radially split into the square areas 155 to 160 with the true back search window block 62 centered as shown in FIG. 57, the area 155 has the highest priority and the priority levels are successively lowered from the area 156 toward the area 160 if the central area 155 is given the lowest offset value of zero, for example, and offset values for the remaining areas 156 to 160 are successively increased. Thus, the optimum vector can be detected in the area 155, and variation of motion vectors can be suppressed in response.

According to the structure of the compare circuit 50 shown in FIG. 51, as hereinabove described, offset values are given to evaluation values in accordance with evaluation points thereof, whereby priority can be equivalently assigned to each evaluation value, there is a high possibility that the optimum vector is detected in an area having a small evaluation value, and variation of motion vectors can be suppressed.

[Structure 6 of Compare Circuit]

Figure 58:
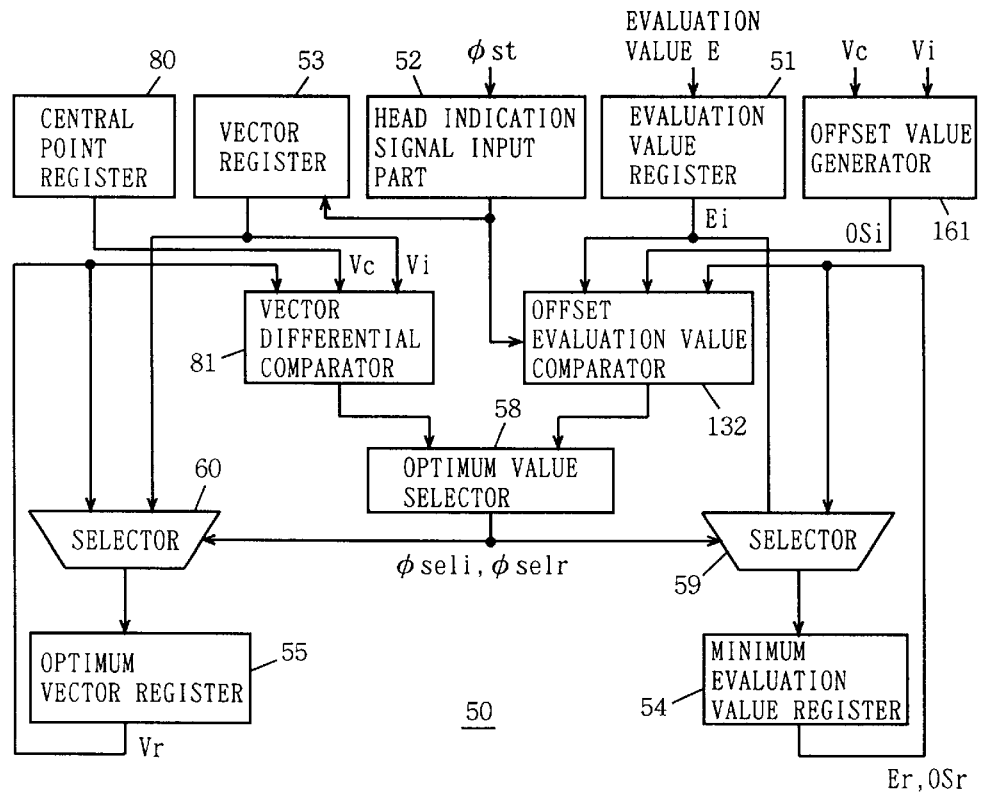
FIG. 58 schematically illustrates an exemplary structure 6 of the compare circuit shown in FIG. 32.

FIG. 58 schematically illustrates a structure 6 of the compare circuit 50 of the motion vector detector according to the present invention. The compare circuit 50 shown in FIG. 58 is different in structure from that shown in FIG. 40 in provision of an offset value generator 161 and an offset evaluation value comparator 132 for comparing evaluation values with each other. The remaining structure of the compare circuit 50 is identical to that shown in FIG. 40, and corresponding portions are denoted by the same reference numerals.

The offset value generator 161 obtains the difference between an input displacement vector Vi from a vector register 53 and a central vector Vc from a central point register 80, and generates an offset value OSi in accordance with the difference. The offset evaluation value comparator 132 is identical in structure to that shown in FIG. 51. The offset evaluation value comparator 132 performs vector addition of an input evaluation value Ei from an evaluation value register 51 and the offset value OSi from the offset value generator 161, and compares the resultant value with a minimum evaluation value Er from a minimum evaluation value register 54 with the corresponding offset value OSr vector-added.

Figure 59:
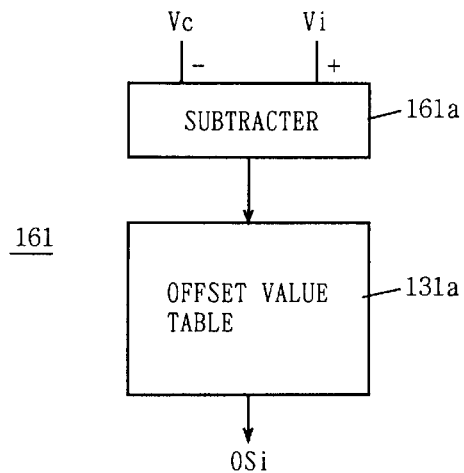
FIG. 59 schematically illustrates the structure of an offset value generator shown in FIG. 58.

FIG. 59 schematically illustrates the structure of the offset value generator 161 shown in FIG. 58. Referring to FIG. 59, the offset value generator 161 includes a subtracter 161a for subtracting the central vector Vc from the input displacement vector Vi, and an offset value table 131a for receiving an output of the subtracter 161a as an address and outputting the corresponding offset value OSi. The offset value table 131a, which is identical in structure to that shown in FIG. 52, stores offset values for respective evaluation points in a search area. The subtracter 161a performs this vector subtraction of subtracting the central vector Vc from the input displacement vector Vi, thereby moving a true back position in the search area to an evaluation point position indicated by the central vector Vc. Also in a vector differential comparator 81, the priority levels are distributed with a point indicated by the central vector Vc centered, and hence it is possible to reliably distribute the optimum vector in the vicinity of the evaluation point indicated by the central vector Vc by offsetting in evaluation of evaluation values and the priority in vector evaluation values, and variation of motion vectors between template blocks can be suppressed in response.

[Exemplary Offset Value Distribution 1]

Figure 60:
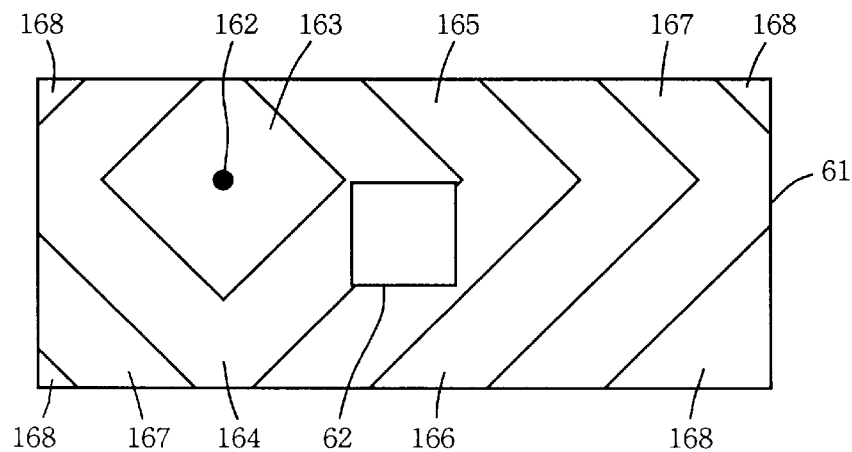
FIG. 60 illustrates an exemplary offset value distribution 1 in the compare circuit shown in FIG. 58.

FIG. 60 illustrates an exemplary offset value distribution in the compare circuit 50 shown in FIG. 58. Referring to FIG. 60, a plurality of lines are arranged in a search area 61 to radially arrange rhombic areas 163, 164, 165, 166, 167 and 168 with an evaluation point 162 indicated by the central vector Vc centered. Evaluation points are present on these lines. Offset values are given to the rhombic areas 163, 164, 165, 166, 167 and 168 formed by these lines in accordance with the distances between these areas 163 to 168 and the evaluation point 162 indicated by the central vector Vc. The offset values are increased as the areas 163 to 168 are increased in the distance from the evaluation point 162. Therefore, the evaluation value of the evaluation point included in the area 163 is reduced, and there is a high possibility that a displacement vector indicating the evaluation point of the area 163 is decided as an optimum vector.

This offset value distribution is attained by storing the offset values with the evaluation point of the true back search window block 62 centered in the offset value table 131a shown in FIG. 59. The center of the offset value distribution can be readily moved from the true back position to the position of the evaluation point 162 indicated by the central vector Vc through the subtracter 161a.

[Offset Value Distribution 2]

Figure 61:
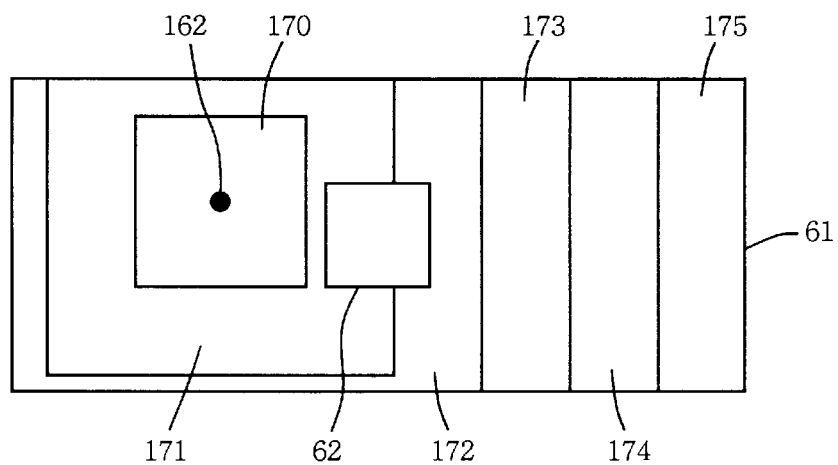
FIG. 61 illustrates an exemplary offset value distribution 2 in the compare circuit shown in FIG. 58.

FIG. 61 illustrates another exemplary offset value distribution in the compare circuit 50 shown in FIG. 58. In the offset value distribution shown in FIG. 61, a search area 61 is so split as to radially arrange square areas 170, 171, 172, 173, 174 and 175 with an evaluation point 162 indicated by a central vector centered. In this case, offset values of the areas 170 to 175 are increased as the areas 170 to 175 are increased in the distance from the evaluation point 162 indicated by the central vector. Due to this offset value distribution, there is a high possibility that an optimum vector is detected in the area 170, and variation of motion vectors can be suppressed in response.

In the case of the offset value distribution shown in FIG. 60 or 61, it is possible to reliably detect optimum vectors in areas with high priority and suppress variation of motion vectors by employing the same mode as the priority distribution in the vector differential comparator 81 (see FIG. 58).

According to the structure 6 of the compare circuit 50 of the motion vector detector according to the present invention, as hereinabove described, the distribution of the offset value allotted to each evaluation value is moved from the true back position to an arbitrary position in the search area, whereby the optimum vector can be detected in the vicinity of a desired position. Further, variation of motion vectors can be reliably suppressed and the amount of codes of the motion vectors can be reduced due to the structure of selecting the optimum central vector in accordance with motions on the screen.

[Structure 7 of Compare Circuit]

Figure 62:
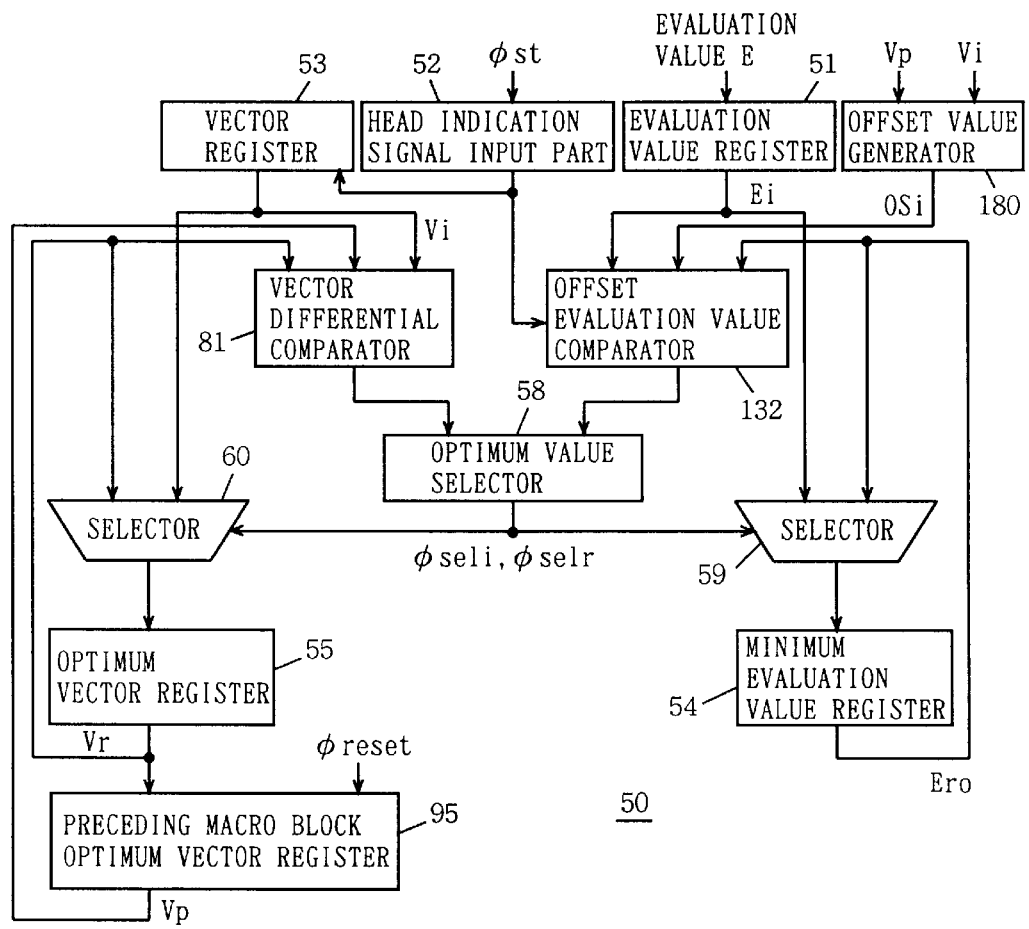
FIG. 62 illustrates an exemplary structure 7 of the compare circuit shown in FIG. 32.

FIG. 62 schematically illustrates a structure 7 of the compare circuit 50 according to the present invention. The compare circuit 50 shown in FIG. 62 is different from that shown in FIG. 45 in the following points: The compare circuit 50 includes an offset value generator 180 for generating an offset value in accordance with the difference between a preceding macro block optimum vector Vp from a preceding macro block optimum vector register 95 and an input displacement vector Vi from a vector register 53, and an offset evaluation value comparator 132 for evaluating evaluation values in accordance with an input evaluation value Ei, an offset value OSi from the offset value generator 180 and a minimum evaluation value Er and a corresponding offset value (symbol Ero denotes these values in FIG. 62) from a minimum evaluation value register 54.

The offset value generator 180, which is similar in structure to that shown in FIG. 59, employs the preceding macro block optimum vector Vp in place of the central vector Vc. Thus, offset values are distributed with an evaluation point indicated by the preceding macro block optimum vector Vp centered. The offset evaluation value comparator 132 compares an offset evaluation value Eio with the offset minimum evaluation value Ero, generates a control signal in accordance with the result of the comparison and supplies the same to an optimum value selector 58. The offset evaluation value comparator 132 is identical in structure to that shown in FIG. 53.

If the offset evaluation values Eio and Ero are identical to each other, the optimum value selector 58 performs a selecting operation in accordance with an output signal from a vector differential comparator 81. In this case, the input displacement vector Vi or an optimum vector Vr stored in an optimum vector register 55 having higher priority is selected. The vector differential comparator 81 employing the priority is identical in operation to that of the compare circuit 50 shown in FIG. 45.

According to the structure shown in FIG. 62, the offset value generator 180 can provide an offset distribution similar to the priority distribution of the vector differential comparator 81. Thus, there is a high possibility that a displacement vector having a small offset evaluation value is selected as the optimum vector, and there is a high possibility that a displacement vector having high priority is selected as the optimum vector. Therefore, the optimum vector can be rendered present in the vicinity of a position indicated by the optimum vector of the preceding macro block, and a code amount of the motion vector can be reduced in response.

[Exemplary Offset Value Distribution 1]

Figure 63:
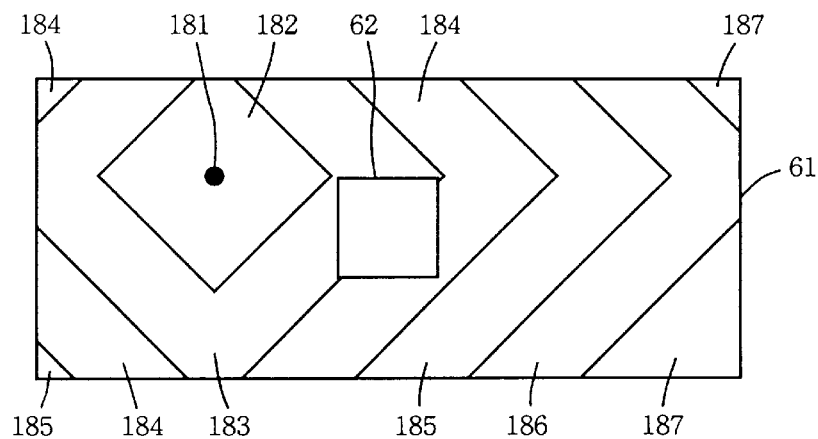
FIG. 63 illustrates an exemplary offset value distribution 1 in the compare circuit shown in FIG. 62.

FIG. 63 illustrates an exemplary offset value distribution of the compare circuit 50 shown in FIG. 62 in a search area 61. Referring to FIG. 63, the search area 61 is so split that rhombic areas 182, 183, 184, 185, 186 and 187 are radially arranged with an evaluation point 181 indicated by a preceding macro block optimum vector centered. Offset values are varied with the areas 182 to 187. The evaluation point 181 indicated by the preceding macro block optimum vector is present on a position different from a true back search window block evaluation point. In the offset value distribution shown in FIG. 63, the offset values are increased as the areas 182 to 187 are increased in the distance from the evaluation point 181. Thus, it is possible to increase a possibility of detecting the optimum vector in the area 182.

When the priority levels are so distributed in a vector differential comparator 81 as to form areas having rhombic shapes with the preceding macro block optimum vector centered, a similar offset value distribution can be provided and it is possible to reliably decide the evaluation point 181 having a small offset value and high priority or a displacement vector close thereto as the optimum vector.

[Exemplary Offset Value Distribution 2]

Figure 64:
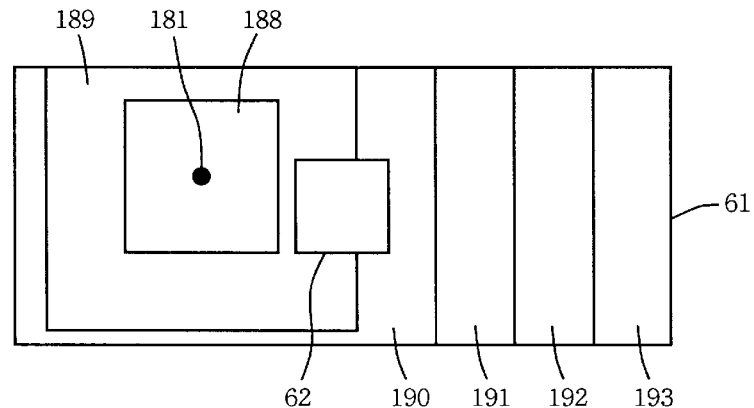
FIG. 64 illustrates an exemplary offset value distribution 2 in the compare circuit shown in FIG. 62.

FIG. 64 illustrates another exemplary offset value distribution in the compare circuit 50 shown in FIG. 62. In the offset value distribution shown in FIG. 64, a search area 61 is so split that square areas 188, 189, 190, 191, 192 and 193 are radially arranged around an evaluation point 181 indicated by a preceding macro block optimum vector. Offset values are varied with the areas 188 to 193. Also in the offset value distribution shown in FIG. 64, it is possible to increase a possibility of detecting an optimum vector in the area 188 by increasing the offset values of the areas 188 to 193 as the distances from the evaluation point 181 indicated by the preceding macro block optimum vector are increased. When the priority distribution in the vector differential comparator 81 shown in FIG. 62 similarly forms square shapes radially arranged around the evaluation point 181 indicated by the preceding macro block optimum vector by splitting the search area 61 such that square areas are radially arranged around the evaluation point 181 indicated by the preceding macro block optimum vector, it is possible to reliably detect the optimum vector at the evaluation point 181 indicated by the preceding macro block optimum vector or in the vicinity thereof.

According to the structure 7 of the compare circuit 50 of the present invention, as hereinabove described, the offset values are distributed with the evaluation point indicated by the preceding macro block optimum vector centered, whereby it is possible to increase the possibility of detecting the optimum vector on the evaluation point indicated by the preceding macro block optimum vector or in the vicinity thereof, and variation of motion vectors can be suppressed in response.

[Structure 8 of Compare Circuit]

Figure 65:
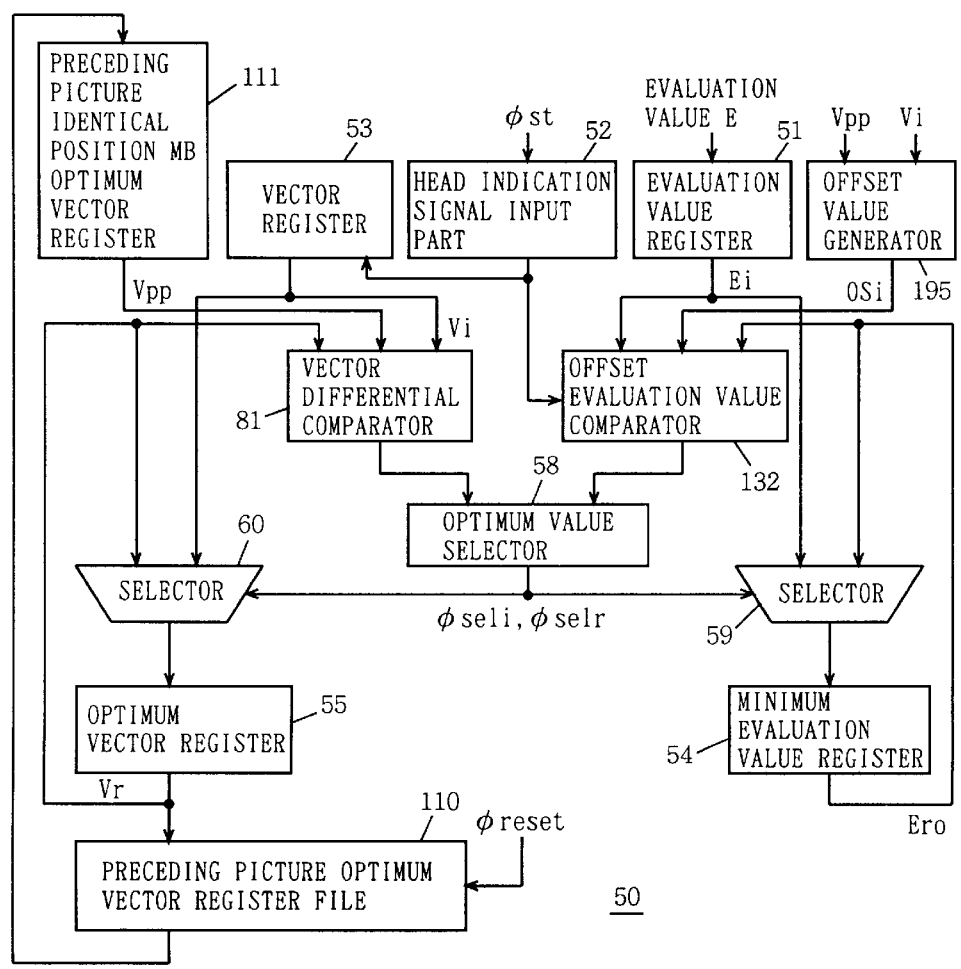
FIG. 65 schematically illustrates an exemplary structure 8 of the compare circuit shown in FIG. 32.

FIG. 65 schematically illustrates a structure 8 of the compare circuit 50 according to the present invention. The compare circuit 50 shown in FIG. 65 is different from that shown in FIG. 48 in the following point: The compare circuit 50 includes an offset value generator 195 for generating an offset value OSi in accordance with an optimum vector Vpp from a preceding picture identical position MB optimum vector register 111 and an input displacement vector Vi from a vector register 53. The offset value OSi from the offset value generator 195 is supplied to an offset evaluation value comparator 132 with an evaluation value Ei from an evaluation value register 51. The offset evaluation value comparator 132, which is identical in structure to that shown in FIG. 53, compares an offset input evaluation value Eio with an offset minimum evaluation value Ero. The remaining structure of the compare circuit 50 is identical to that shown in FIG. 48.

In the structure of the compare circuit 50 shown in FIG. 65, priority in a vector differential comparator 81 is varied with the optimum vector Vpp detected for a macro block (template block) of the same position in a preceding picture. The offset value distribution employed in the offset value generator 195 is varied with the optimum vector Vpp. Therefore, it is possible to reliably detect the optimum vector in response to the priority. The offset value generator 195, which is identical in structure to that shown in FIG. 59, employs the optimum vector Vpp of the macro block of the same position in the preceding picture in place of the central vector Vc.

Assertion timing of a reset signal φreset is not restricted to a timing of the head of a slice and a preceding macro block subjected to intra-macro block processing, but may be set when continuity between macro blocks is lost.

[Exemplary Offset Value Distribution 1]

Figure 66:
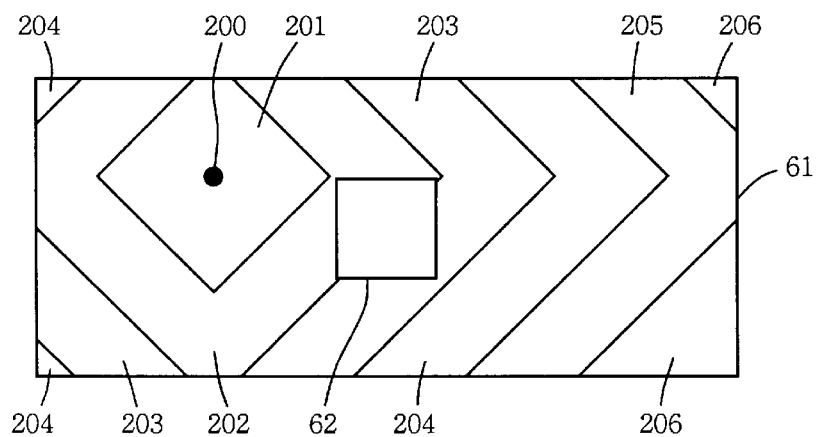
FIG. 66 illustrates an exemplary offset value distribution 1 in the compare circuit shown in FIG. 65.

FIG. 66 illustrates an exemplary offset value distribution in the compare circuit 50 shown in FIG. 65. Referring to FIG. 65, a search area 61 is split into radially arranged rhombic areas 202, 203, 204, 205 and 206 around an evaluation point 200 indicated by an optimum vector of a macro block on the same position in a preceding picture. Offset values are set in the respective areas 202 to 206. A true back search window block 62 is arranged on a central portion of the search area 61. In the offset value distribution shown in FIG. 61, the offset values are increased as the distances between the areas 202 to 206 and the evaluation point 200 are increased. Thus, it is possible to increase a possibility of detecting an optimum vector in the area 201 having a small offset value.

[Exemplary Offset Value Distribution 2]

Figure 67:
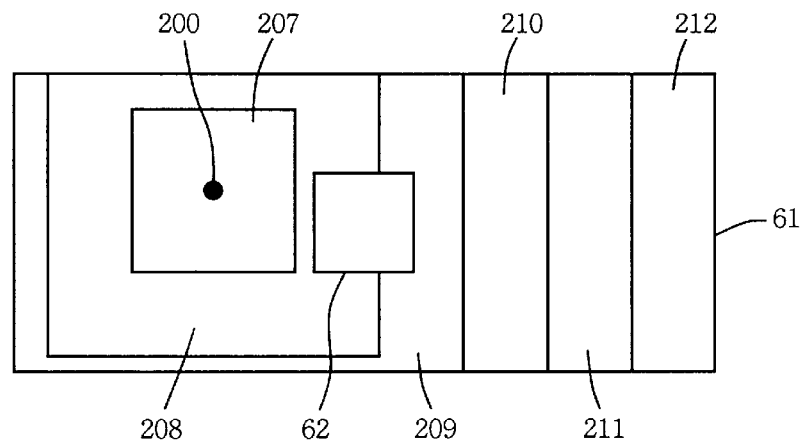
FIG. 67 illustrates an exemplary offset value distribution 2 in the compare circuit shown in FIG. 65.

FIG. 67 illustrates another exemplary offset value distribution of the compare circuit 50 shown in FIG. 65. In the offset value distribution shown in FIG. 67, a search area 61 is so split that square areas 207, 208, 209, 210, 211 and 212 are radially arranged around an evaluation point 200 indicated by an optimum vector of a macro block of the same position in a preceding picture. Offset values are set in the areas 207 to 212 respectively. If an optimum vector should be detected in the area 207, the offset value of this area 207 is set at the minimum value of zero, for example, and the offset values of the remaining areas 208 to 212 are increased in the distance from the evaluation point 200. Thus, it is possible to detect an optimum vector close to the evaluation point 200, and variation of motion vectors can be suppressed.

According to the structure 8 of the compare circuit 50 of the present invention, as hereinabove described, it is possible to reliably detect optimum vectors and decide motion vectors in response to the priority by generating offset values having a similar distribution and adding the same to evaluation values before distributing the priority levels in accordance with the optimum vector of the macro block of the same position in the preceding picture, variation of the motion vectors can be suppressed, and the amount of codes of the motion vectors can be reduced in response.

[Structure 9 of Compare Circuit]

Figure 68:
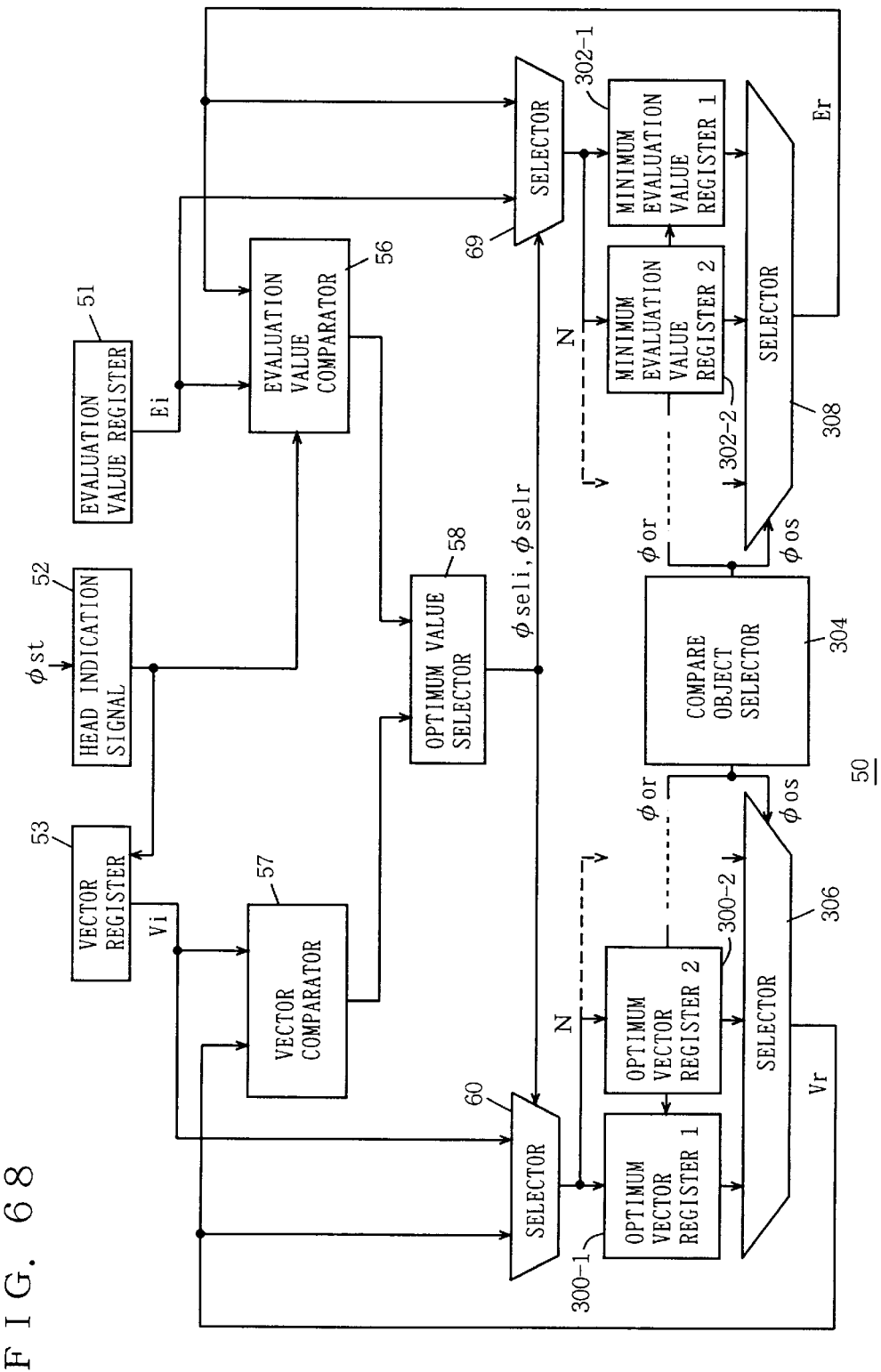
FIG. 68 illustrates an exemplary structure 9 of the compare circuit shown in FIG. 32.

FIG. 68 schematically illustrates a structure 9 of the compare circuit 50 according to the present invention. Referring to FIG. 9, the compare circuit includes optimum vector registers 300-1, 300-2, . . . provided in correspondence to a plurality of areas (subsearch areas) of a search area respectively for storing optimum vector values of the corresponding areas, minimum evaluation value registers 302-1, 302-2, . . . for storing minimum evaluation values of the respective areas, a compare object selector 304 for generating selection signals φor and φos specifying the registers 300-1, 300-2, . . . and 302-1, 302-2, . . . in response to positions of a search window block in evaluation in the search area, a selector 306 for selecting outputs of the optimum vector registers 300-1, 300-2, . . . in accordance with the selection signals φor and φos from the compare object selector 304, and a selector 308 for selecting outputs of the minimum evaluation value registers 302-1, 302-2, . . . in accordance with the selection signals φor and φos from the compare object selector 304. An output of the selector 306 is supplied to one input of a vector comparator 57. An input displacement vector Vi from a vector register 53 is supplied to another input of the vector comparator 57. A minimum evaluation value Er outputted from the selector 308 is supplied to one input of an evaluation value comparator 56. An evaluation value Ei from an evaluation value register 51 is supplied to another input of the evaluation value comparator 56. The evaluation value comparator 51 is supplied with an evaluation value from a total sum part (not shown).

An optimum value selector 58 outputs selection signals φseli and φselr for selecting the optimum values in accordance with outputs of the evaluation value comparator 56 and the vector comparator 57. The optimum value selector 58 is identical in structure and operation to those shown in FIGS. 33 and 34. The vector comparator 57 compares the priority levels of a supplied optimum vector Vr and an input displacement vector Vi with each other. In this case, the priority is set in each subsearch area, and the priority levels are determined in the corresponding subsearch area. In this case, a structure of assigning high priority to an evaluation point close to the true back position in each subsearch area may simply be employed.

FIG. 68 representatively shows two optimum vector registers 300-1 and 300-2 and two minimum evaluation value registers 302-1 and 302-2. The search area is split into N subsearch areas, so that the optimum vector registers 300-1, 300-2, . . . and the minimum evaluation value registers 302-1, 302-2, . . . are arranged in correspondence to the subsearch areas respectively. It is possible to detect optimum vectors and minimum evaluation values for the respective subsearch areas. Therefore, a motion vector for a single template block is detected on the basis of optimum vectors and minimum evaluation values in a plurality of subsearch areas. Thus, it is possible to detect the optimum motion vector by employing a set of the most suitable optimum vector and minimum evaluation value, so that the most suitable predictive image can be detected in response. Thus, an image coding system of high picture quality can be constructed.

In case of detecting a motion vector for a single template block by performing an appropriate processing on the optimum vector and the minimum evaluation value from each subsearch area as described later, it is possible to prevent large fluctuation of the motion vector of each template block and variation of such motion vectors can be suppressed in response.

Figure 69A:
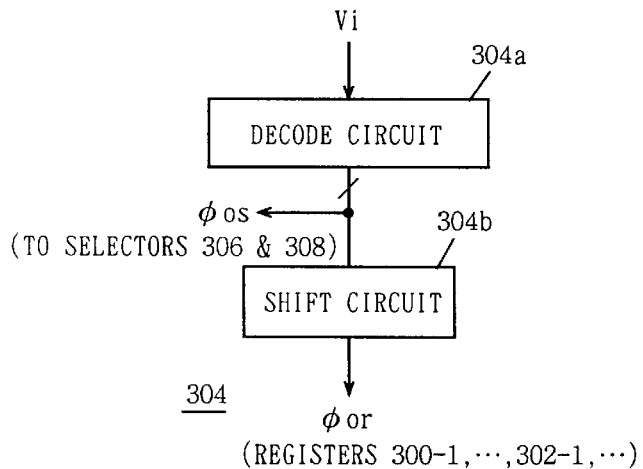
FIGS. 69A and 69B schematically illustrate the structure of a comparing object selector shown in FIG. 68.

FIG. 69A illustrates an exemplary structure of the compare object selector 304 shown in FIG. 68. Referring to FIG. 69A, the compare object selector 304 includes a decode circuit 304a for decoding the input displacement vector Vi from the vector register 53 shown in FIG. 68 and outputting a selector selection signal φos, and a shift circuit 304b for delaying the selector selection signal φos outputted from the decode circuit 304 for a prescribed period in accordance with a clock signal (not shown). The shift circuit 304 supplies a register selection signal φor for the optimum vector registers 300-1, 300-2, . . . and the minimum evaluation value registers 302-1, 302-2, . . . The optimum vector registers 300-1, 300-2, . . . and the minimum evaluation value registers 302-1, 302-2, . . . are arranged in pairs, whereby the optimum vector register and the corresponding minimum evaluation register are selected by the register selection signal φor from the shift circuit 304b.

The decode circuit 304a generates the selector selection signal φos for selecting the optimum vector register and the minimum evaluation value register provided for the subsearch area to which the input displacement vector Vi belongs, and supplies the same to the selectors 306 and 308. The selectors 306 and 308 select outputs of the corresponding optimum vector register and minimum evaluation value register in accordance with the selector selection signal φos, and supplies the same to the vector comparator 57 and the evaluation value comparator 56 respectively. At this time, the register selection signal φor selects the optimum vector register and the minimum evaluation value register provided for a preceding evaluation point processed in the preceding subsearch area, so that a vector and an evaluation value selected by the selectors 60 and 69 are written therein.

When the vector evaluation for the search window block corresponding to the input displacement vector Vi is completed by the operations of the vector comparator 57, the evaluation value comparator 56 and the optimum value selector 58, the register selection signal φor outputted from the shift circuit 304b enters an active state so that the optimum vector register and the minimum evaluation value register provided in correspondence to the subsearch area, to which the search window block indicated by the displacement vector Vi belongs, have evaluation results written therein. It is possible to correctly specify the registers in which the outputs of the selectors 60 and 69 must be written and the registers to be selected by the selectors 306 and 308 by employing the shift circuit 304b.

Figure 69B:
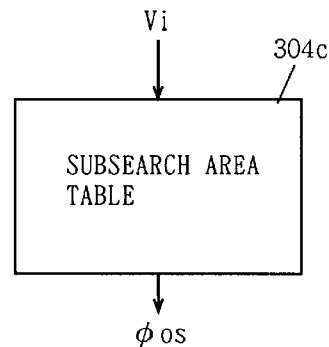

The decode circuit 304a, which may be formed by a programmable logic device, for example, can be implemented using a table memory 304c, as shown in FIG. 69B. Referring to FIG. 69B, the table memory 304c stores information indicating each corresponding subsearch area with the input displacement vector Vi as an address in a table mode. This subsearch area table 304c outputs the selector selection signal φos.

[Decision of Motion Vector]

Figure 70:
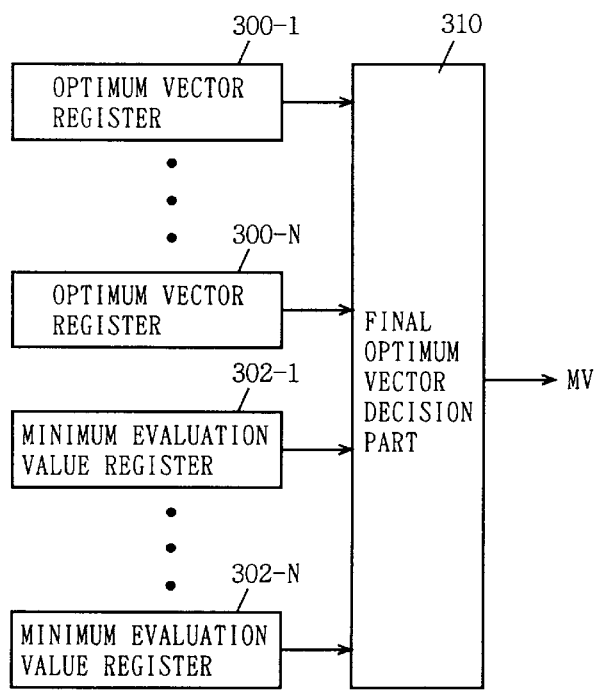
FIG. 70 schematically illustrates the structure of a final optimum vector decision part of the compare circuit shown in FIG. 68.

FIG. 70 schematically illustrates a structure for final optimum vector detection with employment of the compare circuit 50 shown in FIG. 68. Referring to FIG. 70, a final optimum vector decision part 310 is provided to receive outputs of the optimum vector registers 300-1 to 300-N and the minimum evaluation value registers 302-1 to 30-2N in parallel with each other. The final optimum vector decision part 310 decides a final optimum vector MV for the corresponding template block in accordance with the supplied information. The final optimum vector decision part 310 determines variation of the minimum evaluation values from the minimum evaluation value registers 302-1 to 302-N, for example. If the variation of the minimum evaluation values exceeds a prescribed value, the final optimum vector decision part 310 decides the optimum vector providing the smallest minimum evaluation value as the final optimum vector. If the variation of the minimum evaluation values is below the prescribed value, on the other hand, the final optimum vector decision part 310 decides the average of the optimum vectors as the final optimum vector. The final optimum vector decision part 310 may be so formed as to add offset values to the evaluation values thereby assigning priority to each area.

[Subsearch Area Arrangement 1]

Figure 71:
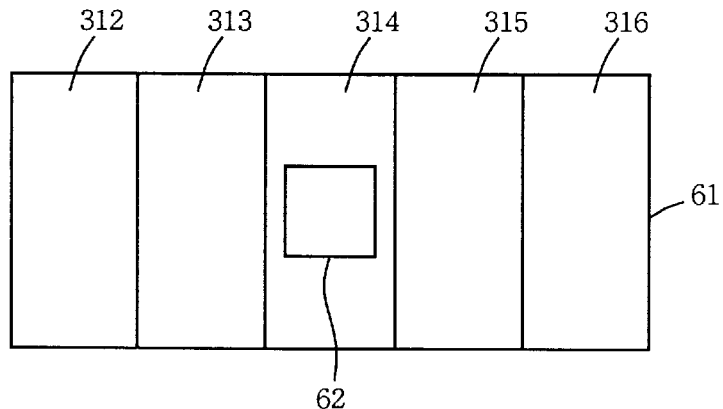
FIG. 71 illustrates an exemplary subsearch area arrangement 1 in the compare circuit shown in FIG. 68.

FIG. 71 illustrates a subsearch area arrangement 1 of the compare circuit 50 shown in FIG. 68. Referring to FIG. 71, a search area 61 is split into five subsearch areas 312, 313, 314, 315 and 316 along the horizontal direction. A true back search window block 62 is included in the subsearch area 314. Priority utilized by the vector comparator 57 is assigned to each of the subsearch areas 312 to 316. In the subsearch area arrangement shown in FIG. 71, optimum vectors and minimum evaluation values can be obtained in the five subsearch areas 312 to 316 split with respect to the horizontal direction respectively. Thus, the optimum motion vector can be detected for a horizontal motion.

[Subsearch Area Arrangement 2]

Figure 72:
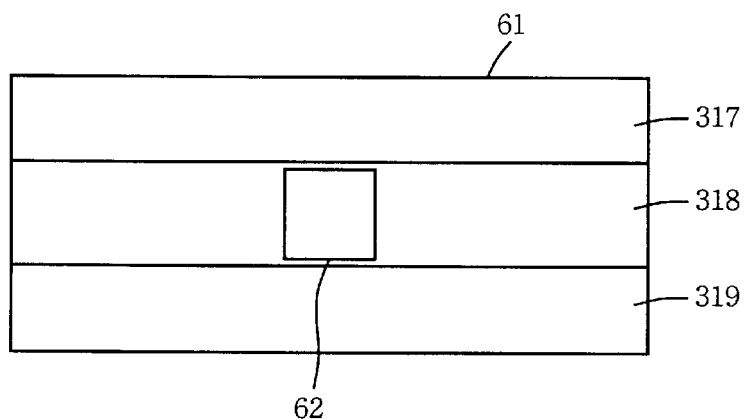
FIG. 72 illustrates an exemplary subsearch area arrangement 2 in the compare circuit shown in FIG. 68.

FIG. 72 schematically illustrates a subsearch area arrangement 2 of the compare circuit 50 shown in FIG. 68. Referring to FIG. 72, a search area 61 is split into three subsearch areas 317, 318 and 319 along the vertical direction. A true back search window block 62 positioned at a central portion of the search area 61 is indicated being included in the subsearch area 318. Optimum vectors and minimum evaluation values are obtained in the subsearch areas 317 to 319 respectively. It is possible to correctly detect a motion vector for a vertical motion, by utilizing the subsearch area arrangement shown in FIG. 72.

[Subsearch Area Arrangement 3]

Figure 73:
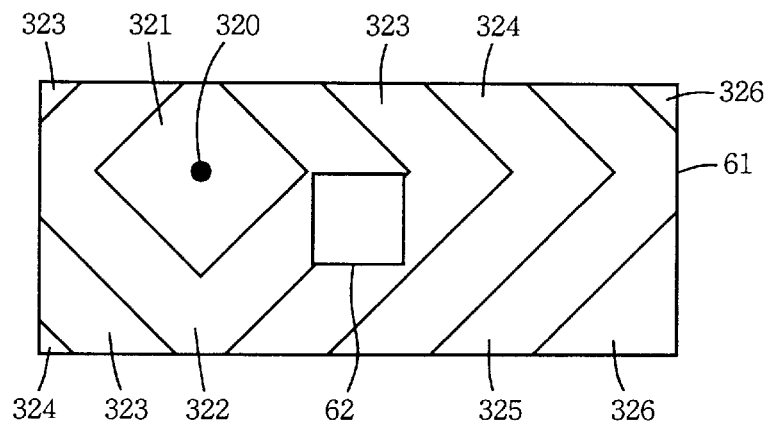
FIG. 73 schematically illustrates an exemplary subsearch area arrangement 3 in the compare circuit shown in FIG. 68.

FIG. 73 schematically illustrates a subsearch area arrangement 3 in the compare circuit 50 shown in FIG. 68. In the arrangement shown in FIG. 73, a search area 61 is radially split into a plurality of rhombic areas 321, 322, 323, 324, 325 and 326 around an evaluation point 320 specified by a motion vector or a final optimum vector of a preceding macro block. Optimum vectors and minimum evaluation values are obtained in the subsearch areas 321 to 326 respectively. It is possible to search for the optimum vectors in the respective subsearch areas 321 to 326 in response to the motion vector or the final optimum vector of the preceding macro block by arranging the subsearch areas 321 to 326 around the point indicated by the motion vector of the preceding macro block which is a template block evaluated immediately in advance.

Therefore, it is possible to increase the possibility of detecting the motion vector of the template block under evaluation in an area close to the evaluation point 320 indicated by the motion vector of the preceding macro block, thereby suppressing variation of the motion vectors in response.

Figure 74:
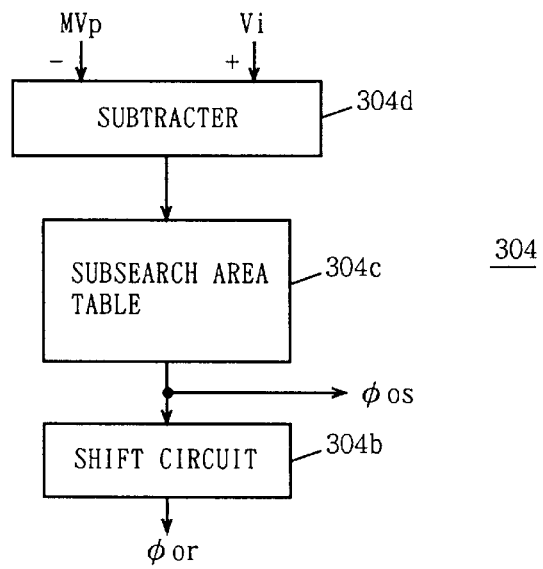
FIG. 74 schematically illustrates the structure of a compared object selector for implementing the subsearch area arrangement shown in FIG. 73.

FIG. 74 schematically illustrates the structure of the compare object selector 304 for implementing the subsearch area arrangement shown in FIG. 73. Referring to FIG. 74, the compare object selector 304 includes a subtracter 304d for obtaining the difference between a preceding macro block motion vector MVp and the input displacement vector Vi, a subsearch area table 304c for outputting its storage content with an output from the subtracter 304d as an address thereto, and a shift circuit 304b for delaying a signal outputted from the subsearch area table 304c by a prescribed period by a shift operation.

The subsearch area table 304c and the shift circuit 304b are identical in structure to those shown in FIGS. 69B and 69A respectively. The subsearch area table 304c outputs the selector selection signal φos, and the shift circuit 304b outputs the register selection signal φor. The subtracter 304d subtracts the preceding macro block motion vector (or final optimum vector) MVp from the input displacement vector Vi. Thus, the true back position of the search area moves to a position indicated by the preceding macro block motion vector (or final optimum vector) MVp, whereby the subsearch area arrangement around the evaluation point 320 indicated by the motion vector or the final optimum vector of the preceding macro block can be implemented as shown in FIG. 73.

[Subsearch Area Arrangement 4]

Figure 75:
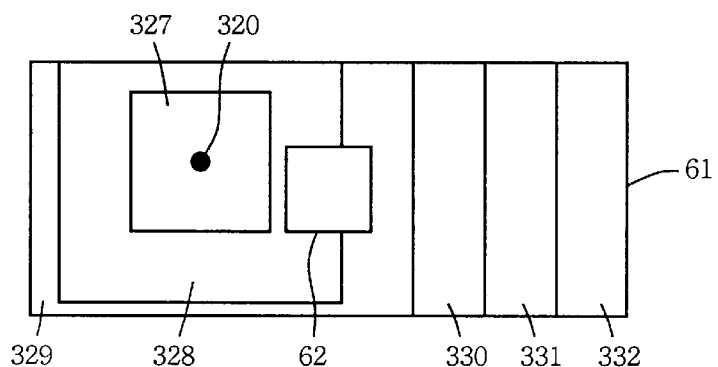
FIG. 75 schematically illustrates an exemplary subsearch area arrangement 4 in the compare circuit shown in FIG. 68.

FIG. 75 illustrates a subsearch area arrangement 4 in the compare circuit 50 shown in FIG. 68. Referring to FIG. 75, a search area 61 is radially split into square areas 327, 328, 329, 330, 331 and 332 around an evaluation point 320 indicated by a motion vector of a preceding macro block. The motion vector may be replaced with a final optimum vector. Optimum vectors and minimum evaluation values are computed in the square subsearch areas 327 to 332 respectively. Also in the subsearch area arrangement shown in FIG. 75, there is a high possibility of providing a motion vector of a template block under evaluation in the vicinity of the evaluation point 320 indicated by the motion vector or the final optimum vector of the preceding macro block and variation of motion vectors can be suppressed, similarly to the structure shown in FIG. 73.

The subsearch area arrangement shown in FIG. 75 can be implemented through the structure shown in FIG. 74. Subsearch area indication data stored in the subsearch area table 304c may be arranged to draw square shapes around the evaluation point indicated by the true back search window block 62.

[Subsearch Area Arrangement 5]

Figure 76:
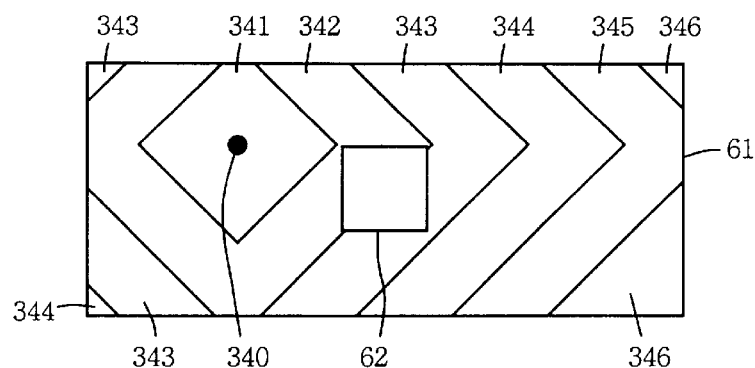
FIG. 76 illustrates an exemplary subsearch area arrangement 5 in the compare circuit shown in FIG. 68.

FIG. 76 illustrates the structure of a subsearch area arrangement 5 in the compare circuit 50 shown in FIG. 68. Referring to FIG. 76, a search area 61 is radially split into rhombic areas 341, 342, 343, 344, 345 and 346 around an evaluation point 340 indicated by a motion vector or a final optimum vector of a macro block of the same position in a preceding picture. A true back search window block 62 is arranged on a central portion of the search area 61. Optimum vectors and minimum evaluation values are computed in the subsearch areas 341 to 346 respectively. The search area 61 is so split as to arrange the rhombic shapes around the motion vector or the final optimum vector of the macro block of the same position in the preceding picture, whereby the optimum vectors of the respective subsearch areas 341 to 346 take values strongly influenced by the motion vector or the final optimum vector of the macro block of the same position in the preceding picture. Thus, abrupt changes of motion vectors between images can be suppressed, and the amount of codes of the motion vectors can be reduced in response.

Figure 77:
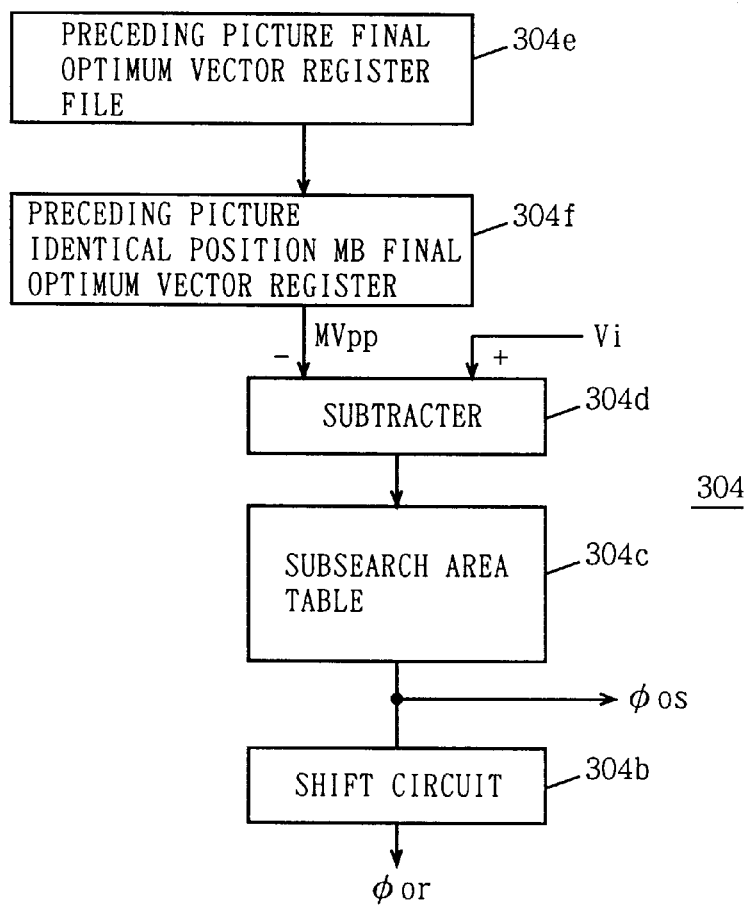
FIG. 77 schematically illustrates the structure of a comparing object selector for implementing the subsearch area arrangement shown in FIG. 76.

FIG. 77 schematically illustrates the structure of the compare object selector 304 for implementing the subsearch area arrangement shown in FIG. 76. Referring to FIG. 77, the compare object selector 304 includes a preceding picture final optimum vector register file 304e for successively storing final optimum vectors of respective macro blocks of a preceding picture, a preceding picture identical MB final optimum vector register 304f for storing the final optimum vector of a macro block (MB) which is on the same position as a template block under evaluation from the preceding picture final optimum vector register file 304e, a subtracter 304d for subtracting an identical macro block final optimum vector MVpp from the preceding identical MB final optimum vector register 304f from the input displacement vector Vi, a subsearch area table 304c for outputting its storage content with an output of the subtracter 304d as an address thereto, and a shift circuit 304b for delaying data read from the subsearch area table 304c for a prescribed period.

The subtracter 304d, the subsearch area table 304c and the shift circuit 304b are identical in structure to those shown in FIG. 74. The preceding picture final optimum vector register file 304e successively stores final optimum vectors MVpp outputted from the final optimum vector decision part 310 shown in FIG. 74 in the FIFO manner. The preceding picture identical MB final optimum vector register 304f stores the final optimum vector MVpp of a macro block which is on the same position as the template block under evaluation. The subtracter 304d subtracts the final optimum vector MVpp from the input displacement vector Vi, whereby the true back position moves to an evaluation point indicated by the final optimum vector MVpp in the search area, and the subsearch area arrangement shown in FIG. 76 can be implemented in response. The final optimum vector MVpp may be replaced with a motion vector.

[Subsearch Area Arrangement 6]

Figure 78:
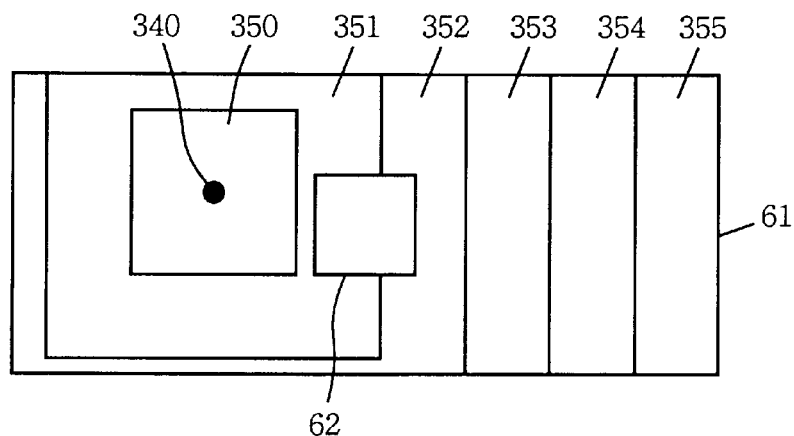
FIG. 78 schematically illustrates an exemplary subsearch area arrangement 6 of the compare circuit shown in FIG. 68.

FIG. 78 illustrates a subsearch area arrangement 6 in the compare circuit 50 shown in FIG. 68. Referring to FIG. 78, a search area 61 is radially split into square areas 350, 351, 352, 353, 354 and 355 around an evaluation point 340 indicated by a preceding picture identical position macro block final optimum vector. A true back search window block 62 is arranged on a central portion of the search area 61. As shown in FIG. 78, the square subsearch areas 350 to 355 are varied with the value of the final optimum vector of the macro block of the same position in the preceding picture, thereby varying optimum vector distributions in the respective subsearch areas 350 to 355. Thus, it is possible to attain an effect similar to that of the structure shown in FIG. 76 by splitting the search area 61 into such square areas 350 to 355. The final optimum vector may be replaced with a motion vector.

[Subsearch Area Arrangement 7]

Figure 79:
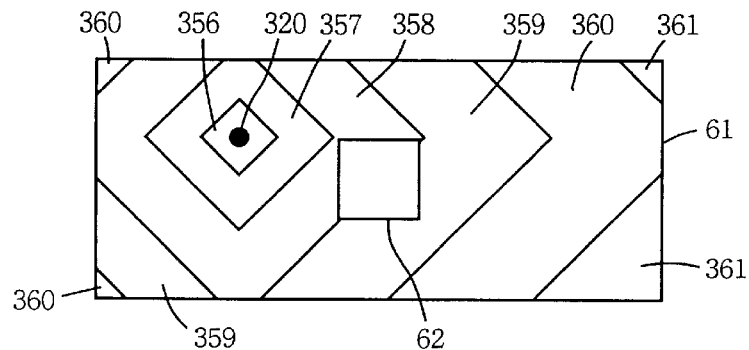
FIG. 79 illustrates an exemplary subsearch area arrangement 7 in the compare circuit shown in FIG. 68.

FIG. 79 schematically illustrates a subsearch area arrangement 7 of the compare circuit 50 shown in FIG. 68. Referring to FIG. 79, a search area 61 is radially split into rhombic areas 360, 361, 362, 363, 364 and 365 around an evaluation point 320 indicated by a final optimum vector of a preceding macro block. The rhombi are densely and roughly distributed as approaching to and leaving from the evaluation point 320 indicated by the final optimum vector of the preceding block, respectively. Optimum vectors are obtained in the areas 360 to 365 respectively. The number of the optimum vectors is increased as approaching to the evaluation point 320. Therefore, it is possible to detect an optimum vector which is identical or close to the final optimum vector indicated by the preceding macro block, and variation of motion vectors can be suppressed. Referring to FIG. 79, a search window block 62 positioned at the true back is arranged at a central portion of the search area 61. The final optimum vector may be replaced with a motion vector.

[Subsearch Area Arrangement 8]

Figure 80:
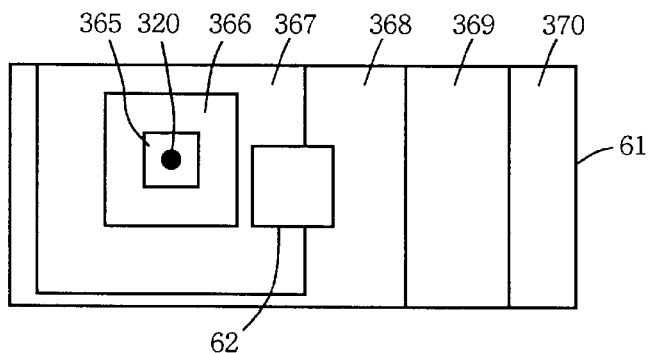
FIG. 80 illustrates an exemplary subsearch area arrangement 8 of the compare circuit shown in FIG. 68.

FIG. 80 schematically illustrates a subsearch area arrangement 8 of the compare circuit 50 shown in FIG. 68. In the arrangement shown in FIG. 80, a search area 61 is radially split into square areas 365, 366, 367, 368, 369 and 370 around an evaluation point 320 indicated by a final optimum vector of a preceding macro block. Also in the structure shown in FIG. 80, the distribution of the squares is densified and roughened as approaching to and leaving from the evaluation point 320, respectively. Also in the square subsearch areas 365 to 370 shown in FIG. 80, the number of areas close to the evaluation point 320 is great and hence there is a high possibility that an optimum vector which is close or identical to the final optimum vector corresponding to the evaluation point 320 is obtained, and variation of motion vectors can be suppressed in response. The evaluation point 320 may alternatively be expressed by a motion vector.

The subsearch area arrangements shown in FIGS. 79 and 80 can be implemented through the structure of the compare object selector 304 shown in FIG. 74.

[Subsearch Area Arrangement 9]

Figure 81:
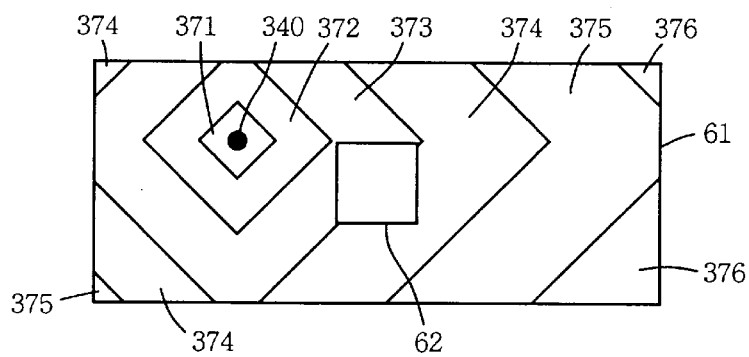
FIG. 81 schematically illustrates an exemplary subsearch area arrangement 9 of the compare circuit shown in FIG. 68.

FIG. 81 schematically illustrates a subsearch area arrangement 9 of the compare circuit 50 shown in FIG. 68. Referring to FIG. 81, a search area 61 is radially split into rhombic areas 371, 372, 373, 374, 375 and 376 around an evaluation point 340 indicated by a final optimum vector of a macro block of the same position in a preceding picture. The distribution of the rhombi is densified and roughened as the areas 371 to 376 approach to and leave from the evaluation point 340, respectively. Also in the subsearch area arrangement shown in FIG. 81, therefore, the number of optimum vectors having values close to that of the final optimum vector of the macro block of the same position in the preceding picture is increased, and there is a high possibility that a final optimum vector of a value identical or close to that of the final optimum value of the macro block of the same position in the preceding picture in final optimum vector decision. Thus, variation of motion vectors can be suppressed. The final optimum vector may be replaced with a motion vector.

[Subsearch Area Arrangement 10]

Figure 82:
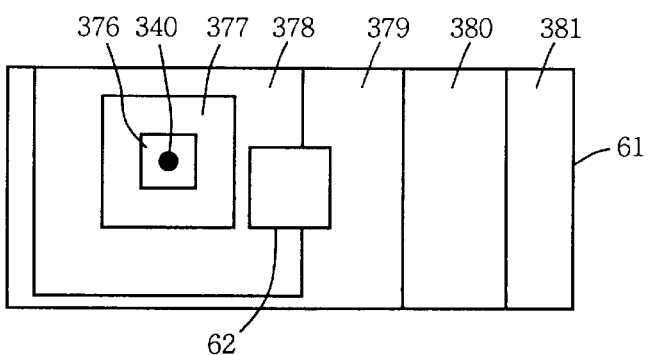
FIG. 82 schematically illustrates an exemplary subsearch area arrangement 10 of the compare circuit shown in FIG. 68.

FIG. 82 schematically illustrates a-subsearch area arrangement 10 of the compare circuit 50 shown in FIG. 68. Referring to FIG. 82, a search area 61 is radially split into square areas 376, 377, 378, 379, 380 and 381 around an evaluation point 340 indicated by a final optimum vector of a macro block of the same position in a preceding picture. The distribution of the squares is densified and roughened as approaching to and leaving from the evaluation point 340 respectively. In the subsearch area arrangement shown in FIG. 82, therefore, it is possible to increase the possibility of taking a value identical or close to the final optimum vector of the macro block of the same position in the preceding picture in final optimum vector detection of a template block under evaluation, and variation of motion vectors generated from such final optimum vectors can be suppressed in response. The evaluation point 340 may alternatively be indicated by a motion vector.

The subsearch area arrangements shown in FIGS. 81 and 82 are implemented through the structure of the compare object selector 304 shown in FIG. 77.

The structure of splitting the search area 61 into the areas having densities varied with the distances between the same and the evaluation point 340 can also be applied to assignment of priority. There is a high possibility that an optimum vector identical or close to the final optimum vector and it is possible to suppress variation of motion vectors in response by assigning high priority in the vicinity of the evaluation point 340.

According to the present invention, as hereinabove described, the priority is taken into consideration in optimum vector evaluation, whereby variation of motion vectors can be suppressed, the amount of codes provided to the motion vectors can be reduced, data for improving picture quality can be transmitted without increasing the amount of transmission data, and an image coding system of high picture quality can be constructed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motion vector detector for obtaining a motion vector employed for motion-compensated predictive coding through block matching of a current screen image and a reference screen image, said motion vector detector comprising:

evaluation value computing means for obtaining evaluation values indicating similarity between a current image block of a prescribed size to be subjected to motion vector detection in the current screen and respective ones of a plurality of reference image blocks in a search area in the reference screen related to said current image block in accordance with respective ones of a plurality of predetermined predictive modes for the respective reference image blocks, evaluation values for a reference image block of the reference image blocks being decided for the respective predetermined predictive modes concurrently, and optimum vector decision means coupled to receive said evaluation values in respective ones of said plurality of predetermined predictive modes for the respective reference image blocks from said evaluation value computing means, for deciding optimum vectors for the respective predictive modes in parallel with each other on a reference image block basis, said optimum vector decision means including:

priority assignment means for assigning priority to the reference image block positions in said search area for the respective predictive modes, and candidate optimum vector decision means for evaluating supplied evaluation values and deciding candidate optimum vectors for said current image block with respect to the respective predictive modes in accordance with said priority.

2. The motion vector detector in accordance with claim 1, wherein the priority assignment means reduces said priority for each respective reference image block as the distance between the reference image block and a specific position on said search area is increased.

3. The motion vector detector in accordance with claim 2, wherein said specific position corresponds to said current image block.

4. The motion vector detector in accordance with claim 2, wherein said specific position is different from a location corresponding to said current image block.

5. The motion vector detector in accordance with claim 2, wherein said specific position is a location indicated by an optimum vector obtained for a past image block temporally preceding said current image block under evaluation on said current screen image.

6. The motion vector detector in accordance with claim 2, wherein said specific position is indicated by an optimum vector obtained for an image block, being on the same position as a position on the screen of the current image block under evaluation, of a past screen image temporally preceding said current screen image in a processing order.

7. The motion vector detector in accordance with claim 1, wherein said priority assignment means comprises:

means for adding an offset value depending on a position of the corresponding reference image block in said search area to the corresponding evaluation value from said evaluation value computing means.

8. The motion vector detector in accordance with claim 7, wherein said offset value is set to be increased with the distances between a specific reference image block in said search area and a position of said corresponding reference image block position.

9. The motion vector detector in accordance with claim 8, wherein said specific reference image block position is indicated by an optimum vector obtained for a past image block in said current screen image under evaluation temporally in advance of said current screen image block.

10. The motion vector detector in accordance with claim 8, wherein said specific reference image block position is indicated by an optimum vector obtained for a reference image block on a position, corresponding to said current screen image block, of an image being processed temporally in advance of said current screen image.

11. The motion vector detector in accordance with claim 1, wherein said optimum vector decision means further comprises:

means for deciding a candidate optimum vector having a minimum evaluation value as an optimum vector for a motion vector from said candidate optimum vectors.

12. The motion vector detector in accordance with claim 1, wherein said candidate optimum vector decision means includes:

means for splitting said search area into a plurality of subsearch areas and deciding said candidate optimum vectors for the respective subsearch areas in accordance with the respective predictive modes, and means for deciding a candidate having a minimum evaluation value as an optimum candidate point from said candidate optimum vectors in each of the subsearch areas.

13. The motion vector detector in accordance with claim 12, wherein said plurality of subsearch areas are obtained by splitting said search area along a horizontal direction on the reference screen.

14. The motion vector detector in accordance with claim 12, wherein said plurality of subsearch areas are obtained by splitting said search area along a vertical direction on said reference screen.

15. The motion vector detector in accordance with claim 12, wherein said plurality of subsearch areas are obtained by splitting said search area so as to increase an interval in accordance with the increase of a distance from an optimum reference image block position indicated by an optimum vector obtained for a past image block on said current screen processed temporally in advance of said current screen image.

16. The motion vector detector in accordance with claim 15, wherein said plurality of subsearch areas are obtained by splitting said search area into areas having substantially rectangular shapes at equal intervals around said optimum reference image block position.

17. The motion vector detector in accordance with claim 15, wherein said plurality of subsearch areas are obtained by splitting said search area into areas having substantially rectangular shapes so that an interval is increased as the distance from said optimum reference image block position is increased.

18. The motion vector detector in accordance with claim 15, wherein said plurality of subsearch areas are obtained by radially splitting said search area into areas having substantially rectangular shapes at substantially equal intervals around a position indicated by an optimum vector of a past image block on a position, corresponding to said current screen image block, of an image processed temporally in advance of said current screen image.

19. The motion vector detector in accordance with claim 15, wherein said plurality of subsearch areas are obtained by radially splitting said search area into areas having substantially rectangular shapes by increasing intervals as the distance is increased from and around a reference image block position indicated by an optimum vector obtained as to a past image block, being on a position corresponding to said current screen image, of an image processed temporally in advance of said current screen image block.

20. The motion vector detector in accordance with claim 1, wherein said candidate optimum vector decision means includes:
   means for storing an evaluation value of a candidate motion vector, and
   means for deciding a displacement vector of a reference block having higher priority as a candidate optimum vector for storage when a supplied evaluation value and an evaluation value in said storage means are identical to each other.

* * * * *

UNITED STATES PATENT AND TRADEMARK OFFICE
CERTIFICATE OF CORRECTION

PATENT NO. : 6,122,317
DATED : September 19, 2000
INVENTOR(S) : Atsuo Hanami et al.

Page 1 of 1

It is certified that error appears in the above-identified patent and that said Letters Patent is hereby corrected as shown below:

Column 48, claim 8,
Line 5, delete "position".

Signed and Sealed this

Twenty-fifth Day of December, 2001

Attest:

*Attesting Officer*

JAMES E. ROGAN
*Director of the United States Patent and Trademark Office*